United States Patent [19]
Hammond

[11] Patent Number: 5,669,655
[45] Date of Patent: Sep. 23, 1997

[54] ENCLOSURES AND ACCESSORIES FOR SPORT UTILITY VEHICLES, VANS, AND MINIVANS

[76] Inventor: John M. Hammond, 6172 Knickerbocker Rd.,, Ontario,, N.Y. 14519

[21] Appl. No.: 601,266

[22] Filed: Feb. 12, 1996

Related U.S. Application Data

[63] Continuation-in-part of Ser. No. 400,371, Mar. 8, 1995, Pat. No. 5,582,456, which is a continuation-in-part of Ser. No. 137,635, Oct. 18, 1993, Pat. No. 5,417,469.

[51] Int. Cl.⁶ .................................................... B60P 3/34
[52] U.S. Cl. ................................................. 296/26; 296/165
[58] Field of Search ................... 296/26, 159, 163–165, 296/167, 174, 176; 135/88.01, 88.05, 88.07, 88.13–88.16

[56] References Cited

U.S. PATENT DOCUMENTS

| | | | |
|---|---|---|---|
| 3,968,809 | 7/1976 | Beavers | 296/161 |
| 4,065,166 | 12/1977 | Shoemaker | 296/159 |
| 4,192,543 | 3/1980 | Crawford | 296/159 |
| 4,221,425 | 9/1980 | Welle et al. | 296/159 |
| 5,417,469 | 5/1995 | Hammond | 296/165 |
| 5,419,607 | 5/1995 | Oliveira | 296/159 |

*Primary Examiner*—Dean Kramer
*Attorney, Agent, or Firm*—Howard J. Greenwald

[57] ABSTRACT

An apparatus for attaching an enclosure to a motor vehicle. The device contains a substantially quadrilaterally shaped plate, a first device for attaching the plate to the motor vehicle, a second device for attaching the plate to the motor vehicle, a substantially weatherproof cover, and fastening structure for attaching the cover to the plate.

12 Claims, 28 Drawing Sheets

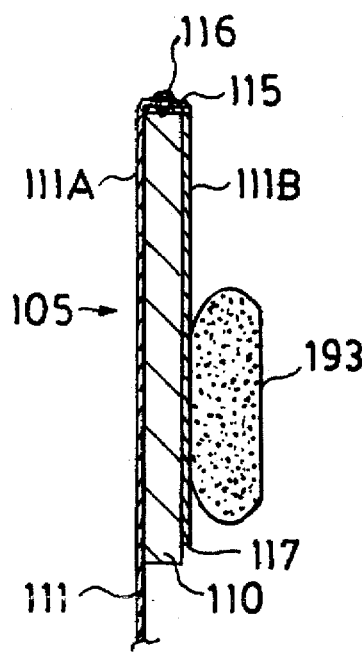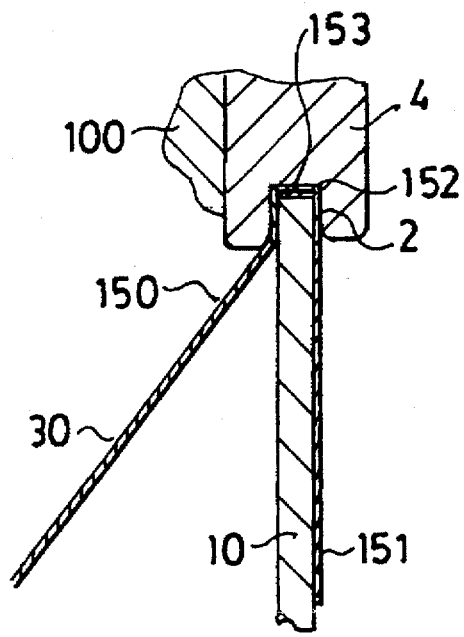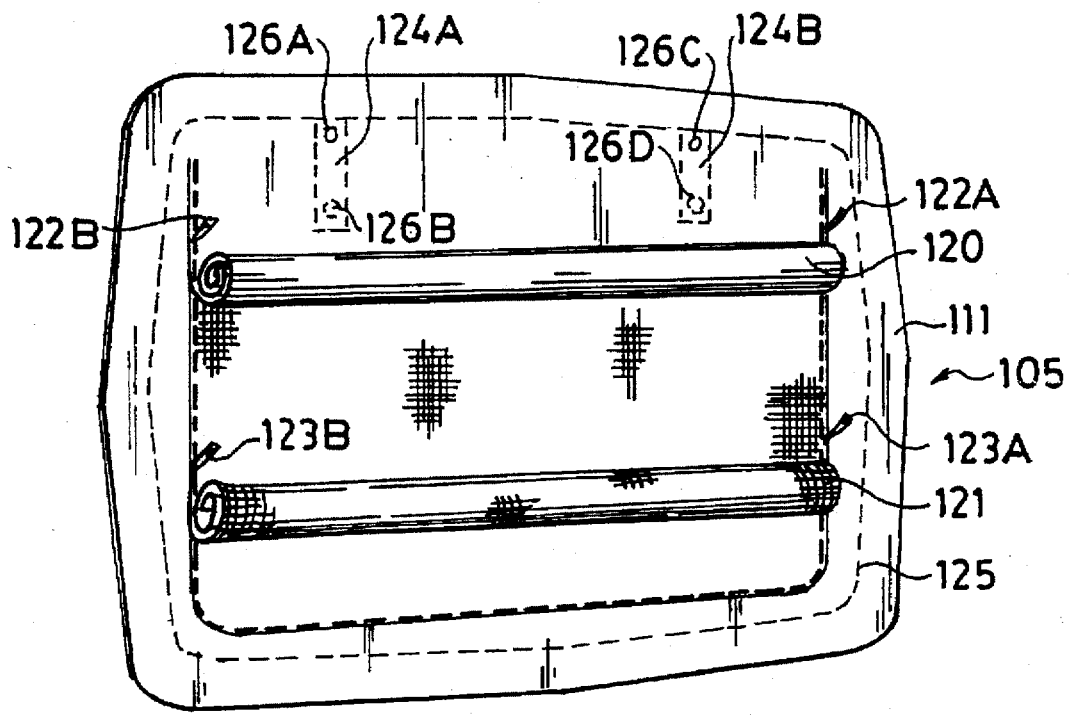

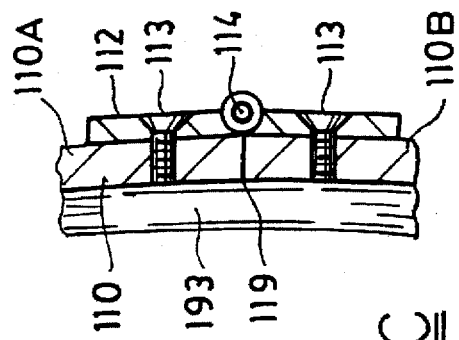
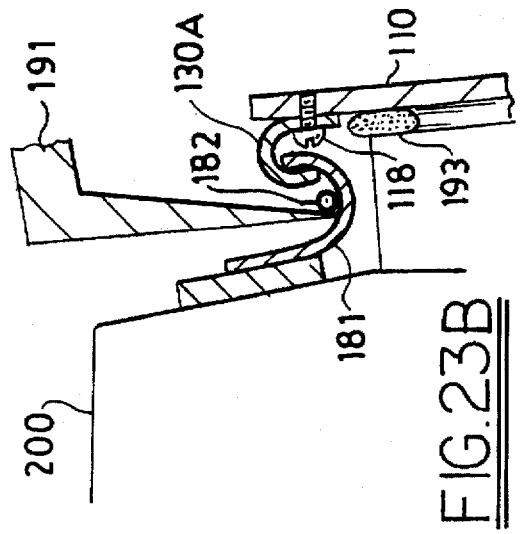
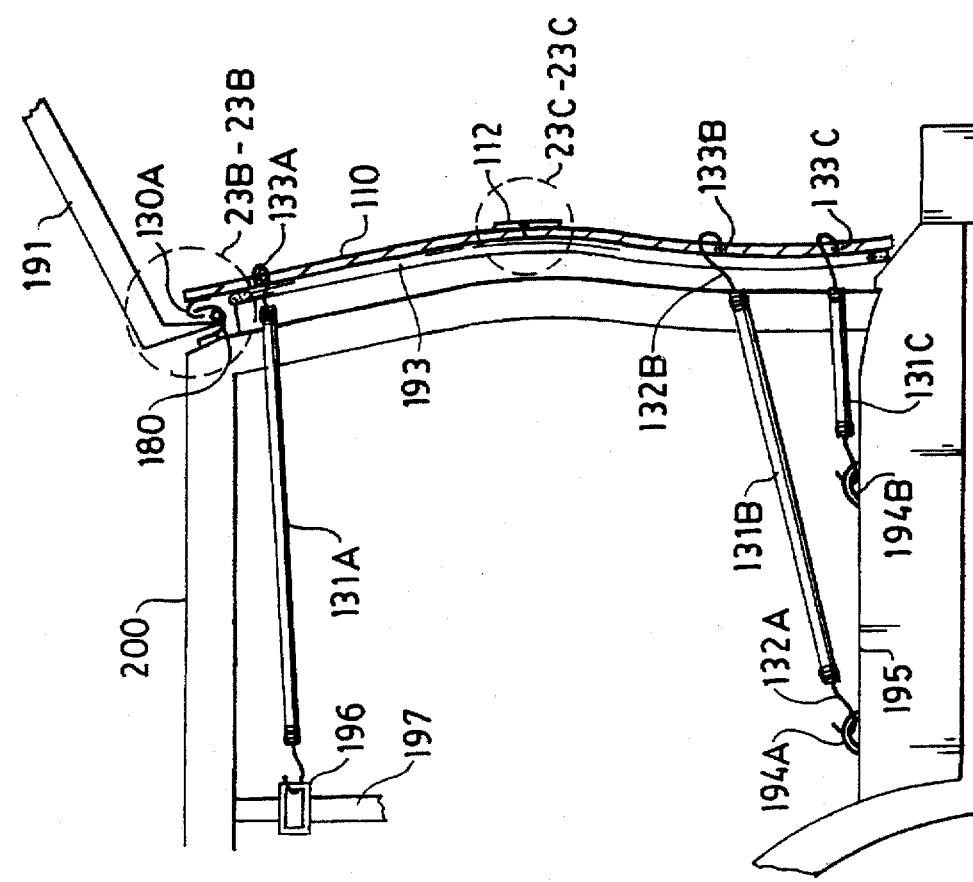

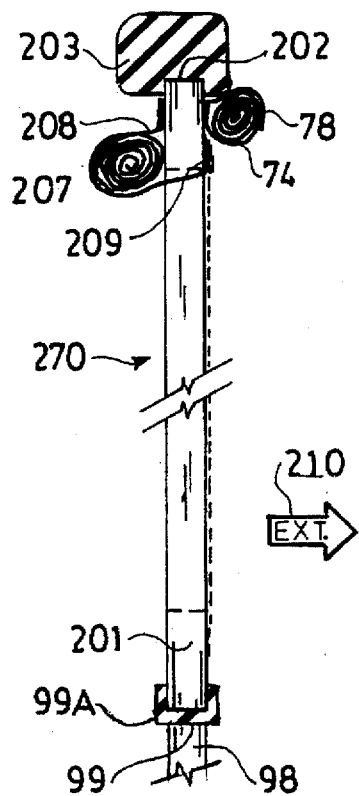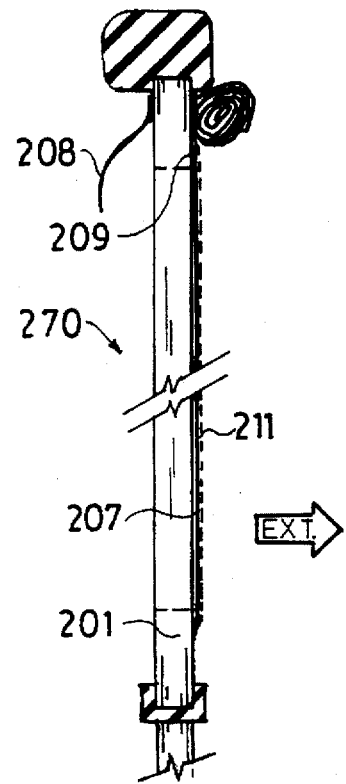
FIG. 26A    FIG. 26B
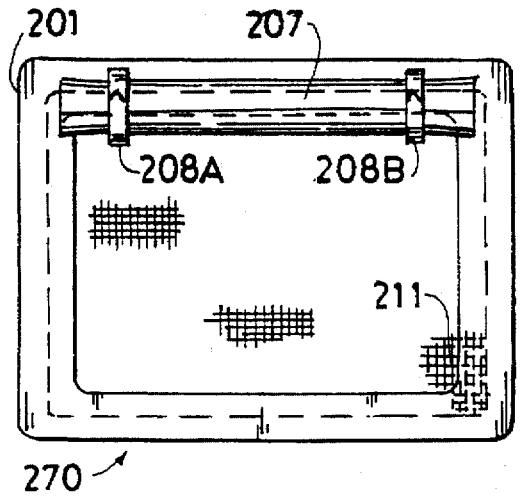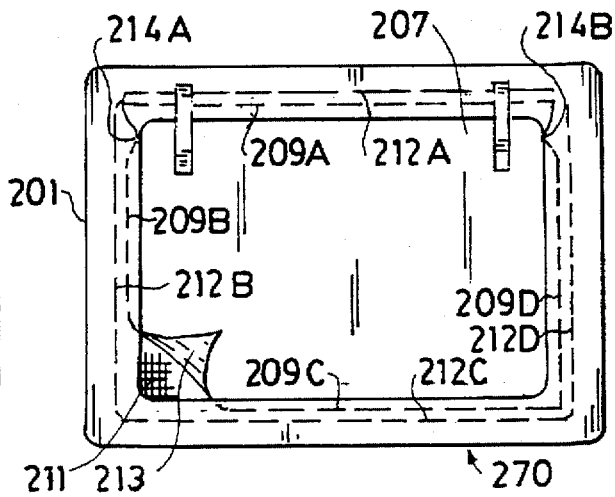
FIG. 26C    FIG. 26D

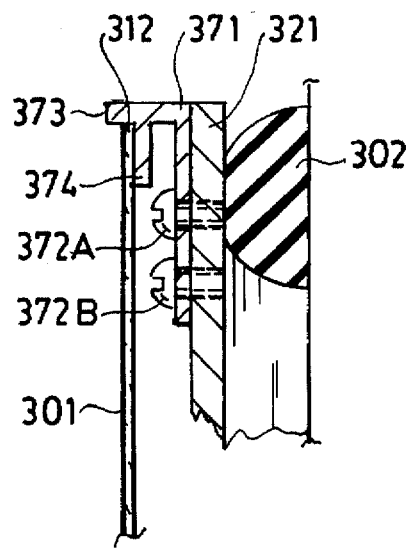
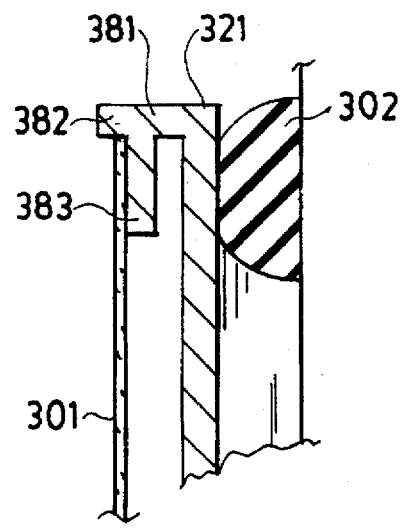
FIG. 28H    FIG. 28I
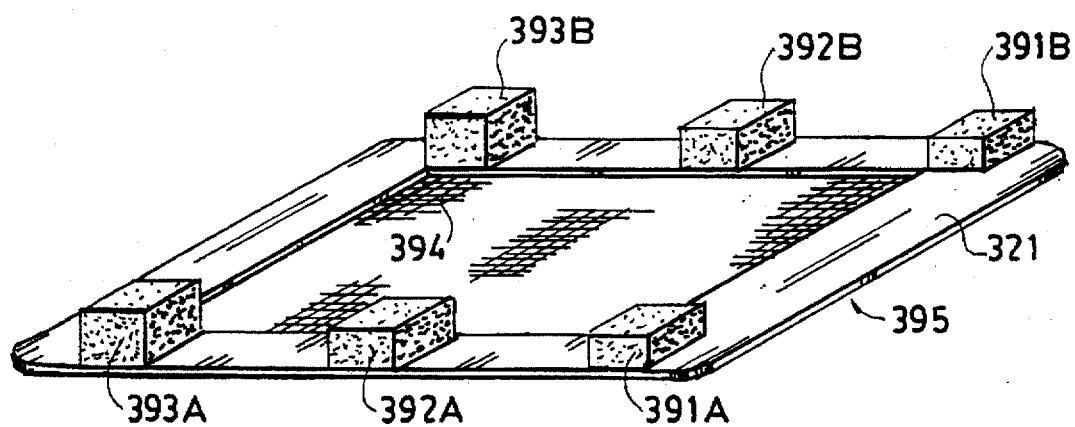
FIG. 28J
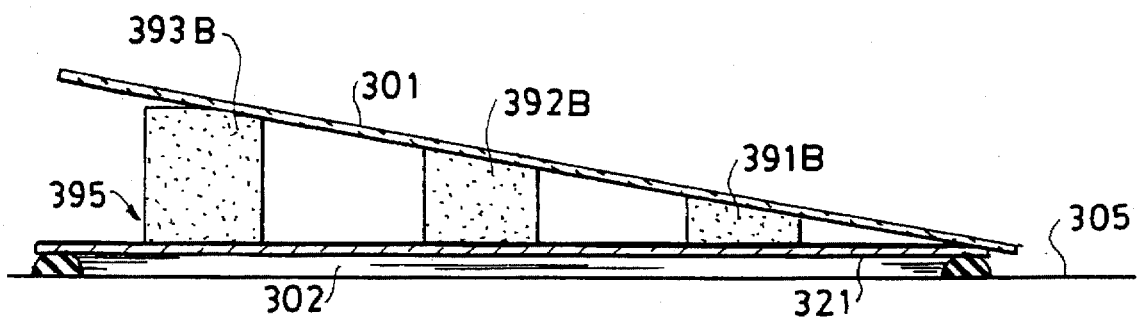
FIG. 28K

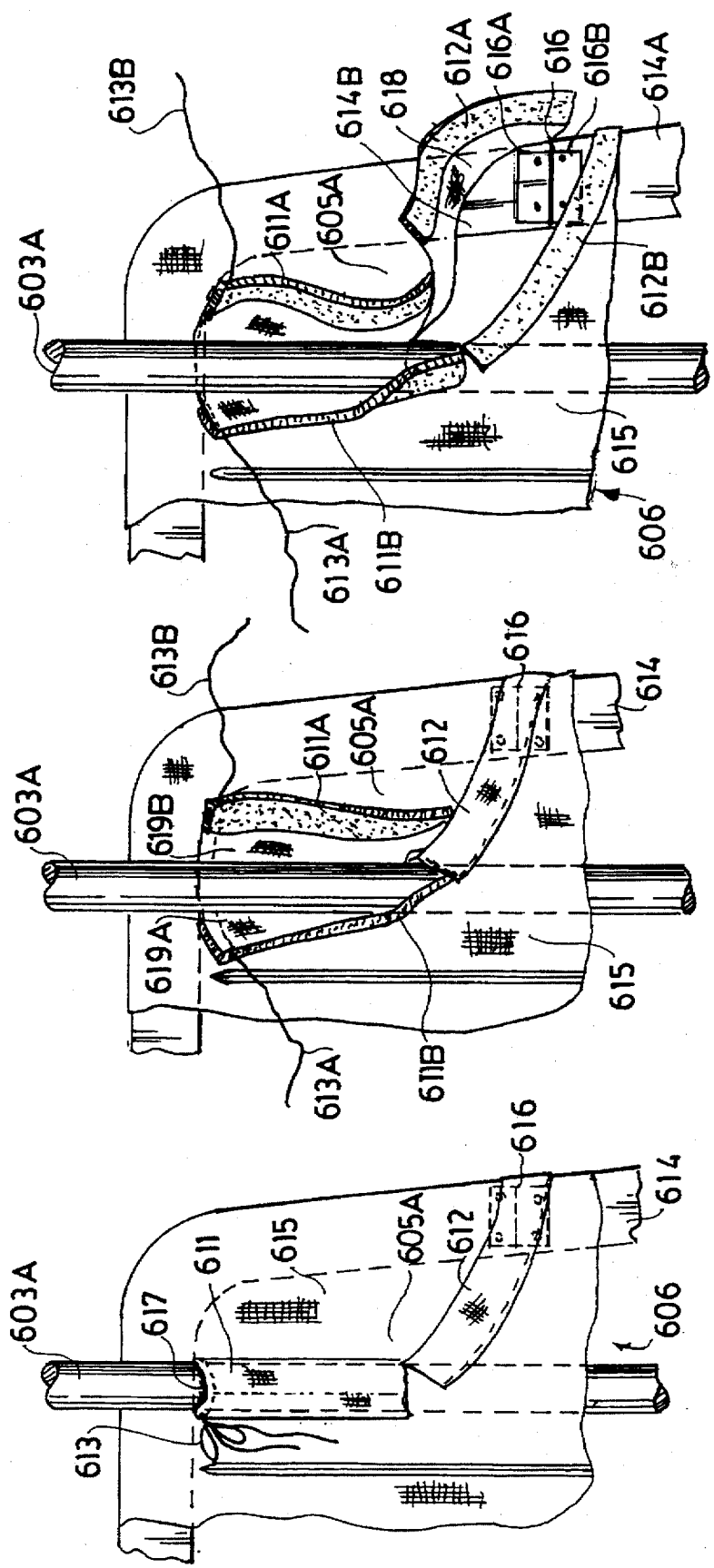

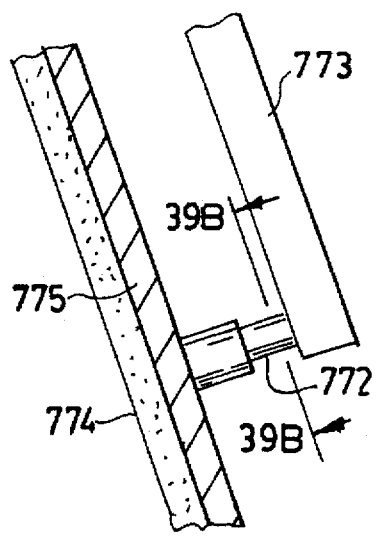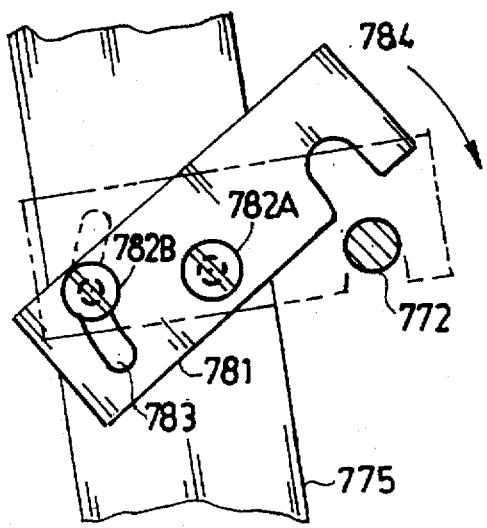
FIG. 39A
FIG. 39B
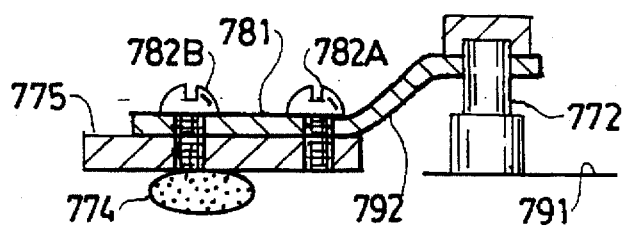
FIG. 39C
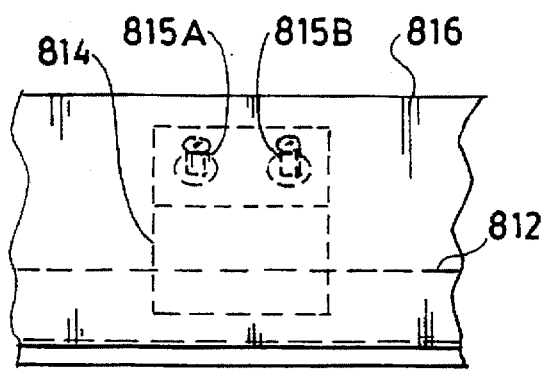
FIG. 40A
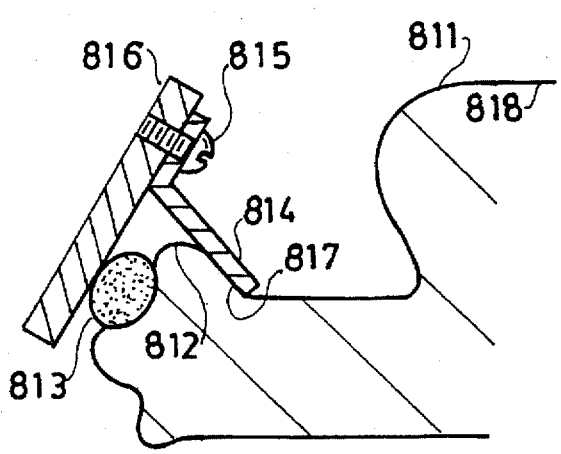
FIG. 40B

ENCLOSURES AND ACCESSORIES FOR SPORT UTILITY VEHICLES, VANS, AND MINIVANS

CROSS REFERENCE TO RELATED PATENT APPLICATIONS

This application is a continuation in part of my application U.S. Ser. No. 08/400,371, filed Mar. 8, 1995, now U.S. Pat. No. 5,582,456 which is a continuation in part of my application U.S. Ser. No. 08/137,635, filed Oct. 18, 1993, which is now U.S. Pat. No. 5,417,469.

FIELD OF THE INVENTION

A modular system for camping in a sport utility vehicle, van, or minivan which contains a tent-like enclosure which can be fitted over the vehicle liftgate opening, or side door opening, or tailgate and its associated opening at the rear of the vehicle.

BACKGROUND OF THE INVENTION

Devices which are secured to the rearward portion of motor vehicles for the purpose of recreational camping within the vehicles are well known to those skilled in the art. However, to the best of the applicant's knowledge, no such device or set of devices is available which provides adequate protection from adverse weather conditions, can be easily installed on the vehicle, requires no modifications or additions to the vehicle, and is capable of being easily stored and transported in a compact transporting container.

One prior art camping device was described in July of 1993 in U.S. Pat. No. 5,226,689 of Roe et al. In discussing the problems of conventional tent camping, Roe et al. disclosed (at column 1) that " . . . erecting the tent was usually a lengthy process, often quite complicated." Roe et al. further disclosed (at column 1) that a number of problems exist with prior art camping devices which attach to motor vehicles; among the problems are that " . . . they are not easily erected or taken apart . . . ", and " . . . they do not appear to provide adequate weather-proofing and water leakage and drainage control."

However, the apparatus proposed by Roe et al. in response to these problems is itself a complicated system, which requires a multi-component tube frame assembly, a seal to be joined to the external surface of the vehicle, provisions for sealing around the vehicle's spare tire rack, and a vertical support pole for extending the uppermost portion of the canvas enclosure into a steeple shaped configuration.

It would appear that the apparatus of the Roe et al. patent is not easily erected due to the complex nature of the tube frame which must be fitted together from subassemblies prior to the installation of the fabric covering to the vehicle. Furthermore, it appears that the frame assembly has an adverse effect on the vehicle tailgate paint finish on which it rests, causing mars and scratches to the finish. The durability of the frame assembly when subjected to the repeated rigors of camping also appears to present a problem.

Furthermore, it does not appear that the apparatus of the Roe et al. patent provides adequate protection from adverse weather conditions typically encountered when camping. The apparatus of this patent employs a rubber gasket sealing material attached to the canvas enclosure along its forwardmost edge which is in contact with the roof and sides of the vehicle toward the rearward portion of the vehicle. However, in practice, the surface of this particular portion of many motor vehicles intended for use of this apparatus is very often of an irregular and discontinuous nature because of such features as ribbing of the roof surface for structural strength, rain gutters at the edges of the vehicle roof, framing of the vehicle windows, fitting of the vehicle with decorative trim, moldings and accessories such as roof mounted luggage racks, and the like. The rubber gasket sealing means which is secured to the vehicle by the tension of elastic cords in the system of this patent is not likely to properly conform to these numerous surface irregularities.

Additionally, it appears that, when exposed to rain, the steeple-like configuration of the apparatus of the Roe et al. patent directs a large portion of accumulated rain water into contact with the rubber gasket sealing means, causing significant leakage of rain into the vehicle, particularly in the presence of wind directed toward the rearward portion of the vehicle.

The spare tire rack seal disclosed by Roe et al. (at column 5 of their patent) is yet another feature which is likely to result in a leakage of water into the interior of the vehicle, as this seal employs " . . . a synthetic fuzzy fabric that adheres to a mating hook fabric when pressed together." The use of these "VELCRO" fabric components is well known to those skilled in the art of camping equipment design; however, these fabric fastening components are not used in weather sealing applications because the manner in which they join to each other does not provide a seal which excludes the flow of liquids.

The Roe et al. patent is the most recent attempt of which applicant is aware to provide a satisfactory modular system for camping in a sport utility vehicle, and it is far from perfect. However, the system of Roe et al. was superior in many respects to earlier systems described in the prior art.

One such earlier system is described in 1985 in Mary Gunn's U.S. Pat. No. 4,544,195. The Gunn patent discloses a tent-like apparatus which encloses the opening at the rearward portion of a vehicle, including the vehicle tailgate mechanism. However, the device of this patent requires that the vehicle have a rear window which is hinged along the rear roof line and swings outward and upward in order to provide structural support for the tent enclosure and that Gunn's tent-like enclosure be secured to the roof and sides of the vehicle with a series of snaps. Thus, the Gunn apparatus appears to lack sufficient sealing means adequate to prevent leakage of wind and precipitation from entering the vehicle.

Yet another prior art device was disclosed by Robert Straub in 1985 in his U.S. Pat. No. 4,504,049. The device of Straub is suitable only on those vehicles which have a large hatchback that is hinged along the rearward roof line of the vehicle and swings upward to its open position. In an attempt to provide adequate reclining space to occupants of the vehicle, the Straub apparatus requires a rigid panel of material which is fitted to the rear of the vehicle along the lower line of the hatchback opening. Furthermore, the tent-like enclosure portion of the Straub device must be contacted with the vehicle along the rearward roof and side panels of the vehicle. Thus, the Straub device suffers from the same disadvantages as the device of the Roe et al. patent; it does a poor job of excluding rain and wind.

None of the prior art devices known to the applicant include a means for providing additional ventilation from the forward portion of the vehicle on which the device is used. Furthermore, the prior art devices do not include a means for conveniently storing and transporting all system components fitted to the vehicle for the purpose of camping.

It is therefore an object of this invention to provide a camping apparatus to be attached to a sport utility vehicle, van, or minivan which is easy to erect and secure to the vehicle.

It is another object of this invention to provide a camping apparatus to be attached to a sport utility vehicle, van, or minivan which provides adequate protection from inclement weather.

It is a further object of this invention to provide a camping apparatus to be attached to a sport utility vehicle, van, or minivan which is lightweight and can be collapsed into a compact shape for easy storage and transportation.

It is another object of this invention to provide a camping apparatus to be attached to a sport utility vehicle, van, or minivan which encloses the tailgate of the vehicle or the liftgate opening of the vehicle, thereby providing occupants of the vehicle with adequate room to recline.

It is another object of this invention to provide a camping apparatus to be attached to a sport utility vehicle, van, or minivan which allows easy entry into and exit from the rearward portion of the vehicle.

It is another object of this invention to provide a camping apparatus to be attached to a van, or minivan which allows easy entry into and exit from the side door opening of the vehicle.

It is an additional object of this invention to provide a camping apparatus to be attached to a sport utility vehicle, van, or minivan which requires no structural modifications or additions to the vehicle and which does not adversely affect the paint finish of the vehicle.

It is a further object of this invention to provide a camping apparatus to be attached to a sport utility vehicle, van, or minivan which provides superior ventilation within the vehicle while excluding inclement weather and flying insects.

It is another object of this invention to provide a camping apparatus to be attached to a sport utility vehicle, van, or minivan which does not require that a portion of the apparatus be enclosed or sealed around a spare tire rack or luggage rack.

It is another object of this invention to provide a camping apparatus to be attached to a sport utility vehicle, van, or minivan containing an awning which provides protection from sun and rain immediately adjacent to the vehicle.

It is an additional object of this invention to provide a camping apparatus to be attached to a sport utility vehicle, van, or minivan which includes a lightweight bag for the storage and transportation of all parts of the apparatus.

It is an object of this invention to provide a camping apparatus to be attached to a sport utility vehicle, van, or minivan which is inexpensive to manufacture.

SUMMARY OF THE INVENTION

In accordance with this invention, there is provided an apparatus for camping in a sport utility vehicle, van, or minivan comprised of a tent-like enclosure joined to a fixturing plate which is secured to the rearward portion or the sideward portion of the vehicle, an awning which is joined to the tent-like enclosure and extends outwardly from the rearward or the sideward area of the vehicle, a pair of ventilation windows which are fitted to the window openings of the vehicle, and a fabric bag for the transportation of all of the above components.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 20A is a cross sectional view showing means to fit and secure the fabric of the tent like enclosure of FIG. 18 to the fixturing plate of FIG. 19.

FIG. 20B shows an alternative means to fit and secure the fabric of the tent-like enclosure of FIG. 5 to the fixturing plate of FIG. 2.

FIG. 21 is a perspective view of the tent-like enclosure of FIG. 18 joined to the fixturing plate of FIG. 19.

FIG. 23A is a side cross sectional view of the fixturing plate of FIG. 19, with fastening means for securing the fixturing plate to the vehicle.

FIG. 23B is an enlarged view of one means for securing the fixturing plate of FIG. 19 to the vehicle.

FIG. 23C is an enlarged view of hinge and removable pin means for securing subsections of the fixturing plates of FIG. 19, FIG. 2, and FIG. 17 to each other.

FIG. 26A is a cross-sectional view of an alternative embodiment of applicant's ventilation window of FIGS. 10 through 14, with a fabric piece which excludes rain and which can be raised and lowered from inside the vehicle, with said fabric piece shown in the raised position.

FIG. 26B is a cross-sectional view of an alternative embodiment of applicant's ventilation window of FIGS. 10 through 14, with a fabric piece which excludes rain and which can be raised and lowered from inside the vehicle, with said fabric piece shown in the lowered position.

FIG. 26C is a side view of applicant's ventilation window of FIG. 26A.

FIG. 26D is a side view of applicant's ventilation window of FIG. 26B.

FIG. 28H is a bracket attached to the ventilation window which supports the ventilation window vertically.

FIG. 28I is an alternative embodiment of the bracket of FIG. 28H which is made as an integral portion of the ventilation window frame.

FIG. 28J is an alternative embodiment of a ventilation window comprised of means to compress said ventilation window against the vehicle window gasket using resilient foam blocks, with said foam blocks shown in an uncompressed state.

FIG. 28K shows the foam blocks of the ventilation window of FIG. 28J engaged with the vehicle window glass, compressing the ventilation window of FIG. 28J against the vehicle window gasket.

FIG. 32B is a detailed view of a sleeve of the camping enclosure of FIG. 32A, showing the passage of a liftgate supporting strut of the vehicle through said sleeve.

FIG. 32C is a view of the sleeve of FIG. 32B, shown in a partially disassembled state.

FIG. 32D is a view of the sleeve of FIG. 32B, shown in a fully disassembled state.

FIG. 39A is a cross-sectional view of the spatial relationship between the vehicle rear opening gasket, the applicant's fixturing plate, and a typical liftgate support strut mounting stud or shock absorbing stud located near the vehicle rear opening.

FIG. 39B is a top view of a rotatable bracket which secures applicant's fixturing plate to the liftgate support strut mounting 'stud or shock absorbing stud of FIG. 39A.

FIG. 39C is a cross-sectional view of the rotatable bracket of FIG. 39B secured to applicant's fixturing plate and engaged with the liftgate'support strut mounting stud or shock absorbing stud of FIG. 39A.

FIG. 40A is an elevation view showing the spatial relationship of a V-shaped bracket to the applicant's fixturing plate and to the vehicle liftgate of rear window gasket and nearby ridge structure.

FIG. 40B is a side view showing the V-shaped bracket of FIG. 40A supporting the applicant's fixturing plate.

DESCRIPTION OF THE PREFERRED EMBODIMENTS

Figure 1:
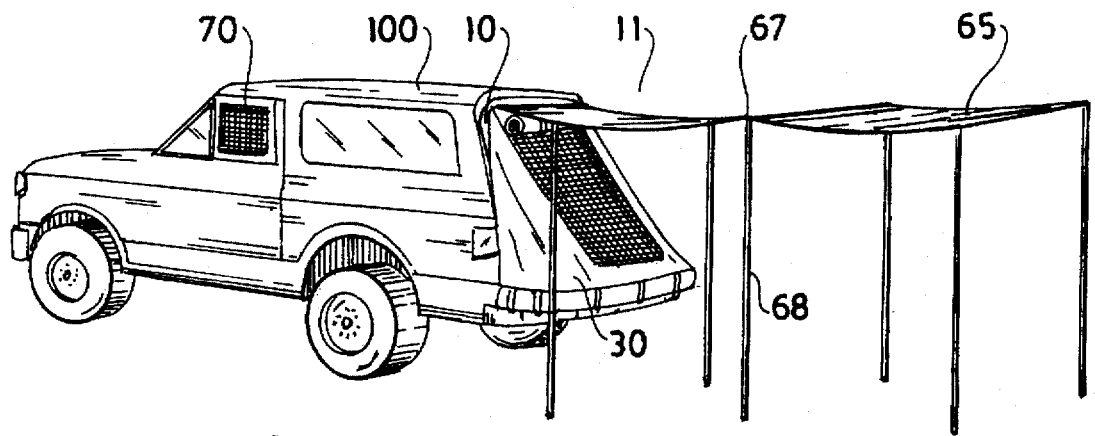
FIG. 1 is a perspective view of the preferred embodiment of the tent-like enclosure, the awning, and ventilation windows of the applicant's invention shown attached to the vehicle.

FIG. 1 is a perspective view of one preferred embodiment of the applicant's invention shown attached to the vehicle.

Referring to FIG. 1, it will be seen that applicant's modular apparatus 11 is preferably comprised of a tent-like enclosure 30 joined to a fixturing plate 10 which is secured to the rearward portion of the vehicle 100. In the preferred embodiment illustrated in FIG. 1, applicant's modular apparatus 11 also is comprised of an awning 65 which is joined to the tent-like enclosure 30 and extends outwardly from the rearward area of the vehicle, and, additionally, a pair of ventilation windows 70 (shown, for the sake of simplicity, on only one side of vehicle 100) which are fitted to the window openings of the doors of the vehicle.

As will be apparent to those skilled in the art, the modular system 11 of this invention is especially suitable for use on a recreational vehicle of the type with a rear tailgate and rear sliding glass window retractable into said tailgate and hinged directly above the bumper of the vehicle to pivot from an upright closed position downward to a horizontal open position. This type of recreational vehicle is well known to those skilled in the art and is described, e.g., in U.S. Pat. No. 5,226,689 of Richard P. Roe et al., the entire disclosure of which is hereby incorporated by reference into this specification.

As is known to those skilled in the art, the "Bronco" recreational vehicle is a sport utility vehicle which is sold by the Ford Motor Company of Dearborn, Mich. and which has a rear tailgate and rear sliding glass window retractable into said tailgate and hinged directly above the bumper of the vehicle to pivot from an upright closed position downward to a horizontal open position. The "4-RUNNER" sold by the Toyota Motor Company also is a sport utility vehicle which has a rear tailgate and rear sliding glass window retractable into said tailgate and hinged directly above the bumper of the vehicle to pivot from an upright closed position downward to a horizontal open position. Up until at least as late as 1992, the "BLAZER" sold by the Chevrolet Division of the General Motors Corporation also was a sport utility vehicle which had a rear tailgate and rear sliding glass window retractable into said tailgate and hinged directly above the bumper of the vehicle to pivot from an upright closed position downward to a horizontal open position. Those skilled in the art will be aware of other vehicles with this configuration.

Figure 2:
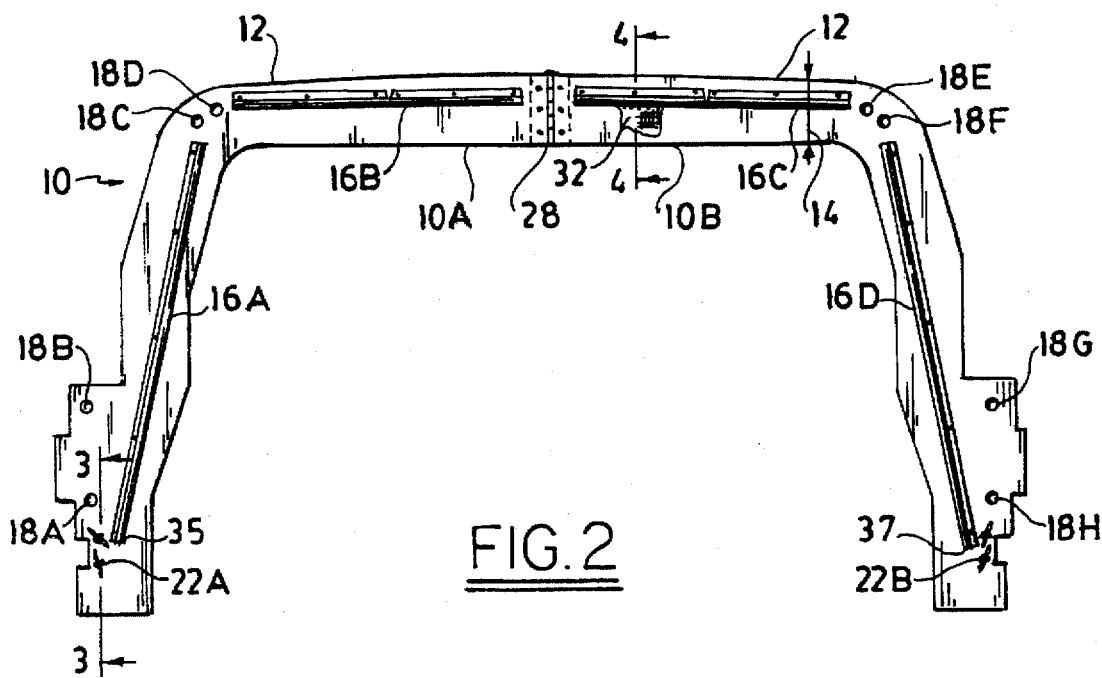
FIG. 2 is an elevation view of the fixturing plate used to secure the tent-like enclosure to the rear of the vehicle.

FIG. 2 is an elevation view of a fixturing plate 10 used to secure the tent-like enclosure 30 (see FIG. 1) to the rear of the vehicle 100 (see FIG. 1).

Referring to FIG. 2, said fixturing plate 10 preferably is a substantially U-shaped structure which, in one embodiment, preferably consists essentially of rigid, light weight plastic such as high density polypropylene, high density polyethylene, nylon, or other suitable plastic. These plastic materials are well known to those skilled in the art and are described, e.g., in the "Modern Plastics Encyclopedia," which is the mid-October 1991 issue of "Modern Plastics" (Volume 68, No. 11) published by Modern Plastics of P.O. Box 481, Highstown, N.J.

As is known to those skilled in the art, sheets of such plastic may be commercially purchased, cut to the desired size and shape, affixed with the required orifices, and secured to the appropriate fixtures. Thus, by way of illustration, one may purchase a sheet of high-density polypropylene which is 3.0'×6.0' by ¼" from the Cadillac Plastics and Chemical Company of 1328 University Avenue, Rochester, N.Y.

Alternatively, or additionally, fixturing plate 10 may be comprised of aluminum, plywood, composite material, and/or other rigid material, preferably in sheet form.

In one preferred embodiment, fixturing plate 10 is preferentially of a thickness which is at least as thick as the thickness of the tailgate window of the vehicle 100 (see FIG. 1). Thus, for example, when the tailgate window of vehicle 100 is 0.25 inches thick, one may, e.g., use a fixturing plate which is at least about 0.25 inches thick. In general, it is preferred that the thickness of plate 10 be from about 0.2 to about 0.4 inches.

Figure 4:
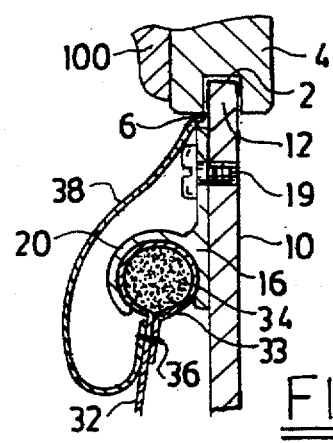
FIG. 4 is a detailed section view of awning rail means adapted to secure the tent-like enclosure to the fixturing plate of FIG. 2.

Referring again to FIG. 2, and also to FIG. 4 when the fixturing plate 10 is secured to the vehicle 100 (see FIG. 1), the upper edge 12 of said fixturing plate 10 is inserted into the gasket groove 2 of the tailgate window gasket 4 existing at the rear of the vehicle 100. Said gasket groove 2 is normally used for the purpose of providing a seal around the edge of the tailgate window when said window (not shown) is in its closed (raised) position. Thus both securing of the fixturing plate 10 and sealing of the fixturing plate 10 is achieved when said fixturing plate 10 is inserted into said gasket groove 2.

Referring again to FIG. 2, the fixturing plate 10 preferably has an upper edge 12 has a shape which is identical or substantially identical to the upper edge (not shown) of the tailgate window of the vehicle; thus, in the embodiment depicted in FIGS. 1 and 2, fixturing plate 2 is substantially thus crescent shaped.

Referring again to FIG. 2, the width 14 along any section of said crescent shape fixturing plate 10 preferably ranges from about between 2 and 4 inches. In one embodiment of the applicant's fixturing plate 10, the use of 0.25 inch thick high density polypropylene with a width 14 of 3-4 inches along said crescent shaped fixturing plate 10 was found to provide adequate structural strength, light weight, and effective sealing from adverse weather when fitted to said tailgate window gasket groove 2 of the vehicle 100.

Referring again to FIG. 2, awning rails 16A, 16B, 16C, and 16D and snaps 18A, 18B, 18C, 18D, 18E, 18F, 18G, and 18H may be affixed to fixturing plate 10 and are used as means to secure the tent-like enclosure 30 to the fixturing plate 10. Mating snaps are provided to be joined with snaps 18A through 18H at the corresponding points of contact of the tent-like enclosure 30 to the fixturing plate 10.

Fixturing plate 10 is comprised of a multiplicity of awning rails 16A et seq. adapted to receive and secure the tent like enclosure 30. These awning rails are well known to those skilled in the art and are commonly used in camping equipment and recreational vehicle design to secure flexible fabric to a rigid surface. They are readily commercially available and may be purchased from, e.g., Bethany Trailers of Webster, N.Y.

The use of awning rails 16A through 16D is illustrated in detail in FIG. 4. Referring to FIG. 4, which illustrates one embodiment of applicant's invention, awning rail 16 is secured to fixturing plate 10 via screw 19. Alternatively, said awning rail 16 could be suitably secured to said fixturing plate 10 via rivets, adhesive, or other fastening means well known in the art.

The tent like enclosure 30 which is secured by the awning rail 16 may be fabricated by conventional means. Thus, in the construction of the tent-like enclosure 30 of FIG. 1, the fabric 32 shown in FIG. 4 is wrapped around a flexible cord 34 and joined unto itself via stitching 36, thereby enclosing cord 34 in a loop 33 of fabric 32.

The particular awning rail illustrated in FIG. 4 is fabricated with a solid arc shaped section 20 encompassing approximately 270 degrees of circular arc; the diameter of said arc shaped section 20 is slightly greater than the diameter of said cord 34.

During the securing of the tent-like enclosure 30 of FIG. 1 to the fixturing plate 10, the loop of fabric 32 enclosing the flexible cord 34 is fitted along the inside of the awning rail, thus joining the fabric to the awning rail in a manner well known in the art of camping equipment and recreational vehicle design.

Referring again to FIG. 2, the length of cord 34 of FIG. 4 enclosed in said loop of fabric 32 of FIG. 4 extends from the lower extremity 35 of awning rail 16A, upward along awning rail 16A, horizontally along awning rails 16B and 16C, and downward along awning rail 16D, to lower extremity 37. The tent-like enclosure 30 is thus fastened to the fixturing plate 10 along the entire length of the awning rails 16A through 16D. The tent-like enclosure 30 may be further secured to the fixturing plate 10 via snaps 18A through 18E.

It will be apparent to those skilled in the art that other configurations of awning rail(s) may be used to secure the tent-like enclosure 30. Thus, e.g., one may use a single continuous strip of awning rail around said fixturing plate of FIG. 2.

The awning rail 16 (see FIG. 4) can consist essentially of aluminum, plastic, or other suitable material, and said awning rail may be molded as an integral part of said fixturing plate in manufacturing of said fixturing plate. Furthermore, instead of using said one or more of said awning rails 16 to secure enclosure 30, one may use devices such as closely spaced snap means, rivets, sewing means, fuzzy fabric and hook mating fabric means, etc. The use of the awning rail(s) is preferred because disassembly of said tent-like enclosure 30 from the fixturing plate 10 of FIG. 1 is easily achieved, thus making laundering, repair, etc. of said tent-like enclosure 30 convenient.

The use of the awning rail means is one preferred means because a complete seal of the tent-like enclosure 30 of FIG. 1 to the vehicle is achieved. Thus, e.g., referring again to FIG. 4, an additional short flap of fabric 38 may be sewn onto the fabric 32 of the tent-like enclosure; and, during installation of said enclosure on the vehicle, after said fixturing plate 10 is fitted into groove 2 of tailgate window gasket 4, said flap of fabric 38 may be tucked into recessed area 6 along the entire length of the tailgate window gasket 4.

Alternative means may also be used to secure the tent like enclosure 30 of FIG. 1 to the fixturing plate 10 of FIG. 2. One alternative means is depicted in FIG. 20B.

Referring to FIG. 20B, applicant's fabric enclosure is comprised of an outer section of fabric 150 and an inner section of fabric 151 which are joined at a seam 152 by thread 153 or other suitable means. The construction of enclosure 30 is such that inner surface 151 is joined to outer surface 150 around a substantial portion of the perimeter of the fixturing plate 10. Inner surface 151 is also dimensioned to be of approximately the same width as fixturing plate 10, (of the order of several inches) such that inner surface 151 forms a pouch-like enclosure around fixturing plate 10 around a substantial portion of its perimeter.

Referring again to FIG. 20B, when the fixturing plate 10 and fabric enclosure 30 are inserted into tailgate gasket groove 2 when installing the applicant's modular apparatus on the vehicle, said fixturing plate 10 and fabric enclosure 30 are securely joined to each other without the use of additional fasteners.

This feature will enable lower product cost. If for some vehicles, additional fasteners are required, conventional fastening means for securing fabric to a flat surface may be used, such as snaps, or hook and barb mating fabrics.

Figure 3:
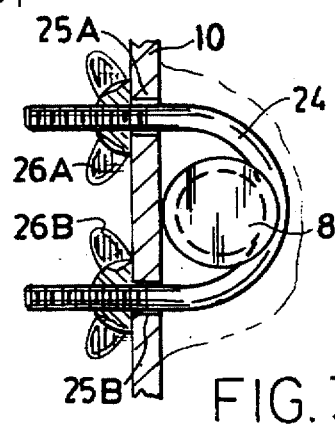
FIG. 3 is a detailed section view of U-bolt means adapted to secure the fixturing plate of FIG. 2 to the vehicle.

Applicant's fixturing plate 10 may be further secured to the vehicle 100 by fastener means 22A and 22B. FIG. 3 is a detailed sectional view illustrating wings nuts 26A and 26B which correspond to fastener means 22A and 22B (not shown in FIG. 3) and how such wing nuts 26A and 26B secure the fixturing plate 10 to the vehicle 100. Referring to FIG. 3, and in the preferred embodiment illustrated therein, U-bolt 24 extends through holes 25A and 25B in fixturing plate 10, and is secured to said fixturing plate 10 by wing nuts 26A and 26B. When the applicant's tent-like enclosure 30 is installed on the vehicle 100, U-bolt 24 is tightly secured around vehicle tailgate latch post 8 (see FIG. 3) by wing nuts 26A and 26B.

Thus, applicant's fixturing plate 10 is rigidly secured to the vehicle 100, with horizontal movement of the fixturing plate 10 prevented by insertion into the tailgate gasket groove 2 (see FIG. 4) of the vehicle 100, and by U-bolt means 26 (see FIG. 3); and vertical movement of said fixturing plate 10 is prevented by U-bolt means 24. As will thus be readily apparent to those skilled in the art, the fixturing plate 10 of applicant's modular system 11 may be readily attached to or removed from the vehicle 100 without the need to modify or add to the vehicle structure.

Applicant's tent-like enclosure 30 is compact and easily stored and can be readily transported when not installed on the vehicle 100.

Figure 15:
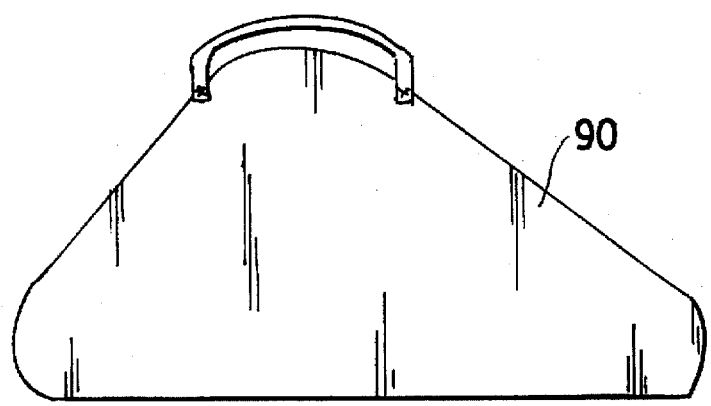
FIG. 15 is a side elevation view of the storage bag of the applicant's invention for the transportation and storage of the tent-like enclosure, windows, and awning of FIG. 1.

Referring again to FIG. 2, and in the preferred embodiment illustrated therein, the fixturing plate 10 is preferably fabricated in two halves 10A and 10B, and joined together by hinge 28. Consequently, when said fixturing plate 10 and the attached tent-like enclosure 30 are not installed on the vehicle 100, the two halves 10A and 10B can be pivoted onto each other by the operation of hinge 28. The collapsed apparatus (not shown) thus assumes a triangular shape, and can be stored and transported in the bag 90 (see FIG. 15).

Figure 17:
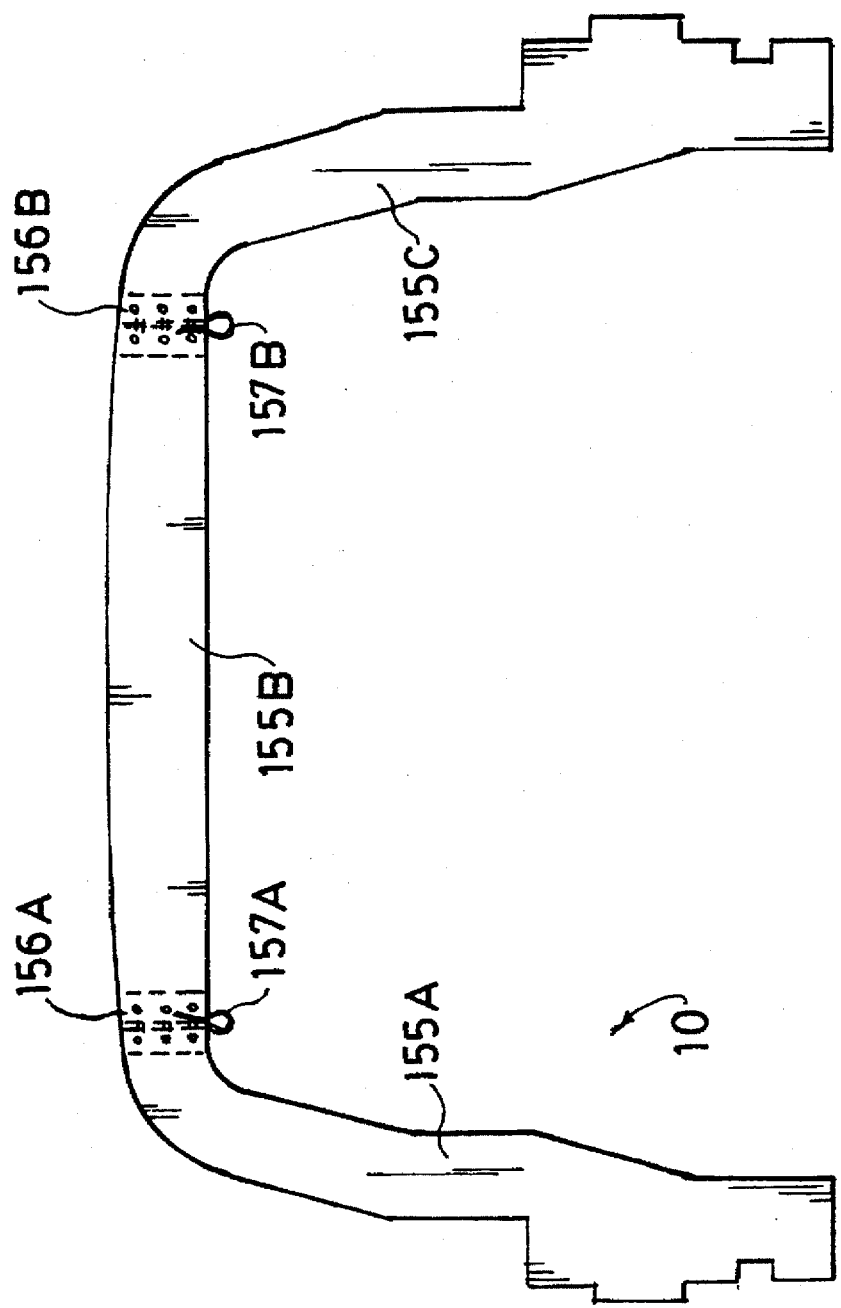
FIG. 17 is an alternative embodiment of applicant's U-shaped fixturing plate shown in FIG. 2.

Instead of, or in addition to hinge 28, one may use other means for attaching halves 10A and 10B. Thus, by way of illustration and not limitation, one may use a joint with a removable pin. Alternatively, or additionally, a plurality of hinges or joints may be provided on different portions of the fixturing plate to achieve even more compact storage of the apparatus. FIG. 17 depicts one alternative embodiment of applicant's fixturing plate.

Referring to FIG. 17, applicant's fixturing plate 10 is comprised of three subsections 155A, 155B, and 155C joined together by hinges 156A and 156B which are fitted with removable pins 157A and 157B. It will be readily apparent to those skilled in the art that when pins 157A and 157B are removed from hinges 156A and 156B, applicant's fixturing plate can be collapsed and stored in a substantially compact shape.

In one embodiment, not shown, means are provided for locking halves 10A and 10B into a substantially coplanar relationship after they have aligned into such relationship.

Figure 6:
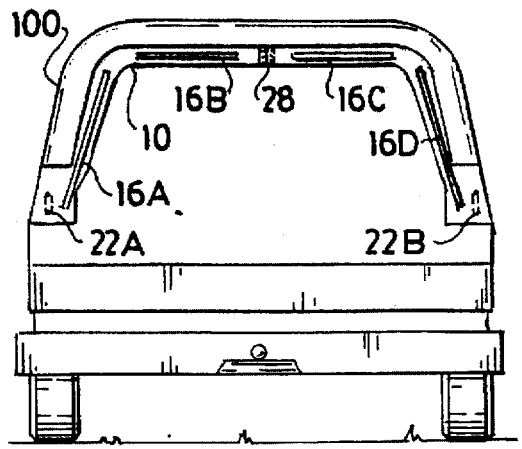
FIG. 6 is a rear elevation view showing the fit of the fixturing plate of FIG. 2 to the rear of the vehicle.
Figure 7:
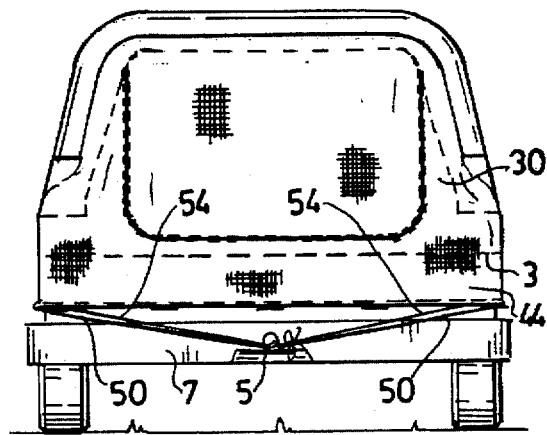
FIG. 7 is a rear elevation view showing the fit of the tent-like enclosure of FIG. 5 to the rear of the vehicle.

FIG. 6 is a rear elevation view showing the mounting of the fixturing plate 10 to the rear of the vehicle 100; in this FIG. 6, the tent-like enclosure 30 has been omitted for the sake of simplicity, it being apparent that, in practice, the applicant's tent-like enclosure 30 of FIG. 7 is installed on the vehicle as a complete assembly joined to the fixturing plate 10 of FIG. 6.

Figure 5:
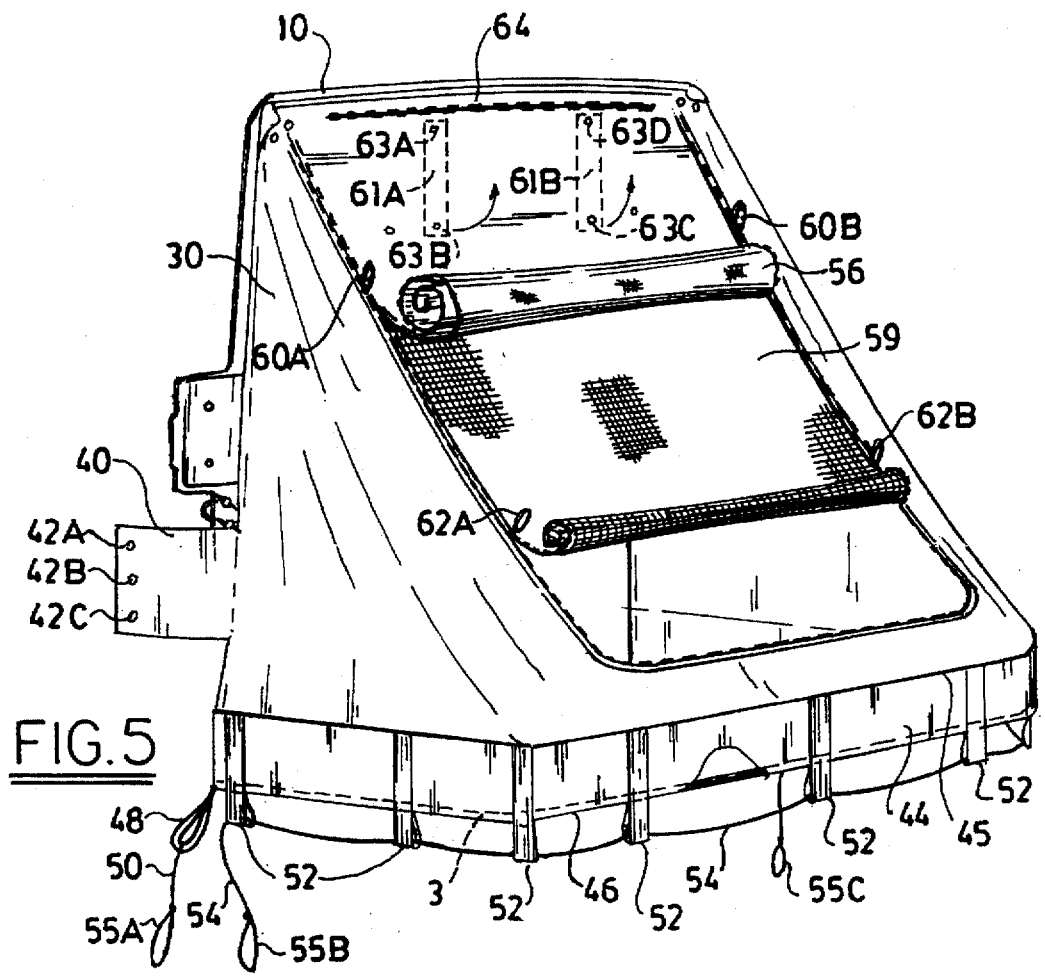
FIG. 5 is a perspective view of a preferred embodiment of the tent-like enclosure of FIG. 1 joined to the fixturing plate of FIG. 2.

FIG. 5 is a perspective view of one preferred embodiment of the tent-like enclosure 30 joined to the fixturing plate 10. FIG. 5 also depicts some preferred means of securing the tent-like enclosure 30 around the opened tailgate 3 of the vehicle 100, as well as numerous additional features of the tent-like enclosure 30.

The tent-like enclosure 30 may be constructed from any suitable weather and sunlight resistant fabric customarily used in the construction of camping tents. In one embodiment of applicant's invention, said tent-like enclosure 30 is constructed of acrylic polymer Sunbrella fabric, sold by Glen Raven Mills Inc., of Glen Raven, N.C. Alternatively, said tent-like enclosure could be constructed of nylon (a polyamide sold by E. I. Dupont Co.), Gore-Tex (a substantially water-proof fabric material sold by the W. L. Gore Inc.), and the like.

By way of further illustration, the weather-resistant fabric used in tent-like enclosure 30 may be one or more of the weather-resistant fabrics disclosed in U.S. Pat. Nos. 5,035,006, 4,977,719, 4,866,898, 4,843,994, and the like. The disclosure of each of these United States patents is hereby incorporated by reference into this specification.

Referring again to FIG. 5, the tent-like enclosure 30 may be further secured to the inner wall 1 (see FIG. 8) of the vehicle 100 adjacent to the tailgate opening by flaps of fabric 40 (see FIG. 5) on each side of the tent-like enclosure 30; for the sake of simplicity, only one such fabric flap 40 is shown in FIG. 5. To said flaps of fabric 40 are attached conventional fastening means, such as snaps 42A, 42B, and 42C. Alternatively, or additionally, other fastening means (such as a fuzzy fabric to be mated with a hook fabric) can also be used.

Figure 8:
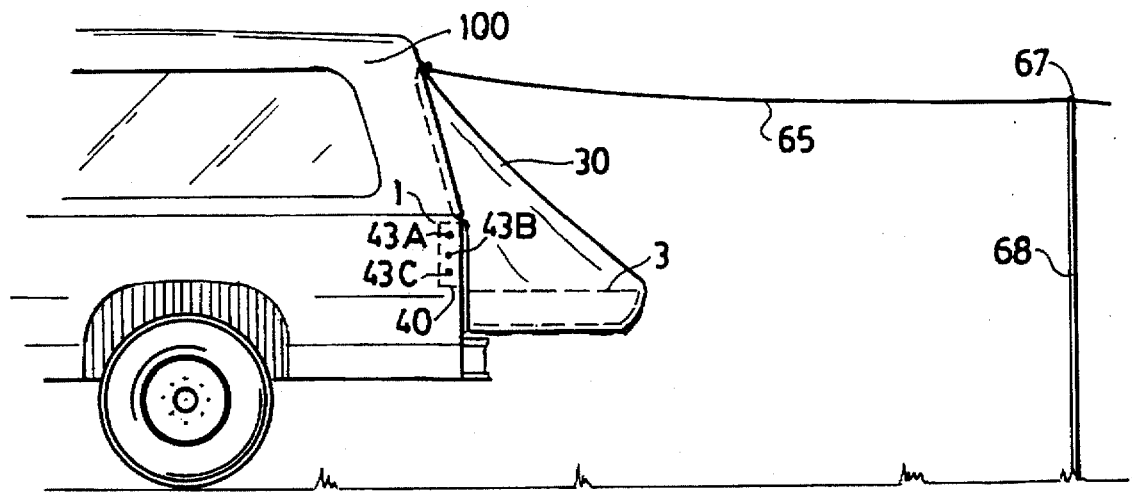
FIG. 8 is a side elevation view showing the fit of the tent-like enclosure of FIG. 5 and awning of FIG. 9 to the rear of the vehicle.

Referring to FIG. 8, in the corresponding position on the inner wall 1 of the vehicle 100, mating fasteners 43A, 43B, and 43C are suitably secured to inner wall 1, thereby enabling said flap of fabric 40 (shown in phantom) to be secured to said inner wall 1 of the vehicle 100.

The applicant's tent-like enclosure 30 may be further secured to the tailgate 3 of the vehicle 100 by additional fastening means, some of which are illustrated in FIG. 5. Referring to FIG. 5, a skirt of material 44 is provided at the base 45 of the tent-like enclosure 30 along the area of contact of said tent-like enclosure 30 which is in contact with the opened tailgate 3 of the vehicle, shown in phantom. At the lower extremity 46 of said skirt of material 44, an elastic cord (not shown) is sewn into a loop of fabric of the skirt of material 44. The elastic cord preferably extends around the lower perimeter of the skirt of material 44.

At several points at the lower extremity 46 of the skirt of material 44 which is closest in proximity to the vehicle, short loops of fabric 48 are suitably attached to the skirt of material 44. A length of cord 50 with a knotted loop 55A is tied to said short loop of fabric 48. A series of wide loops of fabric 52 are also suitably attached to said skirt of material 44 around its perimeter. Through said wide loops of fabric 52 is strung a length of cord 54 with knotted loops 55B and 55C formed in each end.

Referring to FIG. 7, it will be apparent that when said lengths of cord 50 and 54 of FIG. 5 are secured under tension to trailer ball 5 on vehicle rear bumper 7, said skirt of material 44 is snugly drawn around said opened tailgate 3 (shown in phantom). Alternatively, or additionally, said lengths of cord 50 and 54 could be secured to other points of attachment of vehicle rear bumper 7, or other points of the vehicle undercarriage.

Thus it will be apparent that said tent like enclosure 30 can be fully secured to the vehicle 100 in a manner which allows such enclosure 30 to exclude inclement weather. Additional features are preferably provided on applicant's tent like enclosure 30 for the convenience of use. Referring to FIG. 5, a fabric doorway 56 and screen 58 form the major area of the central portion 59 of the tent-like enclosure 30.

Doorway 56 and screen 58 may be opened by the operation of zippers 60A and 60B, and 62A and 62B, respectively. Fabric doorway 56 and screen 58 may be secured in a rolled up open position by fabric loops 61A and 61B which are fitted with snaps 63A, 63B, 63C, and 63D, or other joining means.

Thus, the doorway 56 and screen 58 may be positioned for easy entry into and exit from the vehicle, for maximum ventilation within the vehicle, and for maximum protection from inclement weather. The zippers 60A and 60B of said doorway 56 are fabricated with a narrow flap of material (not shown) which covers said zippers 60A and 60B and prevents leakage of water through the zippers 60A and 60B.

Figure 9:
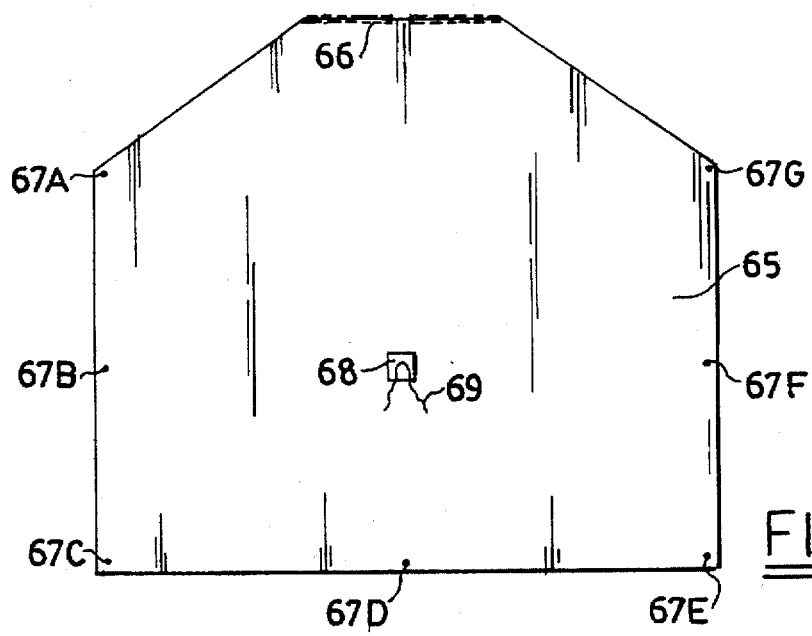
FIG. 9 is a plan view of one embodiment of the awning of applicant's invention.

FIG. 9 is a plan view of one embodiment of the fabric awning 65 used in the structure of FIG. 8. The fabric awning 65 can be constructed of the same variety of weather resistant fabric as previously described for applicant's tent-like enclosure 30, or it may be comprised of different material.

Referring to FIG. 9, fabric awning 65 is preferably equipped with zipper 66, grommets 67A through 67G, reinforcement patch 68 of fabric, and cord 69 suitably fastened to said reinforcement patch 68. To attach said fabric awning 65 to said tent like enclosure 30, zipper 66 of FIG. 9 is joined to zipper 64 of FIG. 5.

Referring again to FIG. 1, said awning 65 is fixed in a horizontal position behind the vehicle by the use of poles 68, which are fixed in position by the use of cords (not shown) tied to the poles 68 and tied to stakes in the ground (not shown).

Figure 10:
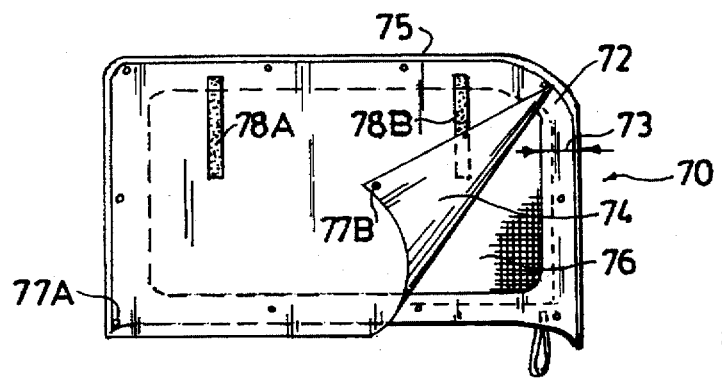
FIG. 10 is a view of the preferred embodiment of the ventilation window assembly of applicant's invention.

FIG. 10 is a perspective view of a preferred embodiment of the ventilation window assembly 70 of applicant's invention. Referring to FIG. 10, applicant's ventilation window 70 is preferably comprised of a fixturing plate 72, fabric covering 74, and screen 76. Fixturing plate 72 can be constructed of the same variety of materials as previously described for applicant's fixturing plate 10. Fabric covering 74 can be constructed of the same variety of weather resistant fabrics as previously described for applicant's tent-like enclosure 30.

Fabric covering 74 and screen 76 are suitably fastened to fixturing plate 72 by the use of conventional fastening means such as snaps, sewing, rivets, or the mating of a fuzzy fabric with a hook fabric. Fabric covering 74 can be rolled up and secured in a rolled up state by the use of strips of fuzzy fabric and hook fabric 78A and 78B to achieve maximum ventilation flow of air through the screen 76 of ventilation window 70.

In one embodiment of applicant's ventilation window 70, fixturing plate 72 was constructed of ⅛ inch thick high density polypropylene; the width 73 of fixturing plate 72 around the perimeter of said fixturing plate was 2 inches; fabric covering 74 was constructed of acrylic polymer canvas fabric; screen 76 was sewn to said fixturing plate 72 around the perimeter of said fixturing plate 72; and said fabric covering 74 was fastened to said fixturing plate 72 by sewing along upper edge 75, and by snaps 77A and 77B in the lowered position of said fabric covering.

Figure 11:
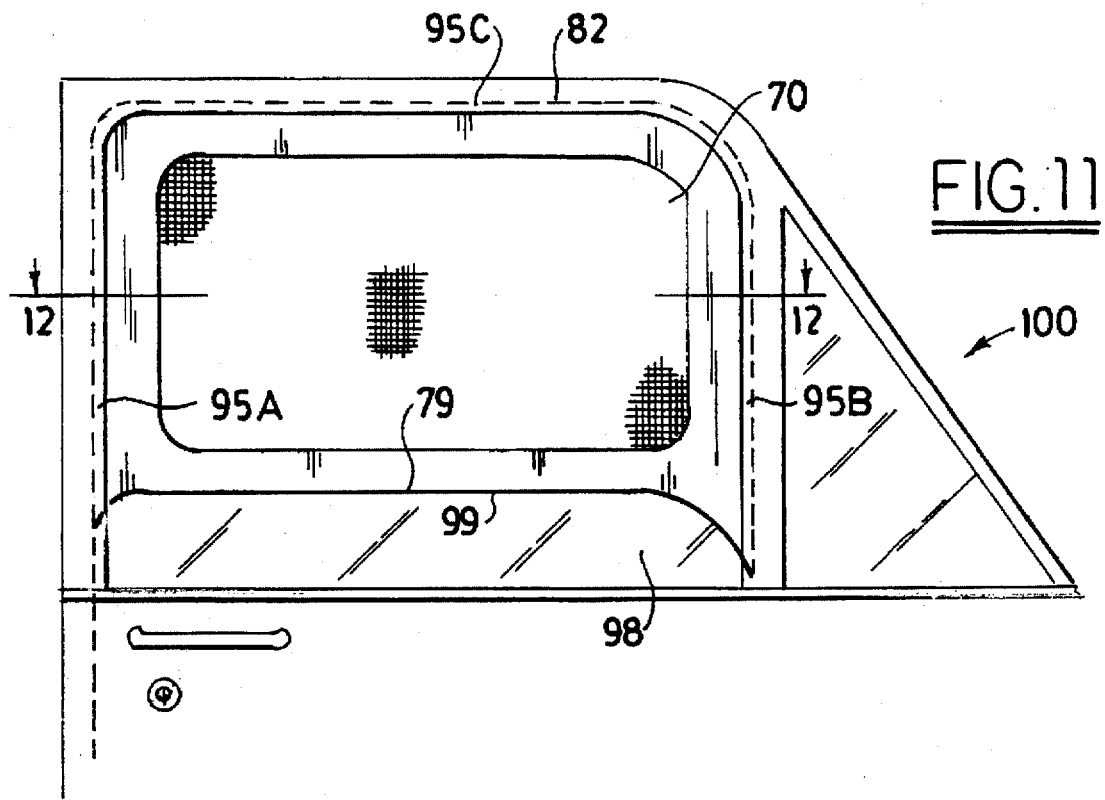
FIG. 11 is an elevation view of the ventilation window of FIG. 10 shown installed in the vehicle door.

FIG. 11 is an elevation view of the ventilation window 70 of FIG. 10 shown installed in the vehicle door, with the fabric covering 74 not shown for the sake of simplicity. The manner of installation of applicant's ventilation window 70 in the window opening of the vehicle door is shown in FIGS. 12 through 14.

Figure 12:
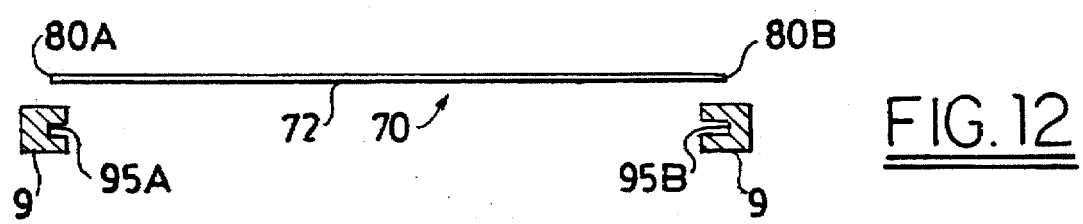
FIGS. 12, 13, and 14 is a section view of the ventilation window assembly of FIG. 10 depicting the sequence of installation of the assembly into the window gasket channel of the door of the vehicle.

Referring to FIG. 12, which is vertical sectional view taken along lines 12—12 of FIG. 11, ventilation window 70 is brought into close proximity to the door window gasket 9 of the vehicle 100.

Figure 13:
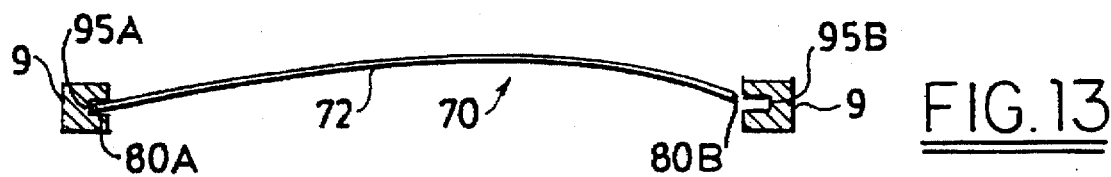
Figure 14:
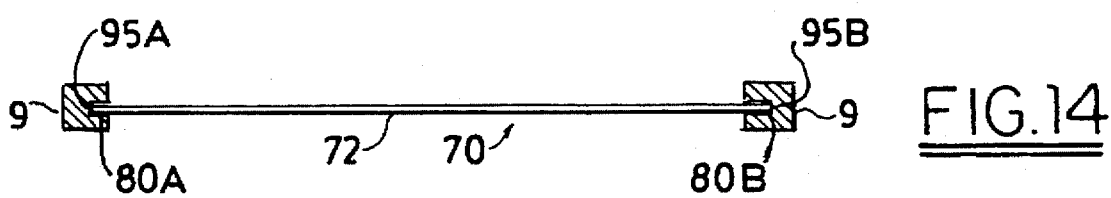

FIGS. 13 and 14 illustrate the mounting of the fixturing plate 72. Referring to FIG. 13, fixturing plate 72 edge 80A is inserted into door window gasket groove 95A and fixturing plate 72 is put under compression resulting in the temporary bending of fixturing plate 72. Fixturing plate 72 edge 80B is then inserted in door window gasket groove 95B, and the compressive force on fixturing plate 72 is then released. Fixturing plate 72 is thus fitted into door window gasket grooves 95A and 95B of FIG. 14 as shown.

Referring again to FIG. 11, ventilation window 70 is then slid vertically upward such that the upper edge 82 (shown in phantom) of fixturing plate 72 is fully inserted in the upper portion of the vehicle door window gasket groove 95C. To complete the installation of the ventilation window 70, the vehicle window 98 is raised until the upper edge 99 of said vehicle window 98 comes in snug contact with the lower edge 79 of the fixturing plate 72 of the ventilation window. The lower edge 79 of said fixturing plate 72 is dimensioned precisely the same as the upper edge 99 of the vehicle window 98, so that when the two edges 79 and 99 come into close contact, a good fit and seal of the ventilation window 70 to the vehicle door is achieved.

Referring again to FIG. 11, in a further embodiment of the applicant's ventilation window 70, a strip of gasket material 99A is fitted to the lower edge 79 of said ventilation window 70. Said strip of gasket material 99A may be of any soft compliant material typically used in sealing applications, such as neoprene or Buna N rubber, or polyurethane polymer. Said strip of gasket material 99A is typically made in an extruded shape which has a groove dimensioned to mate with the edge of the particular object which is to be fitted with said strip of gasket material.

FIG. 26A is a sectional view of one embodiment of the applicant's ventilation window which is fitted with a strip of gasket material.

Referring to FIG. 26A, a strip of gasket material 99A is fitted to fixturing plate 201 of ventilation window 270. Window glass 98 is moved into position such that edge 99 of window glass 98 is in compressive contact with strip of gasket material 99A, thereby achieving a satisfactory seal between ventilation window 270 and window glass 98.

Figure 16:
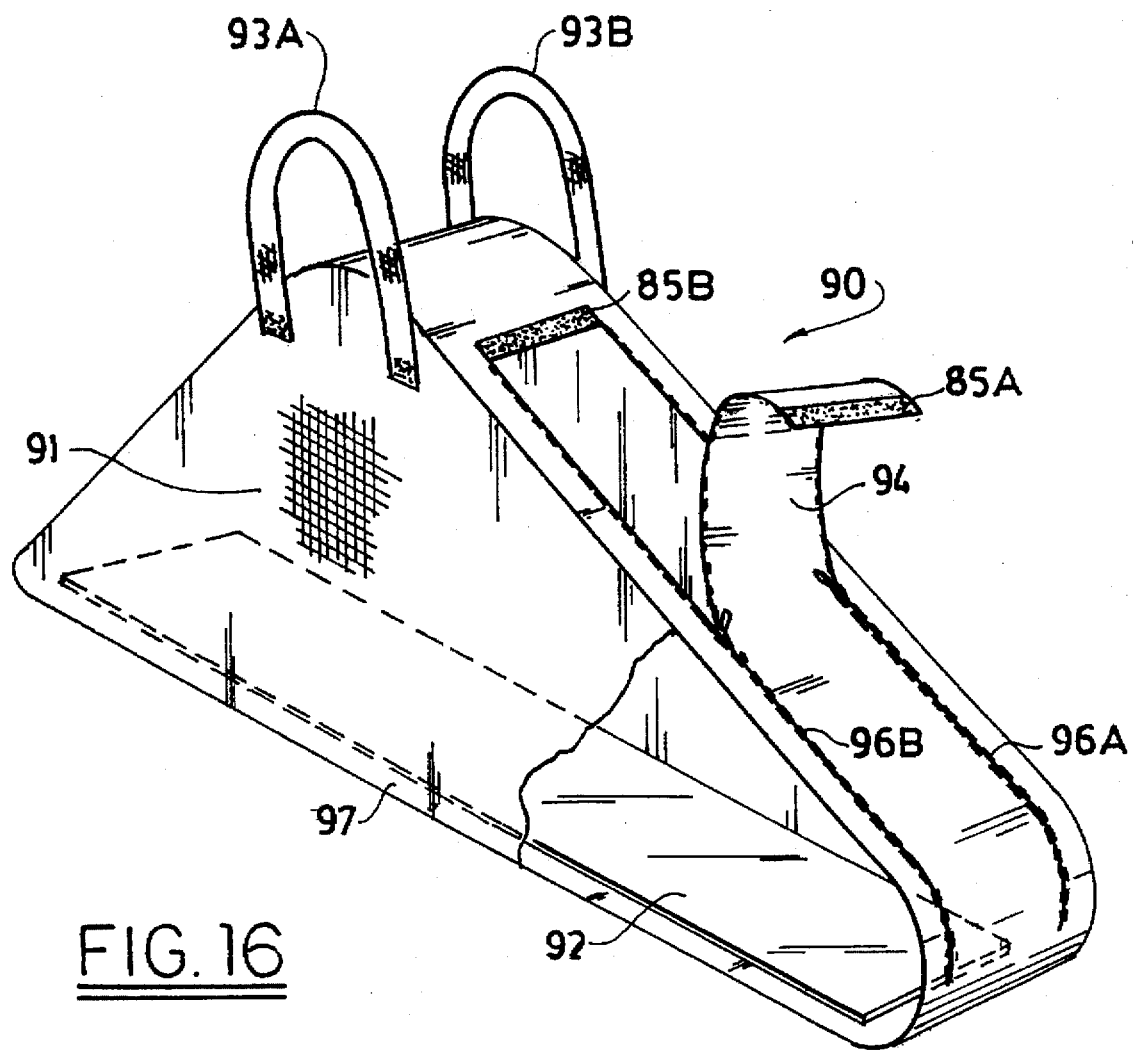
FIG. 16 is a perspective view of the storage bag of FIG. 15 showing the interior of the bag in phantom and via a cutaway section.

FIG. 16 is a perspective view of the bag 90 for the storage and transportation of applicant's tent-like enclosure 30, awning 65, ventilation windows 70, and accessories such as poles 68 and cords showing the interior of the bag in phantom and via a cutaway section. Referring to FIG. 16, said bag 90 is preferably comprised of fabric 91, support plate 92, handles 93A and 93B, and fabric opening flap 94. The various components of applicant's invention are placed in or taken from bag 90 through said fabric opening flap 94. Said fabric opening flap 94 is secured along its uppermost edge by fuzzy fabric strip 85A which attaches to hook fabric strip 85B, and said fabric opening flap 94 is opened and closed by the operation of zippers 96A and 96B. Support plate 92 is suitably fastened to the bottom 97 of said bag 90 to provide rigidity and structural strength to said bag 90.

The fabric 91 of said bag 90 can be constructed of the same variety of weather resistant fabrics as previously described for applicant's tent-like enclosure. Support plate 92 can be constructed of the same variety of materials as previously described for applicant's fixturing plate 10 of FIG. In one embodiment of applicant's bag 90 of FIG. 16, support plate 92 was constructed of ⅛ inch thick high density polypropylene; and the fabric 91 of said bag 90 was acrylic polymer canvas material.

Referring again to FIGS. 1 through 16, the manner of installation of the applicant's modular system for camping in a sport utility vehicle will now be described.

Installation is initiated by lowering the windows in the doors of the vehicle, unlatching the spare tire carrying rack from the tailgate of the vehicle (if said vehicle is so equipped) and swinging it around approximately 150 degrees to its open position, retracting the tailgate window into the tailgate, and lowering the tailgate from its closed vertical position to its open horizontal position. The tent-like enclosure 30, ventilation windows 70, and awning 65 of FIGS. 5, 10, and 9, respectively are removed from the bag 90 of FIG. 16. It should be noted that the procedure for installation is independent of whether the vehicle spare tire is carried inside or outside of the vehicle, as the outside spare tire carrier rack is entirely outside of the tent-like enclosure assembly and thus has no effect on the installation procedure.

Upon removal from bag 90 of FIG. 16, the fixturing plate 10 of FIG. 2 with the collapsed and rolled up tent-like enclosure 30 of FIG. 5 is unfolded from its stored configuration to its installed configuration by operation of the hinge 28 of FIG. 2. Both halves 10A and 10B of the fixturing plate 10 joined by the hinge 28 thus become coplanar and the fixturing plate 10 and collapsed tent-like enclosure 30 assume approximately a trapezoidal shape.

The upper edge 12 of the fixturing plate 10 of FIG. 2, having precisely the same contour as the upper edge of the tailgate window of the vehicle, is inserted into the elastomeric tailgate window gasket groove 2 of the vehicle shown in FIG. 4. Referring to FIG. 3, U-bolts 24 are then secured over tailgate door latch posts 8 via the tightening of wing nuts 26A and 26B. Referring to FIG. 5, with the fixturing plate rigidly secured to the vehicle, flaps 40 are secured to the interior side walls 1 of the vehicle 100 in FIG. 8 via a fuzzy fabric sewn into the flaps 40, and an adhesive backed mating fabric joined to the side walls 1 of the vehicle.

Referring again to FIG. 5, the skirt of material 44 of the tent-like enclosure 30 is drawn over the vehicle tailgate 3 shown in phantom. Referring to FIG. 8, loops 55A of cords 50 (only one side shown) and loops 55B and 55C of cord 52 are secured to the trailer ball 5 of the vehicle 100 and placed under tension.

Referring again to FIG. 5, the fabric doorway 56 and screen 58 beneath said window 56, being secured by zippers 60A and 60B, and 62A and 62B respectively, can be opened, closed, and positioned as desired for entry and exit of the vehicle and for the desired degree of ventilation and weather protection.

The installation of the awning 65 is now described. The awning 65 is unfolded and spread out behind the vehicle 100, with the zipper 66 of FIG. 9 along the edge of the awning 65 aligned immediately adjacent to the zipper 64 sewn into the exterior of the tent-like enclosure 30 of FIG. 5. Said zipper halves are joined together, securing the awning 65 to the tent-like enclosure 30 of FIG. 8. The installation is completed by inserting conventional tent poles 68 into grommets 67, and fixing the position of said tent poles 68 with ropes, elastic cords, and stakes.

The installation of applicant's ventilation window was thoroughly described previously in this specification. Installation of a matching ventilation window on the opposite side of the vehicle is accomplished via an identical procedure, as said windows are mirror images of each other.

Figure 18:
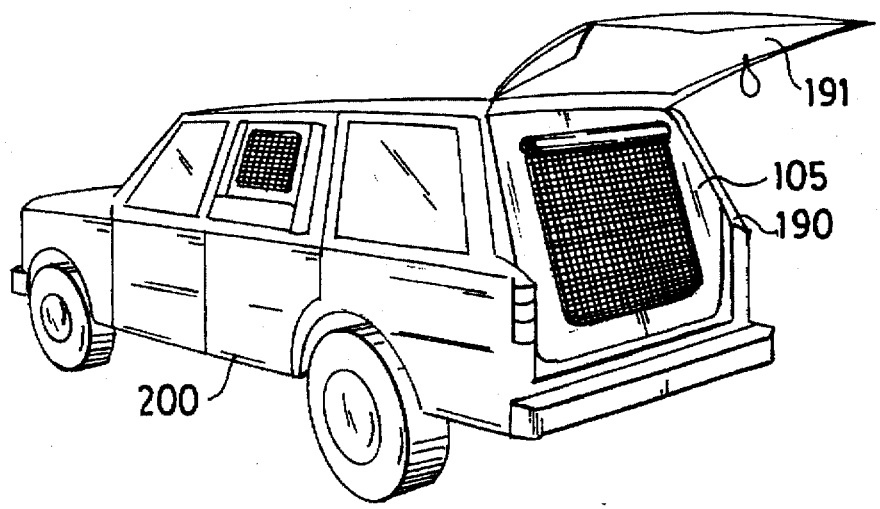
FIG. 18 is an alternative embodiment of applicant's tent-like enclosure, for vehicles which are fitted with a liftgate or cargo doors instead of a tailgate.

FIG. 18 is a preferred embodiment of the applicant's tent like enclosure which is designed for vehicles with a liftgate door, which is raised vertically as shown in FIG. 18, or for vehicles fitted with cargo doors which are hinged to the rear corners of the vehicle and swing open in a horizontal plane. Referring to FIG. 18, it will be seen that applicant's modular tent-like enclosure 105 is fitted to the rear opening 190 of the vehicle 200. Said rear opening 190 results from the raising of the liftgate 191 to the open position.

As will be apparent to those skilled in the art, the modular system 105 of this invention is especially suitable for use on a recreational vehicle of the type with a rear liftgate door which is hingably attached to the rear upper edge of the vehicle and swings open upwardly in a vertical plane; or a rear pair of cargo doors which are hingably attached to the rear corners of the vehicle and swing open in a horizontal plane.

As is known to those skilled in the art, the "Explorer" recreational vehicle is a sport utility vehicle which is sold by the Ford Motor Company of Dearborn, Mich. and which has a rear liftgate door. The "Cherokee" sold by the Chrysler Corporation also is a sport utility vehicle which has a rear liftgate door. The "Suburban" recreational vehicle is a sport utility vehicle which is sold by the Chevrolet Division of the General Motors Corporation and which has a rear pair of cargo doors which are hingably attached to the rear corners of the vehicle and swing open in a horizontal plane. Those skilled in the art will be aware of other vehicles which are manufactured with these configurations.

Figure 19:
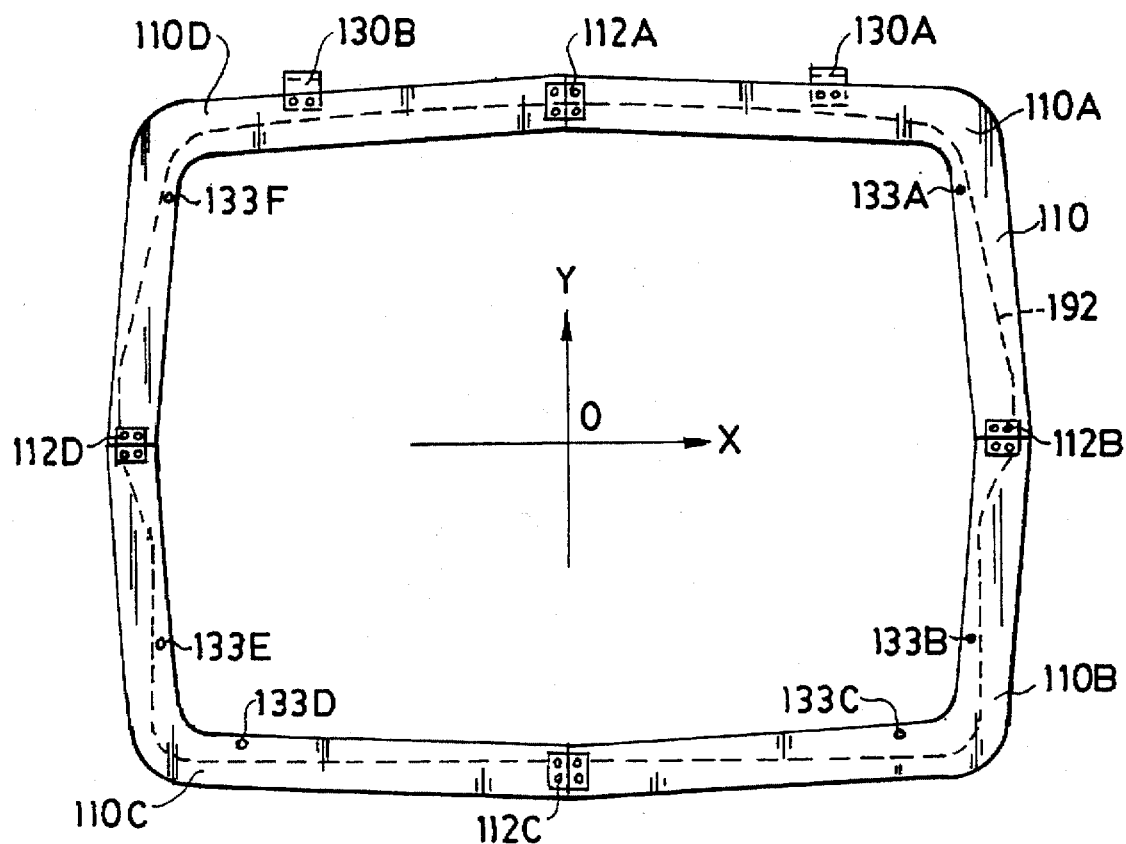
FIG. 19 is an elevation view of the fixturing plate used to secure the tent-like enclosure of FIG. 18 to the vehicle.

FIG. 19 is an elevation view of a fixturing plate 110 used to secure the tent like enclosure 105 (see FIG. 18) to the rear of the vehicle 200 (see FIG. 18).

Referring to FIG. 19, said fixturing plate 110 is approximately a quadrilateral shape structure, which is dimensioned to correspond to the approximately quadrilateral shaped opening 190 (see FIG. 18) at the rear of the vehicle 200 (see FIG. 18).

Referring again to FIG. 19, said fixturing plate 110 is preferably dimensioned to maintain continuous and complete contact with the liftgate weather seal gasket represented by dotted line 192, around the entire perimeter of the approximately quadrilateral shaped opening 190 (see FIG. 18) at the rear of the vehicle 200 (see FIG. 18). In this manner, a weather tight seal of the fixturing plate 110 is made with the rear opening gasket of the vehicle shown by dotted line 192, in a similar manner in which the liftgate 191 (see FIG. 18) is sealed against the weather seal gasket around the rear opening of the vehicle.

Referring again to FIG. 19, applicant's fixturing plate 110 is preferably comprised of four separate sections 110A, 110B, 110C, and 110D, which are secured to each other with hinges 112A, 112B, 112C, and 112D or other suitable means.

FIG. 23C is an enlarged view of hinge and removable pin means for securing subsections 110A, 110B, 110C, and 110D of the fixturing plate of FIG. 19 to each other.

Referring to FIG. 23C, hinge 112 is secured to fixturing plate 110 with screws 113 or other suitable means. Hinge pin 114 is preferably easily removable. Thus with all four pins removable from hinges 112A, 112B, 112C, and 112D in FIG. 19, said sections 110A, 110B, 110C, and 110D of fixturing plate 110 are easily separated from each other when said tent like enclosure 105 (see FIG. 18) is not installed on said vehicle 200 (see FIG. 18). This feature enables said fixturing plate 110 of FIG. 19 and the tent-like enclosure 105 of FIG. 18 to be easily and quickly dismantled and packed in a compact shape for facile transportation.

Referring again to FIG. 19, it is apparent that the rear opening weather sealing gasket represented by dotted line 192 is substantially irregular in shape around the perimeter of the rear opening of the vehicle. However, by carefully defining the geometry of each of fixturing plate subsections 110A, 110B, 110C, and 110D, it is possible to attain a geometry such that fixturing plate subsections 110A, 110B, 110C, and 110D are identical to each other in shape as defined by their perimeters. Thus although the weather sealing gasket shown by dotted line 192 is symmetric about the y axis only of FIG. 19, the fixturing plate 110 is symmetric about both the x and y axes shown in FIG. 19. The geometric shape of this preferred embodiment is more precisely approximated by an octagon. It will be apparent to those skilled in the art that by defining such a geometry, the manufacture of only one subsection part will be required in order to produce the components for the fixturing plate 110. This feature will thus reduce product manufacturing costs substantially.

Referring again to FIG. 19, it is noted that applicant's fixturing plate 110 can be fabricated from the same materials choices and dimensional thicknesses as previously described in this specification for applicant's fixturing plate 10 in FIG. 2.

FIG. 20A is a cross sectional view showing means to fit and secure the fabric of the tent like enclosure of FIG. 18 to the fixturing plate of FIG. 19.

Referring to FIG. 20A, applicants tent-like enclosure 105 is comprised of a fabric covering 111 which is comprised of an outer fabric surface 111A and an inner fabric surface 111B, which are joined at a seam 115 by thread 116 or other suitable means. Inner surface 111B is sandwiched between fixturing plate 110 and weather sealing gasket 193 such that a weatherproof seal is attained.

Referring again to FIG. 19, the construction of tent-like enclosure 105 is such that inner surface 111B is joined to outer surface 111A around the entire perimeter of tent-like enclosure 105. Inner surface 111B is also dimensioned to be of approximately the same width as fixturing plate 110, (of the order of several inches) such that inner surface 111B forms a pouch-like enclosure around fixturing plate 110 around its entire perimeter. In this manner, the fabric covering 111 of the tent-like enclosure 105 and fixturing plate 110 are securely joined to each other without the use of additional fasteners.

This feature will enable lower product cost. If for some vehicles, additional fasteners are required, conventional fastening means for securing fabric to a flat surface may be used, such as snaps, or hook and barb mating fabrics.

FIG. 21 is a perspective view of the tent-like enclosure of FIG. 18 joined to the fixturing plate of FIG. 19.

Referring to FIG. 21, applicant's tent-like enclosure 105 is preferably comprised of a fabric covering 111 with fabric flap 120; screen 121; zippers 122A and 122B for the opening and closure of flap 120; zippers 123A and 123B for the opening and closure of screen 121; webbing strips 124A and 124B suitably secured to tent-like enclosure 111 and fitted with snaps 126A, 126B, 126C, and 126D.

Referring again to FIG. 21, it will be apparent to those skilled in the art that flap 120 and screen 121 can each be opened, rolled up, and secured with webbing 124A and 124B to allow easy entry and exit from the vehicle. It will also be apparent that the overall functionality of this embodiment of applicant's fabric covering 111 is substantially identical to the enclosure 30 in FIG. 5 which was described in detail previously in this specification. It will be further apparent that the fabric enclosure can be made of substantially the same material which was described previously in this specification.

Referring again to FIG. 21, and subsequently to FIG. 20A, dotted line 125 represents the inner edge 117 of the inner fabric surface 111B of the fabric covering 111 which envelops the fixturing plate 110.

Figure 22A:
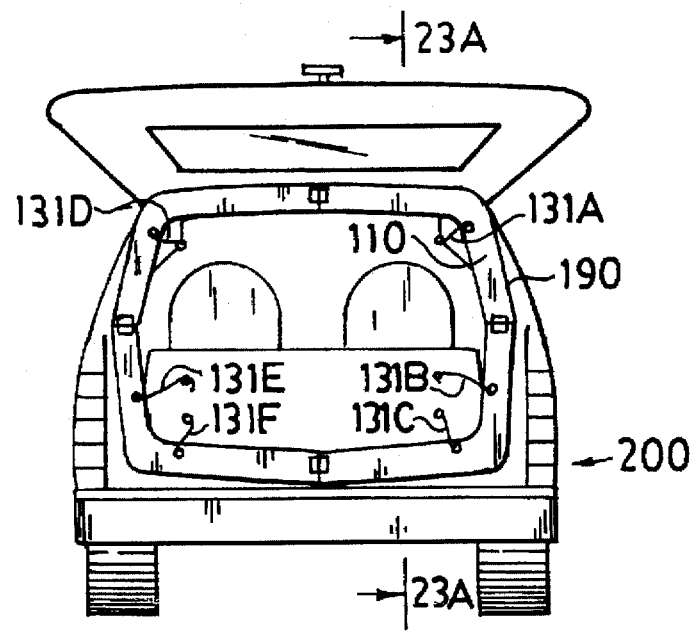
FIG. 22A is a rear elevation view of the fixturing plate of FIG. 19, also showing the fastening means to secure the fixturing plate to the vehicle.

FIG. 22A is a rear elevation view of the fixturing plate of FIG. 19, also showing the fastening means to secure the fixturing plate to the vehicle.

Referring to FIG. 22A, applicant's fixturing plate 110 is preferably secured to the rear opening 190 of the vehicle 200 with elastic cords 131A, 131B, 131C, 131D, 131E, and 131F; as well as brackets 130A and 130B (see FIG. 19).

FIG. 23A is a side cross sectional view of the fixturing plate of FIG. 19 taken along section 23A—23A of FIG. 22A, which depicts fastening means for securing the fixturing plate to the vehicle. FIG. 23B is an enlarged view of one means for securing the fixturing plate of FIG. 19 to the vehicle.

Referring to FIG. 23A, and FIG. 23B, applicant's fixturing plate 110 is supported vertically by the contact of fixturing plate bracket 130A with hinge bracket 181. Fixturing plate 110 is also secured to the vehicle 200 and brought into tight contact with weather sealing gasket 193 by elastic cords 131A, 131B, and 131C. Each of elastic cords 131A, 131B, and 131C is preferably fitted with hooks 132A and 132B at each end, as shown for elastic cord 131B.

Referring further to FIG. 23A, elastic cords 131A, 131B, and 131C, are hooked through holes 133A, 133B, and 133C, respectively. Refer also to FIG. 19 in which holes 133A, 133B, and 133C are also shown in elevation view.

Referring again to FIG. 23A, elastic cord 131A is also hooked to shoulder seat belt support loop 196 which holds shoulder seat belt 197. Elastic cord 131B is also hooked to cargo loop 194A, and elastic cord 131C is also hooked to cargo loop 194B. Cargo loops 194A and 194B are typically provided fastened to the vehicle floor 195 as standard equipment in most sport utility vehicles.

Referring to FIG. 23A, it will be readily apparent to those skilled in the art that applicant's fixturing plate 110 is firmly secured to the vehicle, and that said fixturing plate 110 is flexible and is bent into compliance with the irregular curved surface of the weather sealing gasket 193, thereby making a weatherproof seal.

FIG. 23C is an enlarged view of hinge and removable pin means for securing subsections of the fixturing plate of FIG. 19 to each other.

Referring to FIG. 23C, it will also be apparent that by placing the hinge 112 on the outside of the fixturing plate 110, contact of said fixturing plate 110 with said gasket 193 is maintained at the surface 119 where fixturing plate subsections 110A and 110B are in contact with each other.

It should be noted that the preceding description applies to the securing means for both the left side and the right side of said plate, as they are mirror images of each other, and use identical securing means.

It should be further noted that for simplicity, the fabric covering 111 (see FIG. 20A) of the applicants tent-like enclosure is not shown in FIGS. 23A, 23B, and 23C. It is to be understood, however, that the fabric covering 111 is fitted to the fixturing plate as previously described, and as shown in FIG. 20A.

Figure 22B:
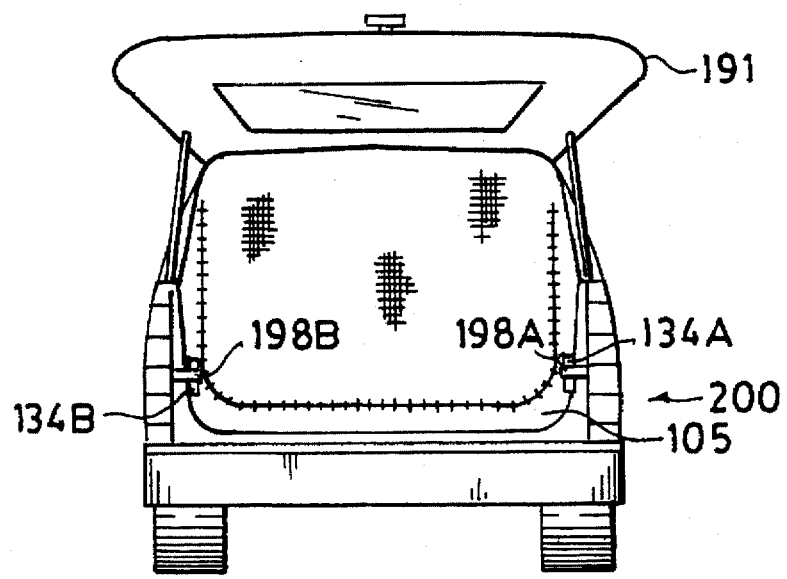
FIG. 22B is a rear elevation view which depicts the installation of the tent-like enclosure of FIG. 21 to the vehicle.

FIG. 22B is a rear elevation view which depicts the installation of the tent-like enclosure of FIG. 21 to the vehicle.

Referring to FIG. 22B, 198A and 198B are latching peg or U-bolt means by which liftgate 191 is secured to vehicle 200 in the closed position. In an alternative embodiment, the applicant's tent-like enclosure may also be secured to the vehicle 200 by the placement of wedges 134A and 134B, cams, or other means between the latch peg means 198A and 198B, and the tent-like enclosure 105.

Figure 24:
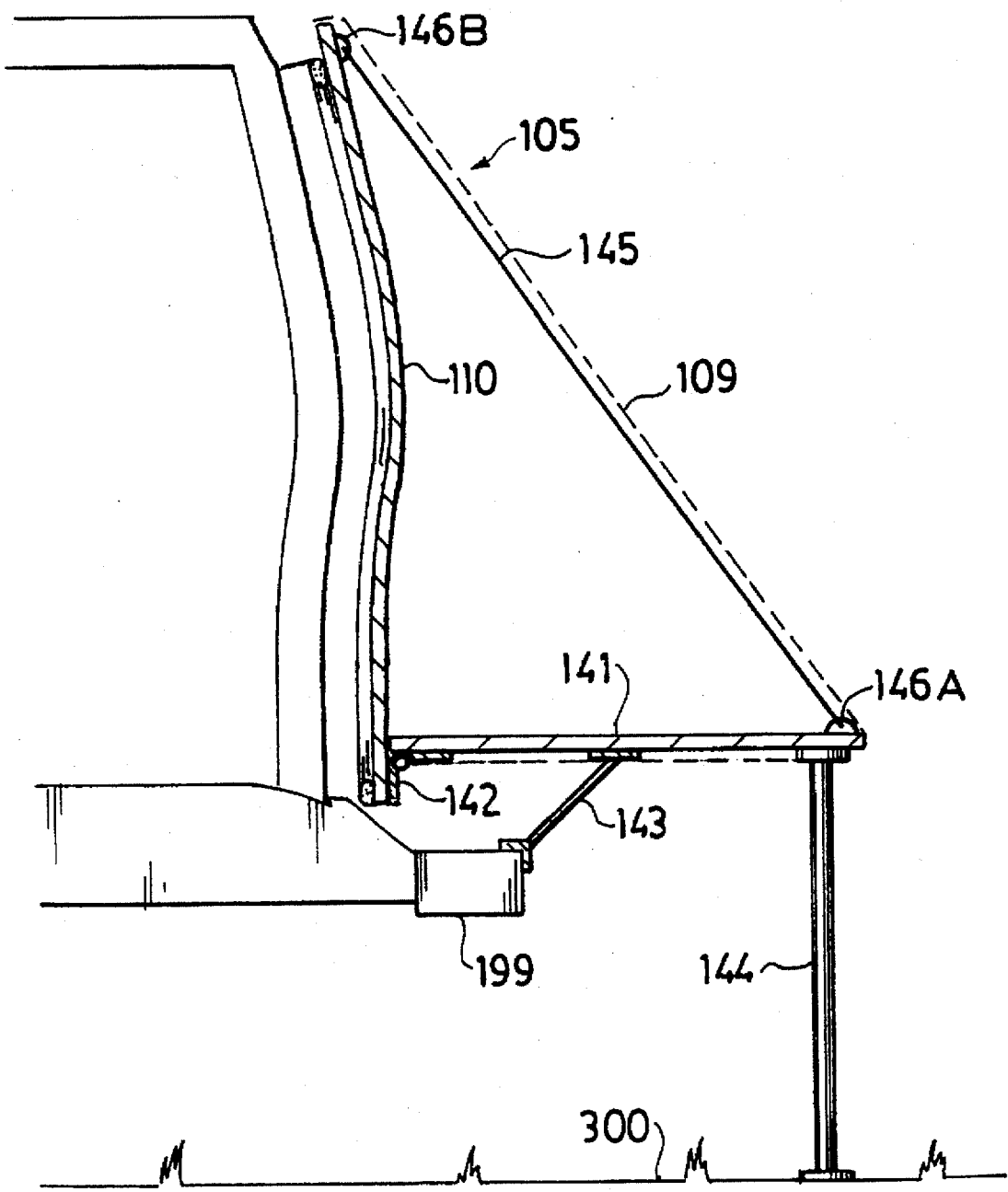
FIG. 24 is an alternative embodiment of the fixturing plate of FIG. 19, with a tailgate-like extension secured to the fixturing plate to extend the available space in the vehicle.

FIG. 24 is an alternative embodiment of the fixturing plate of FIG. 19, with a tailgate-like extension secured to the fixturing plate to extend the available space in the vehicle.

Referring to FIG. 24, tailgate-like extension 141 is fastened to fixturing plate 110 with hinge means 142 or other suitable means. Tailgate-like extension 141 may also be supported by rod means 143 to the vehicle bumper 199; rod means 144 to the ground 300; or guy wire means 145 which is secured to fixturing plate 110 through eye loop 146B and to tailgate-like extension 141 through eye loop 146A.

Referring again to FIG. 24, fabric covering is shown in phantom by dotted line 109 which encloses tailgate-like extension 141. Rod means 143 and 144 may be hingably attached to tailgate-like extension 141 in order to enable compact storage and transportation of the tent-like enclosure 105.

It will be apparent to those skilled it the art that this embodiment provides additional enclosed space within the tent-like enclosure.

It will be further apparent that the aforementioned description is illustrative only and that changes can be made in the components of the apparatus which would easily enable the apparatus to be fitted to a vehicle with cargo doors which are hingably attached to the rear corners of the vehicle and swing outward in a horizontal manner.

Figure 25:
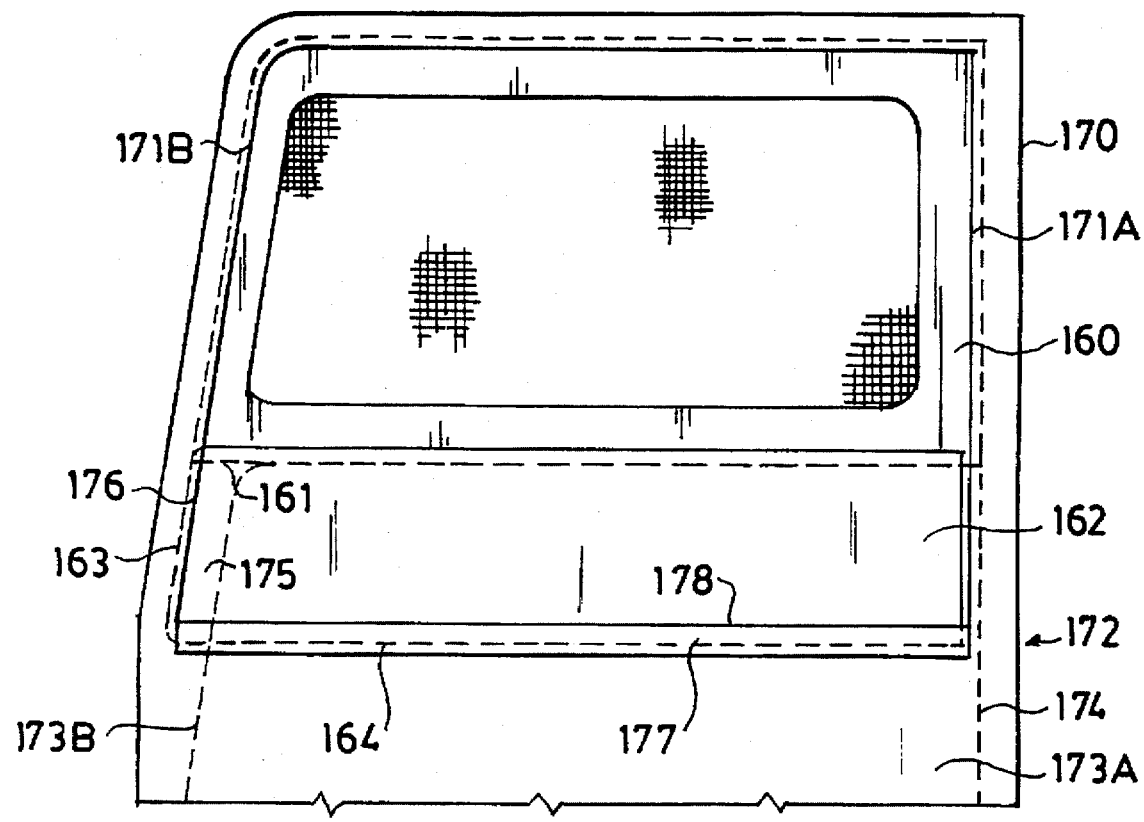
FIG. 25 is an alternative embodiment of applicant's ventilation window of FIGS. 10 through 14.

FIG. 25 is an alternative embodiment of applicant's ventilation window of FIGS. 10 through 14.

Referring to FIG. 25, it will be apparent that window frame edges 171A and 171B are not parallel to each other as in the previously described embodiment with edges 95A and 95B shown in FIG. 11. It will be further apparent that the corresponding edges 173A and 173B of window glass 174 are also not parallel to each other.

Referring further to FIG. 25, when window glass 174 is lowered into the lower portion 172 of vehicle door 170, an open gap 175 results between the edge 173B of window glass 174, and the frame edge 171B of door 170. It will be apparent to those skilled in the art that when ventilation window frame 160 is fitted as previously described in this specification and in FIGS. 11 through 14, the gap 175 exists below the lower edge 161 of ventilation window frame 160.

Referring again to FIG. 25, an additional panel of fabric material 162 is suitably fastened to ventilation window frame 160 with thread or other means known in the art. Said fabric panel of material 162 is dimensioned so that its diagonal edge 163 can be tucked into window gasket groove 176, and its lower edge 164 can be tucked between window glass 174 and gasket 177 located at the line of contact 178 between the window glass 174 and the vehicle door 170.

Referring to FIG. 25, it will be apparent to those skilled in the art that the use of the additional panel 162 of fabric will maintain a weather tight and insect resistant seal around the ventilation window frame 160.

In a further embodiment of the applicant's ventilation window invention, features are provided which preclude the need for the occupant of the vehicle to exit the vehicle in order to lower an exterior protective fabric panel in the event of rain.

FIGS. 26A through 26D are views of this further embodiment showing the protective fabric in the raised (open, unprotected) position, and in the lowered (closed, protected) position.

Referring to FIG. 26A, it can be seen that the applicant's ventilation window is installed in the vehicle in a manner to that previously described, with the fixturing plate 201 held in place in the groove 202 of vehicle window guide track and weather-strip 203, and vehicle window glass 98. FIG. 26A is drawn such that the interior of the vehicle is on the left of the fixturing plate 201, and the exterior of the vehicle is on the right of fixturing plate 201, as denoted by arrow 210.

The ventilation window is provided with two fabric coverings. First fabric covering 74, is shown in FIG. 26A in the rolled-up position and secured by hook mating fabric strip 78, which joins with a corresponding strip of loop mating fabric (not shown), which is suitably joined to first fabric covering 74. The use and function of said fabric covering 74 has been previously described in this specification and is also shown in FIG. 10.

Second fabric covering 207 is also shown in FIG. 26A in the rolled up position and secured by hook and loop mating fabric strip 208. Second fabric covering 207 is secured to fixturing plate 201 and is particularly dimensioned in a manner which enables the vehicle occupant to unroll, lower, and place second fabric covering 207 in the closed, protected position from inside the vehicle.

Referring again to FIG. 26A, second fabric covering 207 is secured to fixturing plate 201 along the upper horizontal edge 209 of said second fabric covering 207. Means to secure fabric covering 207 to fixturing plate 201 is preferably sewing, although adhesive means, hook and loop mating fabric means, or other suitable means to join fabric to a surface could be used.

FIG. 26A shows second fabric covering 207 rolled up and secured in place by hook mating fabric strip 208 on the vehicle interior side of fixturing plate 201. Said hook mating fabric strip 208 joins with a corresponding strip of loop mating fabric (not shown) which is suitably joined to second fabric covering 207.

FIG. 26C is a side view of the ventilation window 270 of FIG. 26A taken as viewed from a point in the interior of the vehicle outward, i.e. in the direction of arrow 210 in FIG. 26A. In this FIG. 26C, first fabric covering 74 of FIG. 26A has been omitted for the sake of simplicity, it being apparent that, in practice, the applicant's fabric covering 74 of FIG. 26A is joined to the ventilation window of FIG. 26C as a complete assembly.

Referring to FIG. 26C, second fabric covering 207 is held in the raised position by hook fabric strips 208A and 208B, which are joined with corresponding strips of loop mating fabric (not shown) which are suitably joined to second fabric covering 207. To lower second fabric covering 207 into the protective position, hook fabric strips 208A and 208B are detached from their respective mating strips (not shown) joined to second fabric covering 207, and second fabric covering 207 is unrolled downward and extended to its full length. Second fabric covering is then tucked around fixturing plate 201 to the exterior side of fixturing plate 201, and held in place between screen 211 and fixturing plate 201.

FIG. 26D is a side view of the applicant's ventilation window showing second fabric covering 207 of FIG. 26C in the lowered protective position, and nearly completely tucked in between the exterior side of the fixturing plate and the screen.

Referring to FIG. 26D, it can be seen that the second fabric covering 207 is joined as previously described to fixturing plate 201 along its upper edge shown by dotted line 209A. It can be further seen that the perimeter of second fabric covering 207, defined by dotted lines 209A, 209B, 209C, and 209D is entirely enclosed within the perimeter of screen 211 defined by dotted lines 212A, 212B, 212C, and 212D. Screen 211 is joined to the fixturing plate 201 around the perimeter of said screen 211 in a narrow band preferably less than ¼ inch wide by sewing, adhesive, or other suitable means. Screen 211 is joined to fixturing plate 201 such that it has a slight amount of slack, enabling second fabric covering 207 to be tucked in the space between fixturing plate 201 and screen 211. In FIG. 26C, second fabric covering 207 is shown nearly completely tucked in, with the exception of fabric corner 213.

FIG. 26B is a sectional view of the applicant's ventilation window showing the second fabric covering completely lowered to the protective position.

Referring to FIG. 26B, it can be seen that second fabric covering 207 is held in place between fixturing plate 201 and screen 211.

In one embodiment of the applicant's ventilation window invention, shown in FIG. 26D, the distance between the perimeter of the screen 211 and the perimeter of the second fabric cover 207 was ½ inch; and the distance between the perimeter of the second fabric cover 207 and the inner perimeter (opening) of the fixturing plate 201 was ½ inch; and in close proximity to the horizontal upper edge 209A of the second fabric covering 207, notches 214A and 214B were provided in second fabric cover 207. These features made the lowering and securing of the second fabric cover 207 in the protective position a simple operation, while enabling the second fabric covering 207 to be held securely in the protective position.

It will be apparent that when the second fabric covering 207 of the ventilation window 270 of FIG. 26C is in the raised position, a substantial flow of ventilation air can flow through the screen joined to the fixturing plate of the applicant's invention; and when said second fabric covering is lowered and tucked into the protective position, it is secured entirely on the exterior of the fixturing plate, thereby preventing rain or other inclement weather from entering the vehicle; and that it is a simple operation to raise and lower said second fabric covering from inside the vehicle. It will be further apparent that said second fabric covering may be held in the raised position by means other than hook and loop fabric, e.g. by snap means, adhesive means, etc.

It will be further apparent that the applicant's invention would be functional and satisfactory without the first fabric covering 74 of FIG. 26A. Said first fabric covering 74 can provide an extra measure of protection against extreme wind and rain.

A further embodiment of the applicant's ventilation window invention is made to fit vehicles equipped with windows which slide open and closed in a horizontal direction, in contrast to the typical vertical direction seen in most vehicles. The 1993 Aerostar minivan, made by the Ford Motor Company of Dearborn, Mich. is an example of a vehicle with windows which open and close by sliding horizontally.

Figure 27:
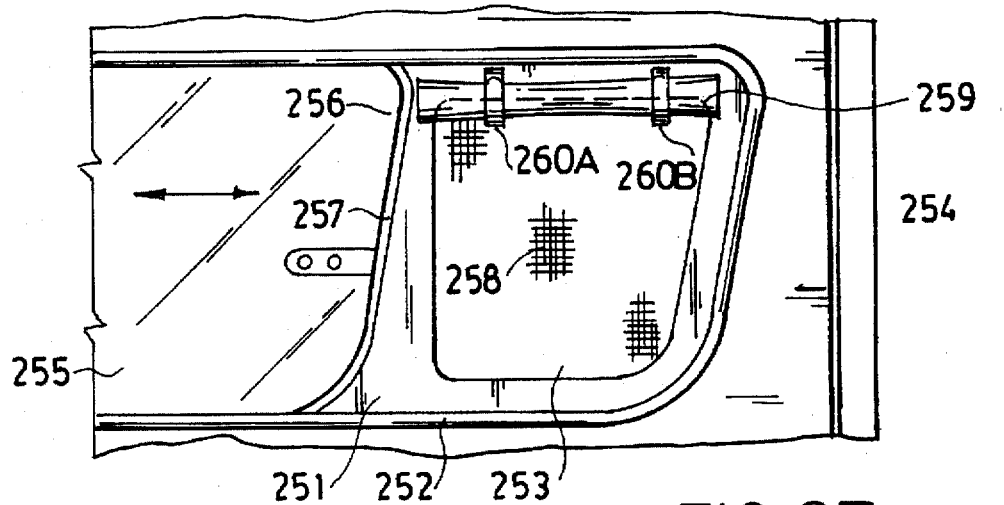
FIG. 27 is a side view of an alternative embodiment of applicant's ventilation window of FIGS. 10 through 14, to be used on a vehicle with a window which opens by sliding a portion of the window horizontally.

FIG. 27 is a view of the applicant's ventilation window invention shown installed in a vehicle with windows which slide open and closed horizontally. The installation, use, and functionality of this ventilation window is substantially the same as for ventilation windows previously described in this specification. Referring to FIG. 27, fixturing plate 251 of the ventilation window 252 is held in position in the window track 253 of the vehicle 254, in the position which the window glass 255 would occupy if said window glass 255 were in the closed position.

The ventilation window 252 is installed in a manner analogous to that previously described for vehicles with windows which open and close vertically. Referring again to FIG. 27, the window glass 255 is completely opened (to the left in FIG. 27); the fixturing plate 251 of the ventilation window 252 is flexed and inserted into the window track 253 of the vehicle 254. The window glass 255 is then moved in the closing direction (to the right in FIG. 27), holding the fixturing plate 251 of the ventilation window 252 tightly in the window track 253 of the vehicle 254. The edge 256 of the fixturing plate 251 which is in contact with the window glass 255 is contoured to precisely match the shape of the perimeter of said window glass 255, enabling a good seal to be made. In addition, this edge 256 of the fixturing plate 251 may be fitted with a strip of gasket material 257 in order to assure a weather tight seal.

Referring again to FIG. 27, applicant's ventilation window 252 is also comprised of screen material 258 to prevent the entrance of insects into the vehicle and to provide ventilation airflow; and fabric covering 259 held up with hook and loop fabric 260A and 260B for protection against rain, wind, etc.

The operation and use of these features is the same as for the applicant's ventilation windows described previously in this specification. In addition the embodiment of the applicant's ventilation window 252 of FIG. 27 could also be made with a fabric cover which could be lowered from inside of the vehicle. Said fabric cover was previously described in this specification and is shown in FIGS. 26A through 26D.

A further embodiment of the applicant's ventilation window invention is made to fit vehicles with windows which open and close by action of a louver mechanism. Vehicles which are equipped with such windows include the 1995 Windstar minivan, sold by the Ford Motor Company of Dearborn, Mich.; and the 1996 Dodge Caravan sold by the Chrysler Corporation of Detroit Mich. There are many other examples of such vehicles sold in the automotive marketplace.

Figure 28A:
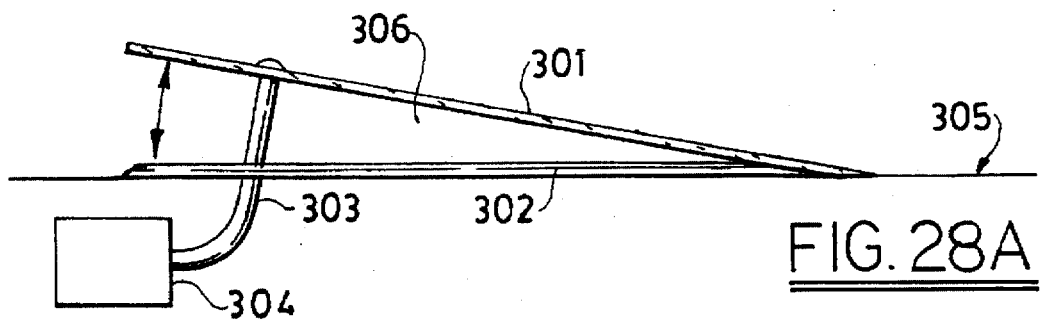
FIG. 28A is a top view of a typical louver style window used on sport utility vehicles, vans, and minivans.

FIG. 28A is a view looking downward from above at a louver actuated vehicle window shown in the open position. Referring to FIG. 28A, it can be seen that such a louver actuated window is typically comprised of a piece of window glass 301, a weatherproof sealing gasket 302, and an actuating rod 303 which is attached to window glass 301 and operated by louver actuating mechanism 304. All components of the window assembly are suitably joined to the vehicle 305. The louver actuating mechanism 304 moves rod 303, which in turn opens window glass 301 to the position shown, or closes window glass 301, drawing it against gasket 302.

Figure 28B:
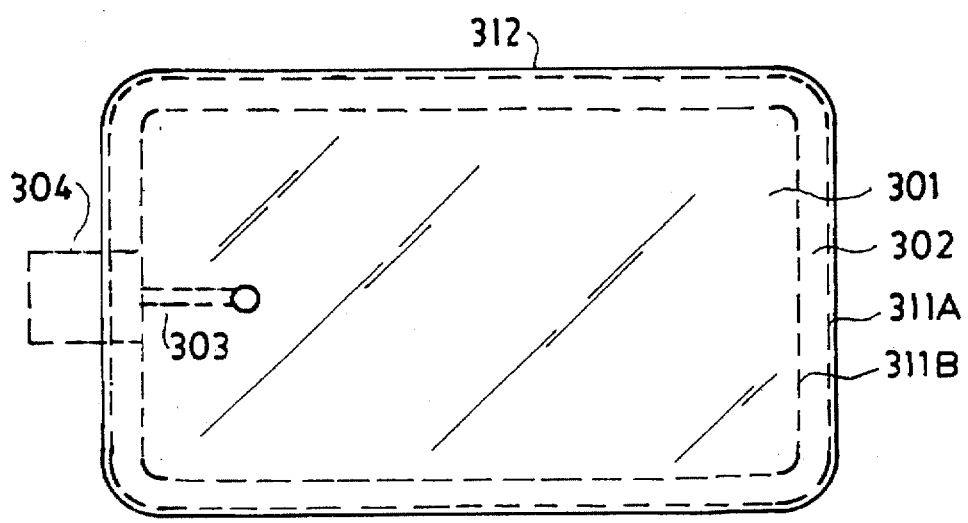
FIG. 28B is a side view of a typical louver style window used on sport utility vehicles, vans, and minivans.

FIG. 28B is a view of a typical louver actuated vehicle window as seen from a position along the exterior side of the vehicle. Referring to FIG. 28B, the surface of contact between window glass 301 and sealing gasket 302 is the enclosed area between dotted line rectangles 311A and 311B. It can be seen that sealing of a typical louver actuated window occurs substantially around the perimeter of said window.

Referring again to FIG. 28A, it can be seen that when a typical louver actuated window is in the open position, there is a substantially wedge shaped space 306 between the window glass 301, and the substantially planar surface defined by the sealing surface of the gasket 302.

Embodiments of the applicant's ventilation window invention can be adapted to fit in this wedge shaped space 306 of FIG. 28A and provide good ventilation air flow, resistance to the entrance of insects into the vehicle, and prevention of the entrance of rain into the vehicle when occupants are camping in the vehicle. All of these embodiments share the common basic principle of the ventilation window inventions described previously in this specification: said ventilation windows are held in place between the window glass and a portion of the body of the vehicle; and sealing of the ventilation window to the vehicle is accomplished by utilizing the window glass to force the fixturing plate of the ventilation window against the sealing means on the vehicle which are normally intended to create a seal between the vehicle window glass and the vehicle body. Various embodiments of the applicant's ventilation window for vehicles having louver actuated windows will now be described.

Figure 28C:
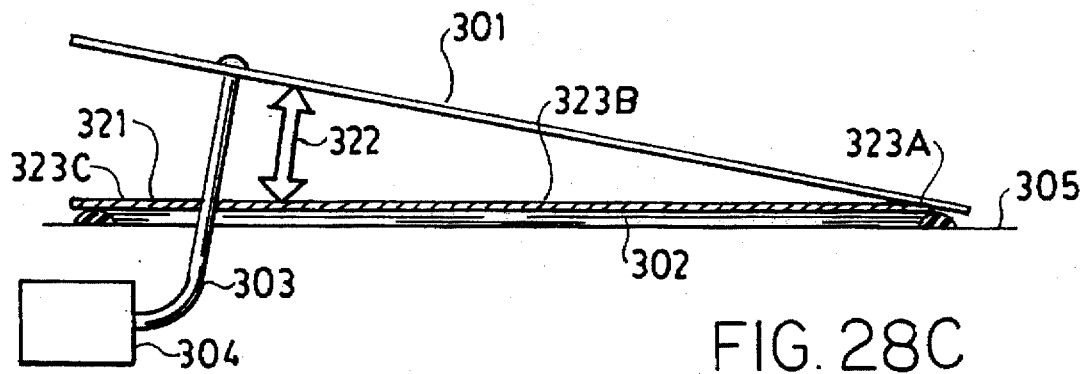
FIG. 28C is a top view of a typical louver style window used on sport utility vehicles, vans, and minivans, shown with a ventilation window in place, and showing the force required to compress it against the vehicle window gasket.

FIG. 28C is a view looking downward from above at a louver actuated vehicle window shown in the open position, with the applicant's ventilation window invention shown installed on the vehicle.

Referring to FIG. 28C, window glass 301, sealing gasket 302, actuating rod 303, and louver actuating mechanism 304 are attached to vehicle 305 and function as described previously and shown in FIG. 28A. The fixturing plate 321 of applicant's ventilation window invention is shown installed on the vehicle 305. The fixturing plate 321 is similar in shape to the fixturing plate 201 of FIGS. 26A through 26D which was previously described in this specification. The additional components of screen and fabric covering which comprise the applicant's ventilation window invention are also attached to the applicant's fixturing plate 321 of FIG. 28C to form the complete device. Said screen and fabric covering components are not shown in FIG. 28C for simplicity, it being apparent that, in practice, fabric covering and screen material which are substantially similar to the fabric covering 207 and screen material 211 of FIG. 26B are joined to the fixturing plate 321 of FIG. 28C as a complete assembly. The fixturing plate 321 of FIG. 28C is dimensioned such that said fixturing plate 321 is slightly less in perimeter than the perimeter of the vehicle window glass 301 of FIG. 28B, but such that said fixturing plate 321 makes continuous contact with the sealing surface of the window gasket 302 of FIG. 28C, which is shown as the enclosed area between dotted line rectangles 311A and 311B of FIG. 28B.

Referring again to FIG. 28C, the applicant's fixturing plate 321 is held in place and compressed against window sealing gasket 302, thereby achieving the sealing of the applicant's ventilation window invention to the vehicle. The force to compress the fixturing plate 321 against the window sealing gasket 302 is preferably obtained by creating a force which attempts to push the window glass 301 away from the fixturing plate 302, as represented by arrow 322. This force is preferably applied at various points around the perimeter of the applicant's fixturing plate 321. For example, such force could be applied at points 323A, 323B, and 323C in proximity to the upper and lower edges of the applicant's fixturing plate 321.

A number of different means may be used to provide force to compress the fixturing plate 321 of FIG. 28C to the window sealing gasket 302. The portion of the window glass 301 which is opposite the louvering mechanism 304 is in close proximity to the window sealing gasket 302. In this area, the force needed to compress the fixturing plate 321 to the window gasket 302 may be obtained at point 323A simply by thrusting the fixturing plate 321 firmly between the window glass 301 and the window sealing gasket 302. The thickness of the fixturing plate 321 may be carefully selected to optimize the force at point 323A (which is actually a line of contact which extends downward vertically along the edge of the fixturing plate 321).

Figure 28D:
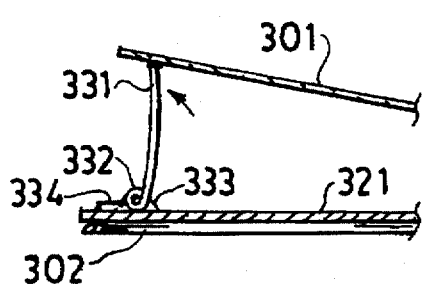
FIG. 28D is spring means shown in compression, used to compress the ventilation window against the vehicle window gasket.

A number of additional means may be used to provide force around the remaining perimeter of the fixturing plate 321 at, for example, points 323B and 323C. FIG. 28D is an example of spring means which could provide force to compress the fixturing plate against the window sealing gasket. A plurality of such spring means intermittently displaced around the fixturing plate perimeter could be employed to provide said force.

Referring to FIG. 28D, applicant's fixturing plate 321 is compressed against sealing gasket 302 by the force provided by a spring 331. Spring 331 in FIG. 28D is preferably a thin strip of elastic material such as tempered steel; although steel wire of the proper diameter and resilience would also suffice, as would numerous other materials with proper elastic properties.

In close proximity to fixturing plate 321 of FIG. 28D, spring 331 is formed into an eyelet 332 and secured to fixturing plate 321 with a pin (not shown in detail) through eyelet 332 and bracket 333. Spring 331 also is comprised of a tab 334 which makes contact with fixturing plate 321 when spring 331 is placed in compression between window glass 301 and fixturing plate 321. Tab 334 serves to hold spring 331 in an upright position and maintain spring 331 in compression, as indicated by a slight amount of curvature in spring 331.

Figure 28E:
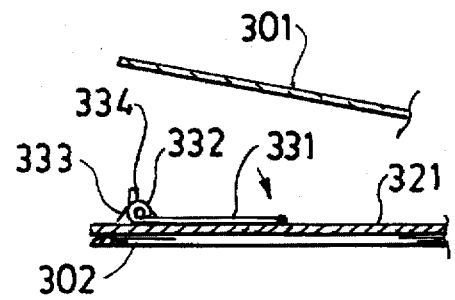
FIG. 28E is the spring means of FIG. 28D shown in an uncompressed state and folded over against the ventilation window frame.

When the applicant's ventilation window invention is not installed on the vehicle, it is desirable to have spring 331 rotate approximately 90 degrees into a position which is substantially parallel to and congruent with fixturing plate 321 of FIG. 28D in order to facilitate the storage and transportation of the applicant's ventilation window invention. FIG. 28E depicts the rotation of spring 331 to said position.

Referring to FIG. 28E, spring 331 has been rotated approximately 90 degrees around eyelet 332, and is substantially parallel to and congruent with fixturing plate 321. Applicant's ventilation window is thus easy to store and transport.

It will be apparent to those skilled in the art that the exact form of spring 331, eyelet 332, bracket 333, and tab 334 can vary from the spring means depicted in FIGS. 28D and 28E, while achieving substantially the same result. It will be further apparent that other types of springs could be used and suitably attached to the applicant's fixturing plate to provide force to compress said fixturing plate to the window gasket; for example, a coil spring formed of wire could be used.

Figure 28F:
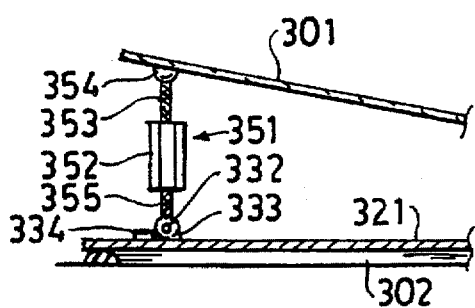
FIG. 28F is an alternative embodiment of means to compress the ventilation window against the vehicle window gasket using a turnbuckle mechanism.

Additional devices to compress the fixturing plate to the window gasket could use threaded mechanisms. FIG. 28F shows a turnbuckle device used for this purpose.

Referring to FIG. 28F, turnbuckle assembly 351 is used to compress fixturing plate 321 to window gasket 302. Turnbuckle assembly 351 is well known in the art of fasteners, and is comprised of nut 352, right hand threaded eyebolt 355, left hand threaded rod 353, and seating pad 354 suitably fastened to threaded rod 353. Components of turnbuckle assembly 351 are preferably made of common metals such as steel or aluminum, with the exception of seating pad 354, which is preferably made of a soft, compliant plastic such as polyurethane.

It will be apparent to those familiar with the operation of a turnbuckle that the rotation of nut 352 in a given direction while holding left hand threaded rod 353 and right hand threaded rod 355 stationary will result in a shortening of turnbuckle assembly 351; while rotating nut 352 in the opposite direction under the same conditions will result in a lengthening of turnbuckle assembly 351. Thus the length of turnbuckle assembly 351 of FIG. 28F can be adjusted to be equal to the distance between window glass 301 and fixturing plate 321 at the attachment point of turnbuckle assembly 351 to fixturing plate 321; and with a slightly further lengthening of turnbuckle assembly 351, weather sealing gasket 302 will be compressed by fixturing plate 321, thereby achieving a satisfactory seal of the applicant's ventilation window invention to the vehicle.

The manner in which turnbuckle assembly 351 is fastened to fixturing plate 321 is analogous to that previously described for spring 331 of FIG. 28D: bracket 333 of turnbuckle assembly 351 of FIG. 28F has a pin (not shown in detail) which secures said turnbuckle assembly 351 through the eyelet 332 of eyebolt 355. It is apparent that tab 334 maintains turnbuckle assembly substantially perpendicular to fixturing plate 321 when the ventilation window is installed in the vehicle; and that upon removal of the ventilation window from the vehicle, turnbuckle assembly 351 may be rotated approximately 90 degrees in a manner similar to that previously described for spring 331 in FIG. 28E.

Figure 28G:
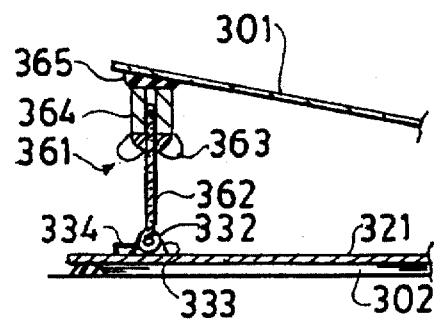
FIG. 28G is an alternative embodiment of means to compress the ventilation window against the vehicle window gasket using a threaded sleeve and locking wing nut.

FIG. 28G depicts another embodiment of a threaded fastener assembly used to compress the fixturing plate of the applicant's ventilation window to the window gasket.

Referring to FIG. 28G, assembly 361 is comprised of hex nut 364, threaded eyebolt 362, wing nut 363, and seating pad 365 suitably fastened to hex nut 364. Assembly 361 is preferably made of common metals such as steel or aluminum, with the exception of seating pad 365, which is preferably made of a soft, compliant plastic such as polyurethane.

It will be apparent that assembly 361 can be lengthened or shortened by rotation of nut 364. Thus the length of assembly 361 can be adjusted to be equal to the distance between window glass 301 and fixturing plate 321 at the attachment point of assembly 361 to fixturing plate 321; and with a slightly further lengthening of assembly 361, weather sealing gasket 302 will be compressed by fixturing plate 321, thereby achieving a satisfactory seal of the applicant's ventilation window invention to the vehicle. Upon adjustment of assembly 361 to the desired length, wing nut 363 can be rotated while hex nut 364 is held stationary such that wing nut 363 is secured tightly against hex nut 364, thereby preventing further rotation of hex nut 364 on eyebolt 362. Thus assembly 361 is fixed at the desired length.

The manner in which assembly 361 is joined to fixturing plate 321 is substantially identical to that previously described for turnbuckle assembly 351 of FIG. 28F. In addition, assembly 361 of FIG. 28G also has substantially identical features as turnbuckle assembly 351 of FIG. 28F, enabling assembly 361 to be maintained substantially perpendicular to fixturing plate 321 when the ventilation window is installed in the vehicle; and that upon removal of the ventilation window from the vehicle, assembly 361 may be rotated approximately 90 degrees in a manner similar to that previously described for spring 331 in FIG. 28E in order to enable compact storage and transporting of the applicant's ventilation window.

In addition to means to compress the fixturing plate of the applicant's ventilation window against the window sealing gasket, it may be desirable to provide vertical support of the ventilation window when said ventilation window is installed on the vehicle. One method of providing vertical support of the ventilation window is through the use of bracket means shown in FIG. 28H. FIG. 28H is a sectional view of the upper horizontal edge of the fixturing plate of the applicant's ventilation window shown installed on the vehicle.

Referring to FIG. 28H, bracket 371 is secured to fixturing plate 321 with screws 372A and 372B or other suitable fastening means. Horizontal tab 373 extends from bracket 371, making contact with the upper edge of window glass 301. Window glass 301 therefore supports fixturing plate 321 vertically due to its contact with bracket 371. A plurality of brackets 371 could be fastened to the upper edge of fixturing plate 321 such that points of contact between said brackets and window glass 301 would be along the upper edge 312 of window glass 301 which is shown in FIG. 28B.

Referring again to FIG. 28H, bracket 371 is also comprised of vertical tab 374 which serves to separate window glass 301 from fixturing plate 321 by a fixed distance. If said fixed distance is properly selected, bracket 371 may also be used to compress fixturing plate 321 to window gasket 302, thereby achieving a weatherproof seal of the applicant's ventilation window to the vehicle.

In a further embodiment of bracket 371, horizontal tab 373 may be extended downward parallel to vertical tab 374 and substantially equal in length to vertical tab 374, thereby substantially enclosing the upper edge 312 of window glass 301. A more secure attachment of bracket 371 to window glass 301 would result.

FIG. 28I is a further embodiment of a supporting bracket in which said bracket is an integral part of the fixturing plate. Referring to FIG. 28I, bracket 381 is an extension of fixturing plate 321, preferably made as a single part during manufacturing. For example, fixturing plate 321 with integral bracket 381 could be made of plastic by an injection molding process. It is apparent that integral bracket 381 is substantially identical to bracket 371 of FIG. 28H, and therefore has the same function as bracket 371 as previously described in this specification.

FIG. 28J is a further embodiment of the applicant's ventilation window invention in which resilient foam blocks are used to secure said ventilation window to the vehicle. Referring to FIG. 28J, resilient blocks 391A, 391B, 392A, 392B, 393A, and 393B are joined to fixturing plate 321 of the applicant's ventilation window 395, preferably by adhesive applied between resilient blocks 391A, 391B, 392A, 392B, 393A, and 393B, and fixturing plate 321. Applicant's ventilation window 395 is also preferably comprised of screen material 394 and a fabric covering. Said fabric covering is not shown for simplicity, it being apparent that, in practice, said fabric covering is substantially similar to the fabric covering 207 of FIG. 26B and is joined to the fixturing plate 321 of FIG. 28J as a complete assembly. The function of screen material 394 and fabric covering is identical to that of other embodiments of the applicant's ventilation window which are described previously in this specification.

Referring again to FIG. 28J, resilient blocks 391A, 391B, 392A, 392B, 393A, and 393B may be fabricated of any material which will deform when compressed, and subsequently return to its original dimensions when compressive force is released. Resilient blocks 391A, 391B, 392A, 392B, 393A, and 393B are preferably of a low density, i.e. a specific gravity of less than one (1.0). For example, resilient blocks 391A, 391B, 392A, 392B, 393A, and 393B may be fabricated of closed cell polypropylene foam.

Said resilient blocks are preferably of increasing thickness in increasing numerical order in FIG. 28J, i.e. blocks 391A and 391B are smallest in thickness; blocks 392A and 392B are intermediate in thickness; and blocks 393A and 393B are largest in thickness. In this context, thickness is defined as the distance from the surface of a given block which is in contact with fixturing plate 321, along a line segment perpendicular to fixturing plate 321 to the corresponding parallel (opposite) surface of the given block.

FIG. 28K is a top view of the ventilation window 395 of FIG. 28J shown installed on the vehicle. Referring to FIG. 28K, ventilation window 395 occupies the wedge shaped space between window glass 301 and window sealing gasket 302. Resilient blocks 391B, 392B, and 393B (and the corresponding blocks 391A, 392A, and 393A of FIG. 28J which are not shown) are all in contact with and compressed by window glass 301. The sequentially increasing thickness of the resilient blocks 391B, 392B, and 393B (and the corresponding blocks 391A, 392A, and 393A) results in a substantially uniform compressive force of the fixturing plate 321 of FIG. 28K on the window gasket 302 when the applicant's ventilation window 395 is installed on the vehicle 305. A satisfactory seal between the ventilation window 395 and the window gasket 302 is therefore attained.

All of the ventilation window embodiments shown in FIGS. 28C through 28K and previously described in this specification have the following common feature when installed on the vehicle: the actuating rod 303 of FIG. 28C is located within the outer perimeter of ventilation window fixturing plate 321, also of FIG. 28C. Said actuating rod has not been shown subsequently in FIGS. 28D through 28K for simplicity. However, it is to be understood that said actuating rod is present when the applicant's ventilation window is installed on the vehicle. Therefore, it will be apparent to those skilled in the art that provisions must be made in the applicant's ventilation window to accommodate the actuating rod 303 of FIG. 28C, both during the ventilation window installation process, and during the time when the ventilation window is fully installed on the vehicle. Such provisions will now be described; these provisions apply to all embodiments of the applicant's ventilation window shown in FIGS. 28C through 28K.

Figure 28L:
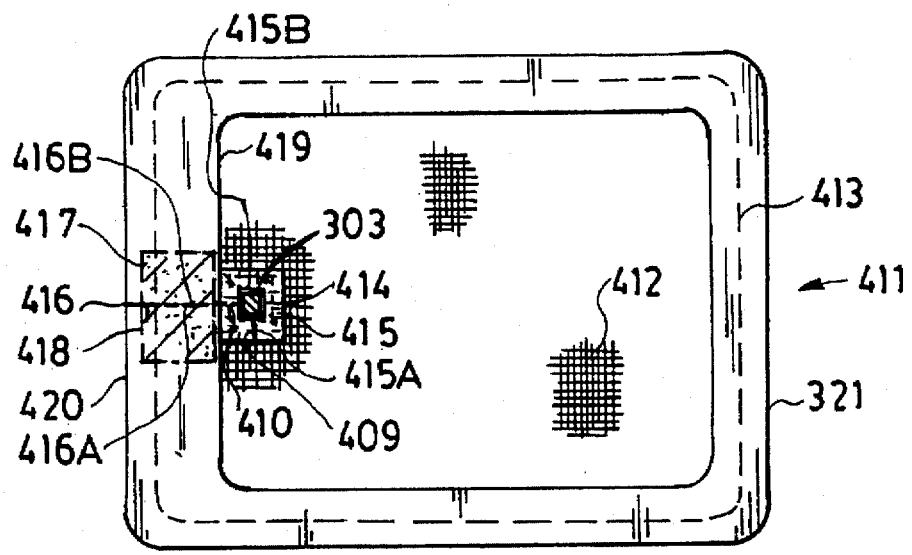
FIG. 28L is a side view of the ventilation window of FIG. 28C and FIG. 28J, shown with an opening in the ventilation window fixturing plate to enable installation of the ventilation window around the window opening mechanism of the vehicle.

FIG. 28L is an elevation view of one embodiment of the applicant's ventilation window which has provisions to accommodate the presence of a window actuating rod. This view is from a vantage point looking from the inside of the vehicle outward, i.e. looking at the inside surface of the ventilation window, which makes contact with the vehicle window gasket when the ventilation window is installed on the vehicle.

Referring to FIG. 28L, ventilation window 411 is comprised of fixturing plate 321, and screen material 412 suitably joined on the outside surface of fixturing plate 321 preferably by sewing, as indicated by dotted line 413. A fabric covering may also be a part of ventilation window 411 as previously described in this specification. Said fabric covering is not shown in FIG. 28L for simplicity, it being apparent that, in practice, said fabric covering is substantially similar to the fabric covering 207 of FIG. 26B and is joined to the fixturing plate 321 of FIG. 28L as a complete assembly.

Window actuating rod 303 extends through an opening in screen 412 in close proximity to the inner edge 419 of fixturing plate 321. A small patch 415 of hook and loop mating fabric is suitably joined to screen material 412 by adhesive, sewing, or other suitable means. Hook and loop fabric patch 415 also has an opening to fit around actuating rod 303.

Hook and loop fabric patch 415 is comprised of a hook fabric patch in direct contact with screen material 412 and a corresponding and identically dimensioned loop fabric patch which is superimposed upon the mating hook fabric patch. Around the perimeter of upper half portion 415B of hook and loop fabric patch 415, both hook fabric patch and mating loop fabric patch are joined to screen material 412; while around the perimeter of lower half portion 415A of hook and loop fabric patch 415, only the hook fabric portion of hook and loop fabric patch 415 is joined to screen material 412, rendering the corresponding loop mating fabric portion of lower half portion 415A of hook and loop fabric patch 415 separable from the hook fabric portion of lower half portion 415A of hook and loop fabric patch 415.

Around the perimeter of actuating rod 303 where actuating rod 303 is in contact with screen material 412, a binding 414 of soft compliant material such as vinyl is suitably joined to screen material 412 by adhesive, sewing, or other suitable means. Binding 414 serves to provide a satisfactory seal between screen material 412 and actuating rod 303, thereby preventing insects from entering the vehicle. In some vehicles, actuating rod 303 is circular in cross section, while in other vehicles, actuating rod 303 is rectangular, as shown in FIG. 28L. In either case, the openings in screen material 412 and hook and loop fabric patch 415, and binding 414 are precisely dimensioned to closely fit against actuating rod 303 to enable a satisfactory seal around actuating rod 303.

Referring again to FIG. 28L, fixturing plate 321 has a split 416 cut from its outer edge 420 to its inner edge 419. A split 410 (shown in phantom) is also present in the hook fabric portion of hook and loop fabric patch 415, from the portion of hook and loop fabric patch 415 which is congruent with the inner edge 419 of fixturing plate 321 to the portion of hook and loop fabric patch 415 which is congruent with the window actuating rod 303. A second split 409 is present in the loop mating fabric portion of hook and loop fabric patch 415.

When ventilation window 411 is installed on the vehicle, the lower edge 416A and upper edge 416B of the split 416 in the fixturing plate 321 are held together by the use of hook and loop fabric. A loop mating fabric patch 418 (shown in phantom) is joined to the outside surface of the fixturing plate 321 by adhesive or other suitable means, along the lower edge 416A of the split 416 in the fixturing plate 321. A hook mating fabric patch 417 is also joined to the outside surface of the fixturing plate 321 by adhesive or other suitable means. Hook mating fabric is only joined to the fixturing plate 321 on the surface along the upper edge 416B of the split 416 in the fixturing plate 321 (i.e. on the side of the split 416 opposite loop mating fabric patch 418). Hook mating fabric patch 417 is dimensioned to extend downward across split 416 and join to loop mating fabric patch 418, thereby securing the two edges 416A and 416B of the split 416 in the fixturing plate 321 together when the ventilation window 411 is installed in the vehicle.

The ventilation window 411 of FIG. 28L is installed on the vehicle in the wedge shaped space 306 between the vehicle window 301 and the sealing gasket 302 of the vehicle 305 shown in FIG. 28A. Referring again to FIG. 28L, the following steps are performed to install the window screen 411 on the vehicle: hook mating fabric patch 417 is separated from loop mating fabric patch 418; the lower half portion 415A of loop mating fabric is separated from corresponding hook mating fabric beneath said loop mating fabric, exposing split 410 in hook fabric portion of hook and loop fabric patch 415 and in screen material 412; fixturing plate 321 is separated at split 416, opening a gap between edges 416A and 416B, and also a gap at split 410 in hook fabric portion of hook and loop fabric patch 415 and in screen material 412; said gap is opened to a width greater than the width of actuating rod 303; ventilation window 411 is positioned preferably beneath actuating rod 303, with the longer dimension of ventilation window 411 oriented downward toward the ground (not shown); ventilation window 411 is moved upward such that actuating rod 303 passes through said gaps in fixturing plate 321 and screen material 412; ventilation window 411 is rotated approximately 90 degrees such that the longer dimension of ventilation window 411 is substantially parallel to the ground, and the location of actuating rod 303 with respect to ventilation window 411 is as shown in FIG. 28L; hook mating fabric 417 is rejoined to loop mating fabric 418, thereby securing edges 416A and 416B together; the lower half portion 415A of loop mating fabric is rejoined to the corresponding hook mating fabric beneath said loop mating fabric, thereby sealing any opening in screen material 412 in proximity to actuating rod 303; and means to compress fixturing plate 321 against vehicle window sealing gasket (not shown) are engaged, thereby securing said ventilation window on the vehicle. Said means to compress fixturing plate 321 against vehicle window sealing gasket are not shown in FIG. 28L for simplicity, it being apparent that, in practice, said means to compress fixturing plate 321 against the vehicle window sealing gasket are joined to the fixturing plate 321 of FIG. 28L as a complete assembly. Many such means have been previously described in this specification, and are shown in FIGS. 28D through 28K.

Figure 28M:
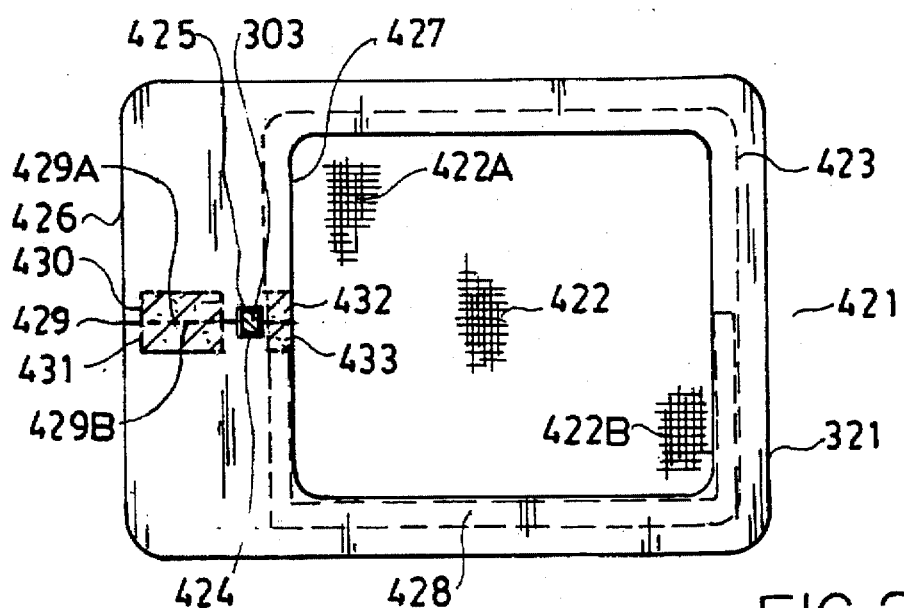
FIG. 28M is a side view of an alternative embodiment of the ventilation window of FIG. 28L.

FIG. 28M is an elevation view of an alternative embodiment of the applicant's ventilation window which has provisions to accommodate the presence of a window actuating rod. This view is from a vantage point looking from the inside of the vehicle outward, i.e. looking at the inside surface of the window screen, which makes contact with the vehicle window gasket when the window screen is installed on the vehicle.

Referring to FIG. 28M, ventilation window 421 is comprised of fixturing plate 321, and screen material 422 joined on the outside surface of fixturing plate 321. The upper half portion 422A of screen material 422 is preferably joined to fixturing plate 321 by sewing, as indicated by dotted line 423 which extends substantially around the perimeter of upper half portion 422A of screen material 422. The lower half portion 422B of screen material 422 is preferably joined to fixturing plate 321 by a strip 428 of hook and loop mating fabric which extends substantially around the perimeter of lower half portion 422A of screen material 422. Strip 428 of hook and loop mating fabric is comprised of a strip of hook fabric joined to fixturing plate 321 preferably by adhesive, and a corresponding strip of loop fabric joined to lower portion 422B of screen material 422 preferably by sewing. A fabric covering may also be a part of ventilation window 421 as previously described in this specification; said fabric covering is not shown in FIG. 28M for simplicity, it being apparent that, in practice, said fabric covering is substantially similar to the fabric covering 207 of FIG. 26B and is joined to the fixturing plate 321 of FIG. 28M as a complete assembly.

Referring again to FIG. 28M, window actuating rod 303 extends through an opening 425 in fixturing plate 321 between outer edge 426 and inner edge 427 of fixturing plate 321. Fixturing plate 321 has a split 429 cut from its outer edge 426 to its inner edge 427. Hook fabric patches 430 and 432 and mating loop fabric patches 431 and 433 are joined to fixturing plate 321 as described for patches 417 and 418 of FIG. 28L. Hook fabric patches 430 and 432 are dimensioned to join with loop fabric patches 431 and 433, respectively, thereby securing edges 429A and 429B of fixturing plate 321 together when the ventilation window 421 is installed on the vehicle. Pieces of gasket material 424 suitably joined to fixturing plate 321 at the edge of the opening 425 provide a satisfactory seal between fixturing plate 321 and actuating rod 303.

The procedure for the installation of the ventilation window 421 of FIG. 28M on the vehicle is analogous to the procedure previously described for the ventilation window 411 of FIG. 28L. Hook fabric patches 430 and 432 are separated from corresponding loop fabric patches 431 and 433 at the start of installation; lower half portion 422B of screen material 422 is separated from fixturing plate 321 by separation of hook and loop mating fabrics of strip 428; fixturing plate 321 is separated at split 429 and moved around actuating rod 303 such that actuating rod 303 is positioned in opening 425 of fixturing plate 321; hook fabric patches 430 and 432 are rejoined to loop fabric patches 431 and 433, respectively; lower half portion 422B of screen material 422 is rejoined to fixturing plate 321; and fixturing plate 321 is positioned and compressed against the vehicle window gasket, and secured by means described earlier in this specification.

Figure 29A:
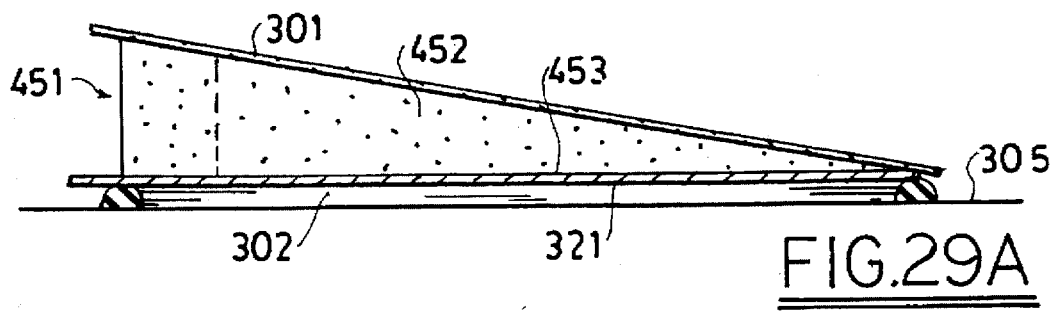
FIG. 29A is a top view of an alternative embodiment of means to compress the ventilation window against the vehicle window gasket using a strip of resilient foam around the perimeter of the ventilation window.
Figure 29B:
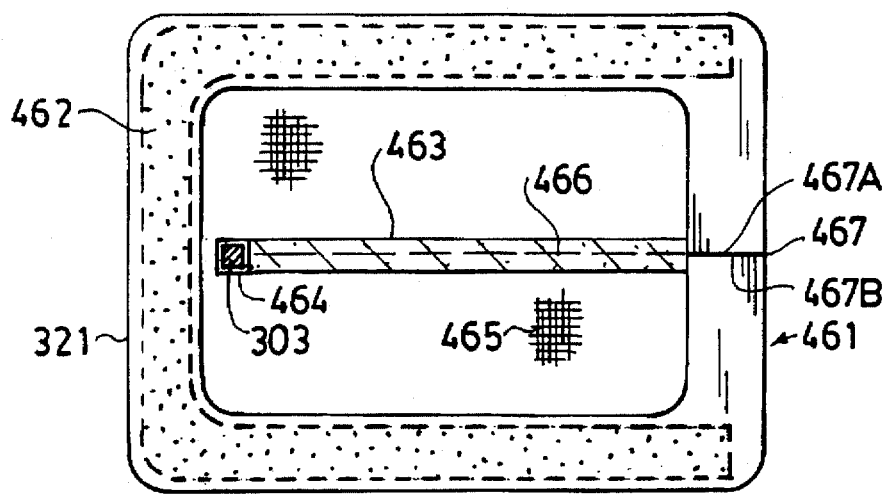
FIG. 29B is a side view of means to compress the ventilation window against the vehicle window gasket using a strip of resilient foam around three sides of the ventilation window, and showing an opening in the ventilation window fixturing plate opposite the window opening mechanism which enables installation of the ventilation window around the window opening mechanism of the vehicle.
Figure 29C:
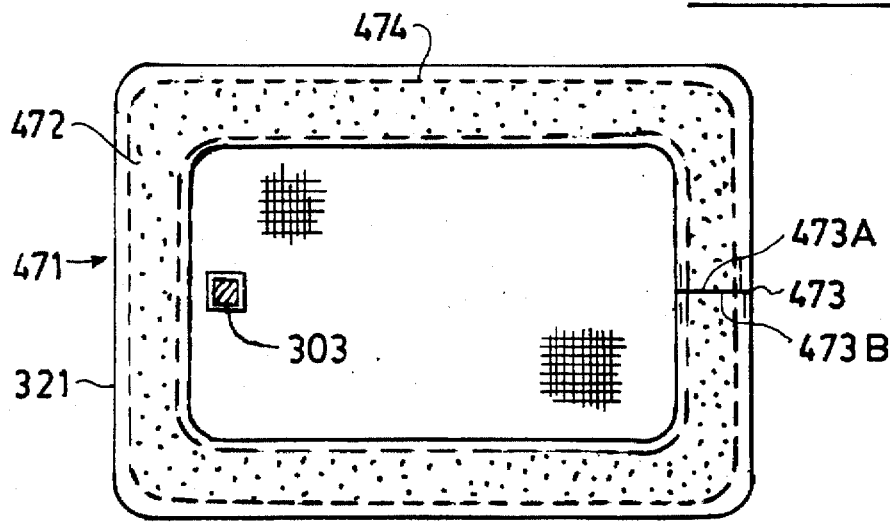
FIG. 29C is a side view of means to compress the ventilation window against the vehicle window gasket using a strip of resilient foam around all sides of the ventilation window, and showing an opening in the ventilation window fixturing plate opposite the window opening mechanism which enables installation of the ventilation window around the window opening mechanism of the vehicle.

FIGS. 29A through 29C are alternative embodiments of the applicant's ventilation window invention; FIG. 29A is a top view of one such embodiment installed on the vehicle. Referring to FIG. 29A, ventilation window 451 is comprised of fixturing plate 321 and wedge-shaped resilient material 452 which is suitably joined to fixturing plate 321 along interface 453, preferably by adhesive. Wedge shaped resilient material 452 is in contact with vehicle window glass 301 and thus compresses the fixturing plate 321 against the window sealing gasket 302 of the vehicle 305.

In one further embodiment of the applicant's ventilation window, wedge shaped resilient material 452 is made of resilient porous material which allows the flow of ventilation air through the ventilation window and into the vehicle. Said resilient porous material may be of intertwined fibrous material, or open cell polymer foam material, such as open cell polyurethane polymer foam.

Such a ventilation window is shown in FIG. 29C, viewed from a vantage point looking from the inside of the vehicle outward, i.e. looking at the inside surface of the ventilation window, which makes contact with the vehicle window gasket when the ventilation window is installed on the vehicle.

Referring to FIG. 29C, ventilation window 471 is comprised of fixturing plate 321 and resilient porous material 472 (shown in phantom) which is joined to the outside surface of fixturing plate 321. Fixturing plate 321 and resilient porous material 472 are split along line 473. Said split along line 473 enables the surfaces 473A and 473B of the fixturing plate 321 and the resilient porous material 472 to be separated, and to allow the window actuating rod 303 to pass between surfaces 473A and 473B during installation of the ventilation window 471 on the vehicle.

It will be apparent to those skilled in the art that patches of hook and loop fabric could be joined to fixturing plate 321 in proximity to the split at line 473 in order to securely join surfaces 473A and 473B together when the ventilation window 471 is installed on the vehicle. Said patches of hook and loop fabric are not shown in FIG. 29C for simplicity, but would be substantially identical in form and function to those described for the ventilation window embodiments previously described and shown in FIGS. 28L and 28M.

It will be further apparent that the location of the split of fixturing plate 321 and resilient porous material 472 along line 473 is not limited to the position shown in FIG. 29C; and it will be further apparent that the use of screen material as a part of the ventilation window 471 of FIG. 29C is not necessary. The resilient porous material 472 allows the passage of ventilation air into the vehicle, while excluding insects.

Referring again to FIG. 29C, it will be further apparent that if resilient porous material 472 is of sufficient rigidity and structural strength, the fixturing plate 321 of the ventilation window 471 could be eliminated; ventilation window 471 would consist only of resilient porous material 472, and suitable means to secure surfaces 473A and 473B together when ventilation window 471 is installed on the vehicle. Resilient porous material 472 would thus be in direct sealing contact with both the vehicle window glass 301 and the vehicle window gasket 302 which are shown in FIG. 29A.

In a further embodiment of the ventilation window 471 of FIG. 29C, a sealing material could be applied along the upper surface 474 of the resilient porous material 472 to prevent the entrance of rain water into said resilient porous material 472. Said sealing material could be a strip of tape which is impervious to water and joined to resilient porous material by adhesive. Said sealing material could also be a coating which would fill and seal the pores of the resilient porous material 472 along upper surface 474. Said coating would preferably be a polymer coating such as polyurethane or silicone polymer. It will be apparent that substantially the same result, i.e. exclusion of rain water from resilient porous material 472 could also be attained by joining a small piece of fabric to the fixturing plate 321 in proximity to the upper surface 474 of the resilient porous material 472. Said piece of fabric would be dimensioned to cover the upper surface 474 of the resilient porous material 472 when the ventilation window 471 is installed on the vehicle.

An alternative embodiment of the applicant's ventilation window is shown in FIG. 29B, viewed from a vantage point looking from the inside of the vehicle outward, i.e. looking at the inside surface of the ventilation window, which makes contact with the vehicle window gasket when the ventilation window is installed on the vehicle.

Referring to FIG. 29B, applicant's ventilation window 461 is comprised of fixturing plate 321, resilient porous material 462, and screen material 465. Resilient porous material 462 is joined to fixturing plate 321 preferably by adhesive, and resilient porous material 462 occupies substantially three out of four sides of the quadrilateral shaped fixturing plate 321. Because resilient porous material does not completely cover all sides of fixturing plate 321, it is preferable to have screen material 465 joined to fixturing plate 321 as described previously for other embodiments of the applicant's ventilation window, for the purpose of preventing insects from entering the vehicle.

Line 467 depicts a split in fixturing plate 321 and dotted line 466 depicts a split in screen material 465. Said splits are present to enable fixturing plate 321 and screen material 465 to be opened during installation of the ventilation window 461 on the vehicle, thereby allowing window actuating rod 303 to be located in the position shown when installation of the ventilation window 461 on the vehicle is completed. Hook and loop mating fabric strip 463, which is suitably joined to screen material 465, is used to seal the split in screen material 465 when installation of the ventilation window 461 on the vehicle is completed. Compliant binding material 464 is suitably joined to screen material 465 to provide a satisfactory seal around window actuating rod 303.

It will be apparent that hook and loop fabric patches could be joined to fixturing plate 321 in proximity to the split indicated by line 467 and used to secure the edges 467A and 467B to each other when the ventilation window 461 is installed on the vehicle, as previously described in this specification for the ventilation window embodiments shown in FIGS. 28L and 28M. It will be further apparent that the practice of splitting the fixturing plate 321 and the screen material 465 of ventilation window 461 at the locations shown in FIG. 29B could also be applied to the ventilation window 411 of FIG. 28L. In other words, an alternative embodiment of ventilation window 411 of FIG. 28L could be split on the side furthest away from actuating rod 303, with screen material 412 suitably split as shown for screen material 465 of FIG. 29B.

Figure 30A:
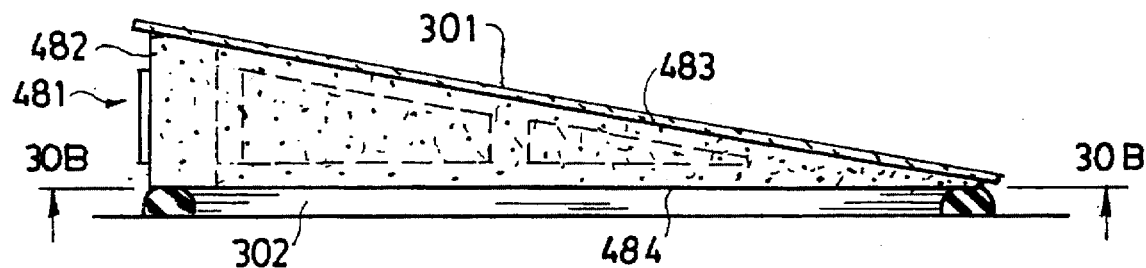
FIG. 30A is a top view of an alternative embodiment of a ventilation window made of a resilient foam or mesh material which can be fitted to vehicles with louver style windows.

FIG. 30A is a top view of an alternative embodiment of the applicant's ventilation window shown installed on a vehicle. Referring to FIG. 30A, ventilation window 481 is comprised of a wedge shaped piece of resilient material 482 which is in continuous contact with window glass 301 at surface 483, and vehicle window gasket 302 at surface 484. Resilient material 482 may be fabricated of any material which will deform when compressed, and subsequently return to its original dimensions when compressive force is released. Resilient material 482 is preferably of a low density, i.e. a specific gravity of less than one (1.0). For example, resilient material 482 may be fabricated of closed cell polypropylene foam.

Figure 30B:
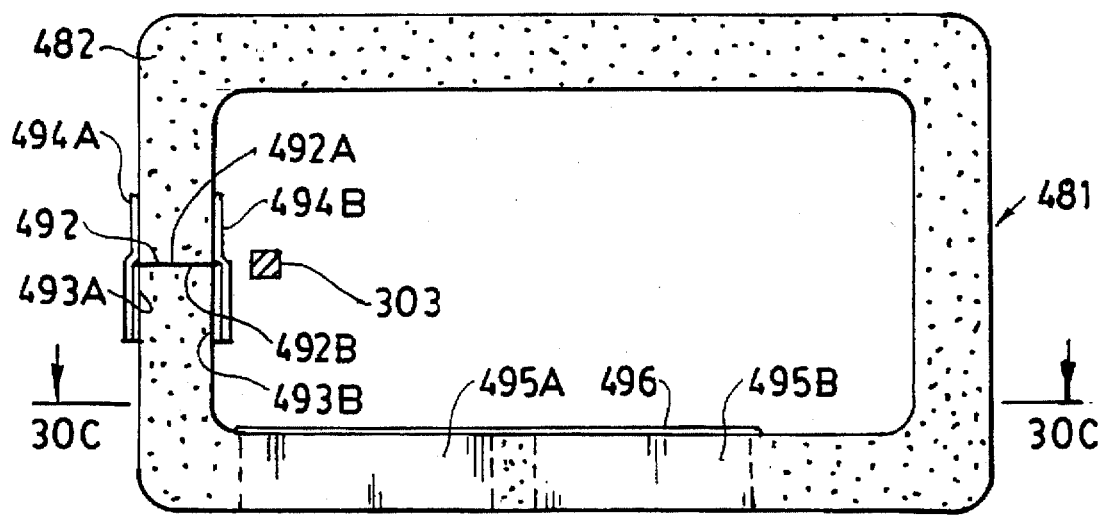
FIG. 30B is a side view of the ventilation window of FIG. 30A.

FIG. 30B is a sectional view of the ventilation window 481 of FIG. 30A, taken at the plane defined by the pair of lines 30B—30B of FIG. 30A. Referring to FIG. 30B, wedge shaped piece of resilient material 482 has a split 492 which can be separated during the installation of the ventilation window 481 on the vehicle in order to allow the ventilation window 481 to accommodate the presence of window actuating rod 303. The surfaces 492A and 492B of split 492 can be held securely together when the ventilation window 481 is installed on the vehicle by joining hook fabric patch 494A to loop mating fabric patch 493A, and hook fabric patch 494B to loop mating fabric patch 493B.

Referring again to FIG. 30B, wedge shaped piece of resilient material 482 of the ventilation window 481 has openings 495A and 495B to allow the flow of ventilation air into the vehicle. Openings 495A and 495B are covered with screen material 496 to prevent the entrance of insects into the vehicle. Although openings 495A and 495B could be located at numerous locations on ventilation window 481, openings 495A and 495B are preferably located on the lower portion of ventilation window 481, i.e. below the plane defined by the pair of lines 30C—30C of FIG. 30B.

Figure 30C:
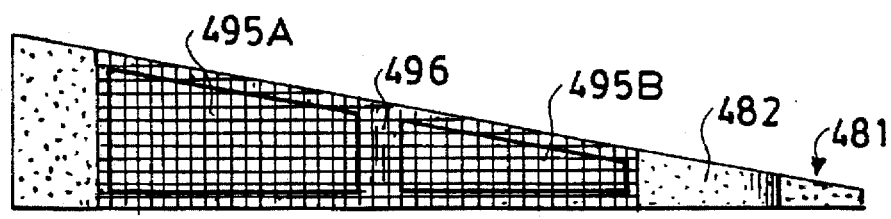
FIG. 30C is a sectional view of the ventilation window of FIG. 30B showing openings for the passage of ventilation air through the ventilation window.

FIG. 30C is a sectional view of the lower portion of ventilation window 481 of FIG. 30B showing the ventilation openings 495A and 495B in more detail, taken at the plane defined by the pair of lines 30C—30C of FIG. 30B. Referring to FIG. 30C, openings 495A and 495B are substantially trapezoidal in shape, and are covered with screen material 496 which is preferably joined to resilient material 482 by adhesive means. Alternatively, openings 495A and 495B could be filled with open cell polymer foam, or fibrous mesh material which would allow the flow of ventilation air into the vehicle while preventing the entrance of insects into the vehicle.

Figure 31A:
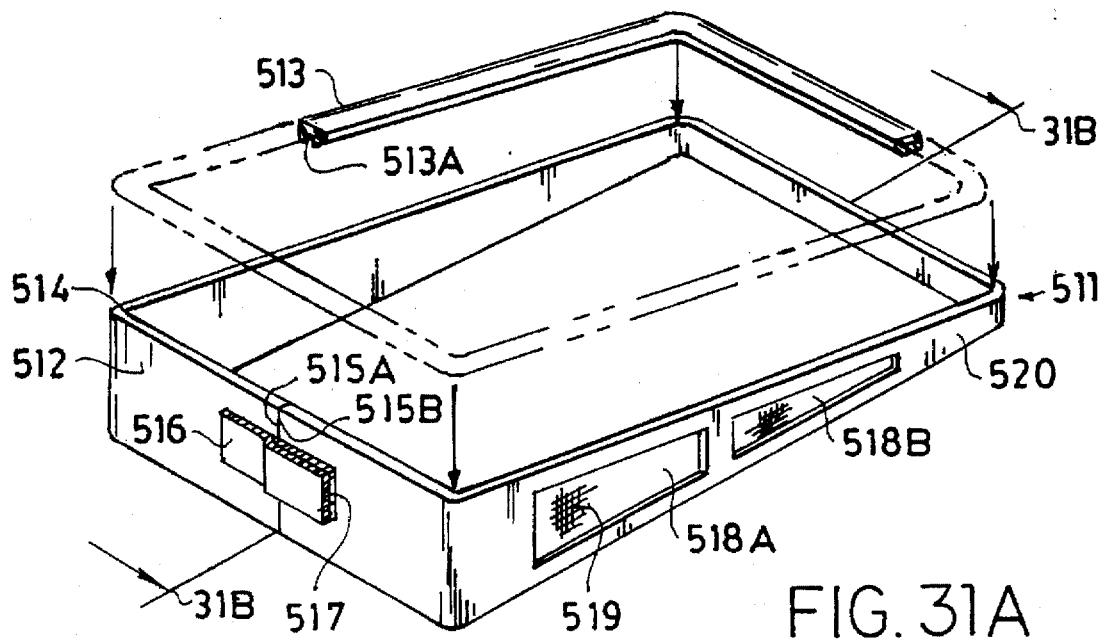
FIG. 31A is a perspective view of an alternative embodiment of a ventilation window made of a semi-rigid sheet material which can be fitted to vehicles with louver style windows.

FIG. 31A is a perspective view of an alternative embodiment of the applicant's ventilation window. Referring to FIG. 31A, ventilation window 511 is comprised of a wedge shaped rigid box 512. Rigid box 512 may be made of any suitable rigid material which can be fabricated into a sheet for and subsequently further formed into a box shape. For example, wedge shaped rigid box 512 could be made of plywood, sheet steel, sheet aluminum, and the like. Wedge shaped rigid box 512 is preferably made of plastic sheet which can be cut on a flat surface and formed into a box configuration. In one preferred embodiment, plastic polypropylene sheet ⅛ inch thick was found to be a satisfactory material for wedge shaped rigid box 512.

Referring again to FIG. 31A, ventilation window 511 is preferably also comprised of weather strip gasket 513 which is suitably joined to and completely covers the perimeter edge 514 of wedge shaped rigid box 512. When ventilation window 511 is installed on the vehicle, weather strip gasket 513 provides a satisfactory seal between the vehicle window glass and ventilation window 511.

Referring again to FIG. 31A, ventilation window 511 is preferably provided with a split 515 which allows the wedge shaped rigid box 512 to be separated at said split 515 so that the presence of a window actuating rod of the vehicle can be accommodated as described earlier in this specification. Patches of hook fabric 516 and loop mating fabric 517 are suitably joined to wedge shaped rigid box in proximity to split 515. Hook fabric 516 and loop mating fabric 517 are used to securely rejoin the surfaces 515A and 515B of the wedge shaped rigid box after installation of the ventilation window 511 on the vehicle.

Wedge shaped rigid box is also provided with ventilation openings 518A and 518B, which are covered with screen material 519, which is suitably joined to wedge shaped rigid box 512. Screen material 519 serves to allow the flow of ventilation air into the vehicle while preventing the entrance of insects into the vehicle. Detail on screen material 519 is not provided in FIG. 31A for simplicity, it being apparent that the dimensioning of screen material 519 would be substantially the same as described for screen material 496 of the ventilation window 481 shown in FIG. 30C and previously described in this specification.

In an alternative embodiment of the ventilation window of FIG. 31A, a plurality of small holes can be provided in wedge shaped rigid box 512 in place of openings 518A and 518B and screen material 519 in substantially the same location as openings 518A and 518B, thereby achieving substantially the same result of ventilation air flow and insect resistance of the ventilation window. It will be apparent that openings 518A and 518B are preferably located along surface 520 of the wedge shaped rigid box 512, but said openings 518A and 518B could also be located on other surfaces of the wedge shaped rigid box 512.

Figure 31B:
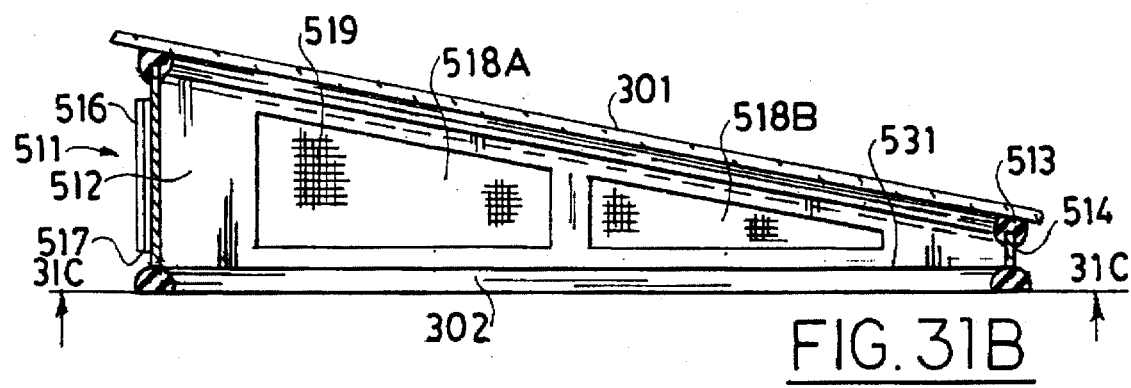
FIG. 31B is a sectional view of the ventilation window of FIG. 31A showing openings for the passage of ventilation air.

FIG. 31B is a sectional view of the ventilation window 511 of FIG. 31A, taken at the plane defined by the pair of lines 31B—31B of FIG. 31A, showing the applicant's ventilation window installed on the vehicle. Referring to FIG. 31B, weather strip gasket 513 is in continuous contact with vehicle window glass 301, and edge 531 of wedge shaped rigid box 512 is in continuous contact with vehicle window gasket 302, thereby achieving a satisfactory seal of ventilation window 511 to the vehicle.

Figure 31C:
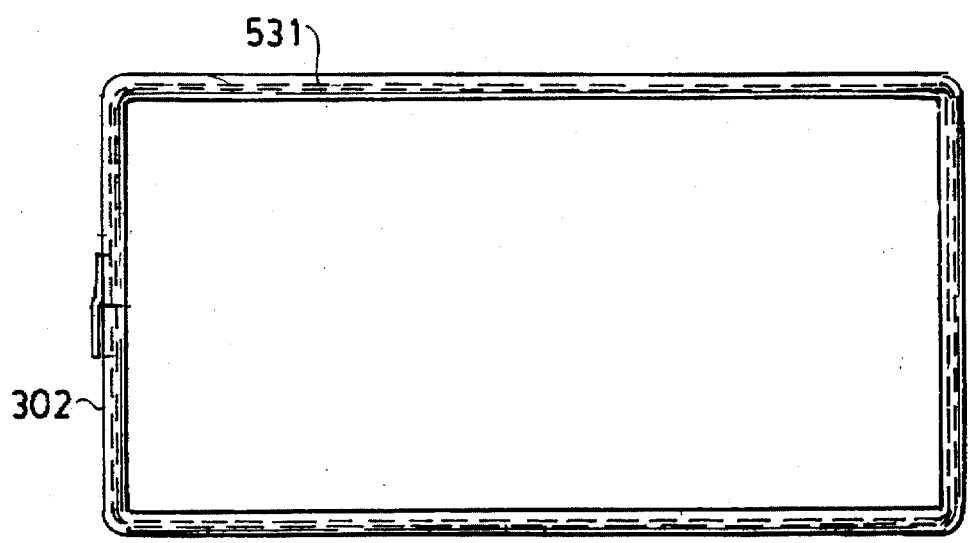
FIG. 31C is a side view of a section of the ventilation window of FIG. 31B showing contact of the edge of the ventilation window with the window sealing gasket of the vehicle.

FIG. 31C is a sectional view of the vehicle window gasket 302 and the wedge shaped rigid box 512 of FIG. 31B, taken at the plane defined by the pair of lines 31C—31C of FIG. 31B, further showing the contact of the applicant's ventilation window with the vehicle sealing gasket. Referring to FIG. 31C, vehicle window sealing gasket 302 is in continuous contact with edge 531 (shown in phantom) of the wedge shaped rigid box 512 of the applicant's ventilation window 511 of FIG. 31B.

Figure 32A:
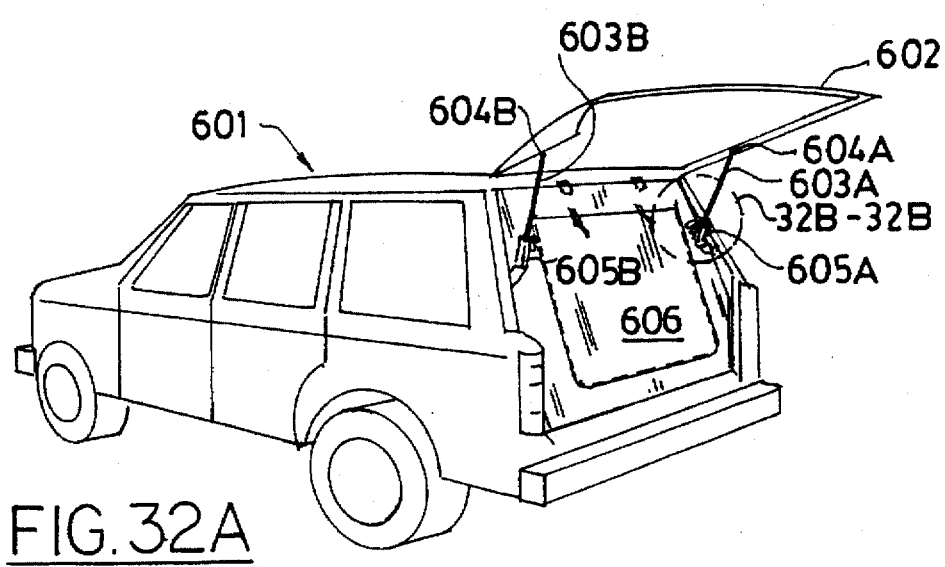
FIG. 32A is a perspective view of the rear portion of a vehicle with a liftgate in the open position; with said liftgate held open by tubular supporting struts; with one embodiment of the applicant's camping enclosure installed on said vehicle; and with said struts passing through sleeves attached to said camping enclosure, to attachment points within the interior of said vehicle.

FIG. 32A is a further embodiment of the applicant's tent like enclosure which is designed for vehicles with a liftgate door which is raised vertically and held in the open position by supporting struts which are joined to the vehicle at attachment points within the vehicle interior. The 1994 Jeep Grand Cherokee, and the 1994 Dodge Caravan, both sold by the Chrysler Corporation of Detroit, Mich., are examples of vehicles equipped with liftgates which are held in the open position by supporting struts which are joined to the vehicle at attachment points within the vehicle interior.

Referring to FIG. 32A, the applicant's camping enclosure 606 is fitted to vehicle 601. Vehicle 601 is equipped with liftgate 602 which is held in the open position by support struts 603A and 603B. Support struts 603A and 603B are suitably attached to liftgate 602 at points 604A and 604B.

The further attachment of support struts 603A and 603B to the vehicle 601 occurs at attachment points within the vehicle interior; said attachment points are not shown in FIG. 32A. It can be seen that the attachment and position of the applicant's camping enclosure 606 on the vehicle 601 is substantially the same as the camping enclosure 105 of FIG. 18, which has been described previously in this specification. It will be apparent that due to the manner in which the camping enclosure 606 of FIG. 32A is attached to the vehicle 601, and due to the attachment of liftgate support struts 603A and 603B at points inside the interior of the vehicle, it is necessary that liftgate support struts 603A and 603B pass through the applicant's camping enclosure 606 when said enclosure 606 is installed on the vehicle 601.

Referring again to FIG. 32A, in order to accommodate the passage of liftgate support struts 603A and 603B through the camping enclosure 606, fabric sleeves 605A and 605B are suitably attached to camping enclosure 606, and said fabric sleeves 605A and 605B provide the required openings for liftgate support struts 603A and 603B. Fabric sleeves 605A and 605B are designed to provide a weatherproof seal around liftgate support struts 603A and 603B; and to enable the applicant's camping device 606 to be easily installed on the vehicle 601 without disassembly of any components of the vehicle 601, the liftgate 602, or the support struts 603A and 603B.

FIGS. 32B through 32D are detailed views of one preferred embodiment of the fabric sleeve 605A of FIG. 32A. Referring to FIG. 32B, fabric sleeve 605A is comprised of sleeve hook and loop mating fabric juncture 611, flap hook and loop mating fabric juncture 612, and drawstring 613, all suitably joined to fabric enclosure 615. Fabric sleeve 605A is shown in a partially unfastened condition in FIG. 32C, and in a completely unfastened condition in FIG. 32D.

Fabric sleeve 605A must be in the unfastened condition shown in FIG. 32D in order to install the applicant's camping enclosure 606 of FIG. 32A on the vehicle. Referring to FIG. 32D, camping enclosure 606 of FIG. 32A is comprised of fixturing plate sections 614A and 614B; hinge 616 with removable pin (not shown), hinge upper half 616A, and hinge lower half 616B; and fabric covering 615. The design and function of the fabric covering 615, fixturing plate sections 614A and 614B, and the hinge 616 have been previously described in this specification, and are shown in FIGS. 18 through 23C.

Referring again to FIG. 32D, to install the camping enclosure 606 on the vehicle, the removable pin (not shown)

is removed from the hinge 616, and fixturing plate sections 614A and 614B are separated from each other. Camping enclosure 606 is moved such that support strut 603A passes between fixturing plate sections 614A and 614B in close proximity to hinge upper half 616A and hinge lower half 616B. Hinge upper half 616A and hinge lower half 616B are then secured to each other with a removable pin (not shown), thereby joining fixturing plate sections 614A and 614B to each other. Camping enclosure 606 is then suitably secured to the vehicle at the liftgate hinge brackets, seat belt eyelets, cargo loops, etc., as described earlier in this specification. Fabric sleeve 605A of camping enclosure 606 is then in the state shown in FIG. 32D.

Continuing the installation of the camping enclosure 606 on the vehicle, fabric flap 618 with hook fabric 612A of FIG. 32D is moved downward. Fabric flap 618 with hook fabric 612A covers and joins securely to mating loop fabric 612B, resulting in the flap hook and loop mating fabric juncture 612 of FIG. 32C.

Further continuing the installation of the camping enclosure 606 on the vehicle, fabric section 619B with loop mating fabric 611B of FIG. 32C is wrapped around support strut 603A, and fabric section 619A with hook fabric—611A is subsequently wrapped around support strut 603A and loop mating fabric 611B. Fabric section 619A with hook fabric 611A is contiguous with fabric section 619B with loop mating fabric 611B in the space behind support strut 603A, and fabric section 619A with hook fabric 611A covers over and joins securely to fabric section 619B with loop mating fabric 611B, resulting in the sleeve hook and loop mating fabric juncture 611 of FIG. 32B.

Referring to FIG. 32B, to further secure the sleeve hook and loop mating fabric juncture 611 to the support strut 603, and provide a satisfactory seal between said fabric juncture 611 and said support strut 603A, drawstring 613 (comprised of drawstring ends 613A and 613B of FIG. 32C) is tightly tied, compressing the upper edge 617 of the fabric juncture 611 to the support strut 603A. To enhance the seal of upper edge 617 of the fabric juncture 611 to the support strut 603A, a small piece of compliant binding material (not shown) such as vinyl binding could be suitably joined to the upper edge 617 of the fabric juncture 611. Alternatively, the vehicle support strut 603 could be fitted with a cylindrical sleeve of plastic, rubber, or other suitable material which could be slid or unrolled down over the sleeve hook and loop mating fabric juncture 611 when the installation of the camping enclosure 606 to the vehicle is completed.

It will be apparent that the various fabric sections and hook and loop mating fabrics of the fabric sleeve 605A of FIG. 32B will be suitably joined to the fabric cover 615 of the camping enclosure 606 by sewing, adhesive, fabric welding, or other suitable means known in the art of textile product manufacturing. It will be further apparent that the fabric sleeve 605B of FIG. 32A is a mirror image of the fabric sleeve 605A, and that the design and assembly of fabric sleeve 605B is identical to that of fabric sleeve 605A.

It is known that some sport utility vehicles and minivans are comprised liftgates, tailgates, cargo doors, or sliding doors, which have the door or gate sealing gasket joined to the particular door or gate of the vehicle, rather than to the surface around the perimeter of the door or gate opening of the vehicle. An example of such a vehicle is the 1995 Pontiac Transport minivan, sold by the General Motors Corporation of Detroit, Mich.

The Pontiac Transport minivan has the sealing gasket for the liftgate of the vehicle joined to said liftgate, so that when said liftgate is opened, there is no gasket present around the perimeter of the liftgate opening at the rear of the vehicle. Therefore, for vehicles such as the Pontiac Transport and the like, it is necessary to incorporate a sealing gasket with the applicant's camping enclosure in order to achieve a satisfactory seal between said camping enclosure and the vehicle. Said sealing gasket is preferably positioned on the camping enclosure such that when said camping enclosure is installed on the vehicle, said sealing gasket of said camping enclosure is in contact with the same surface on the vehicle as said liftgate gasket of said vehicle contacts when said liftgate is closed.

FIG. 19 shows a typical fixturing plate of the applicant's camping enclosure. Referring to FIG. 19, dotted line 192 represents the typical contact around the perimeter of the fixturing plate 110 between the applicant's camping enclosure and the vehicle liftgate opening gasket, as previously described in this specification. For vehicles with a gasket which is joined to the liftgate, it will be apparent that a gasket joined to the camping enclosure in close proximity to the dotted line 192 on the perimeter of fixturing plate 110 will make a satisfactory seal between said camping enclosure and said vehicle.

As described previously in this specification, FIG. 20A shows the spatial relationship between the liftgate opening gasket, and the fabric covering and fixturing plate of the applicant's camping enclosure. Referring to FIG. 20A, fixturing plate 110 is nested in a pocket of fabric formed by the joining of fabric sections 111A and 111B of the fabric cover 111 of camping enclosure 105. Said camping enclosure 105 is compressed against the liftgate sealing gasket 193 by suitable means previously described in this specification, thereby achieving a satisfactory seal between the camping enclosure 105 and the vehicle liftgate gasket 193.

For vehicles in which the liftgate gasket is joined to the liftgate of the vehicle, rendering the liftgate door opening without a gasket, a gasket can be suitably joined to the camping enclosure to achieve substantially the same result as described for FIG. 20A.

Figure 33:
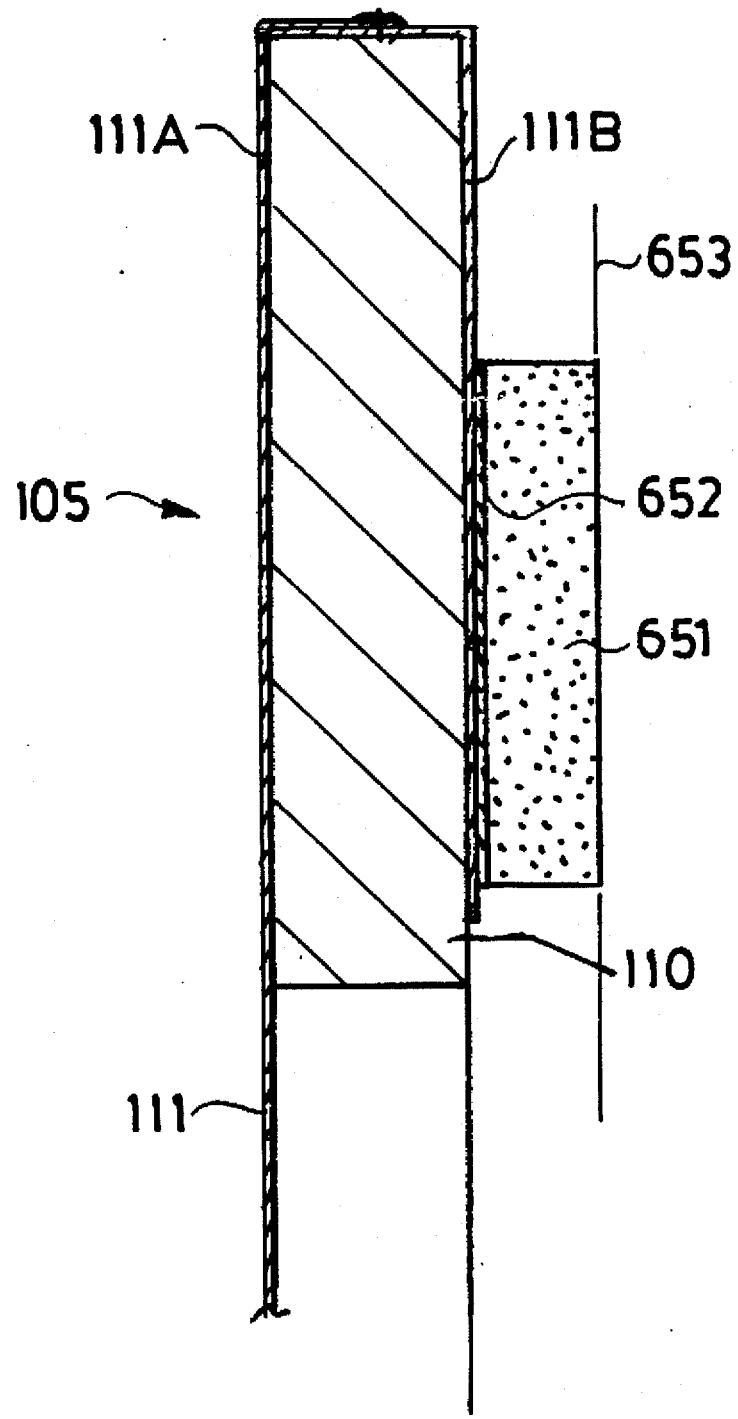
FIG. 33 is a cross sectional view of a sealing gasket joined to the surface of a fabric covering of the applicant's camping enclosure, to be used on vehicles which lack a gasket around the perimeter of the opening of the vehicle.

FIG. 33 is a sectional view of one preferred embodiment of a sealing gasket joined to the applicant's camping enclosure. Referring to FIG. 33, the fixturing plate 110 of the applicant's camping enclosure 105 is nested between fabric sections 111A and 111B of fabric covering 111. Gasket 651 is suitably joined to fabric section 111B of the camping enclosure 105, preferably by a thin film of adhesive 652. When the applicant's camping enclosure 105 is secured to the vehicle, said gasket 651 makes a satisfactory seal with the liftgate sealing surface 653 of the vehicle.

Said gasket 652 of FIG. 33 may be of any resilient material commonly used for such purposes, such as foam rubber strip of Buna N, neoprene, and the like. One preferred gasket would be of the material used by the auto manufacturer to fabricate the gasket which is joined to the liftgate; a suitable adhesive would be the adhesive used to join said gasket to the liftgate.

It will be apparent that the sealing of the applicant's camping enclosure to the vehicle by the use of integral sealing gasket 651 of FIG. 33 is not limited to vehicles equipped with a liftgate. Said integral sealing gasket invention may be applied to camping enclosures for any vehicles which are equipped with tailgates, cargo doors, sliding doors, and the like, and which have the sealing gaskets for said doors or gates joined to said doors or gates.

Figure 34:
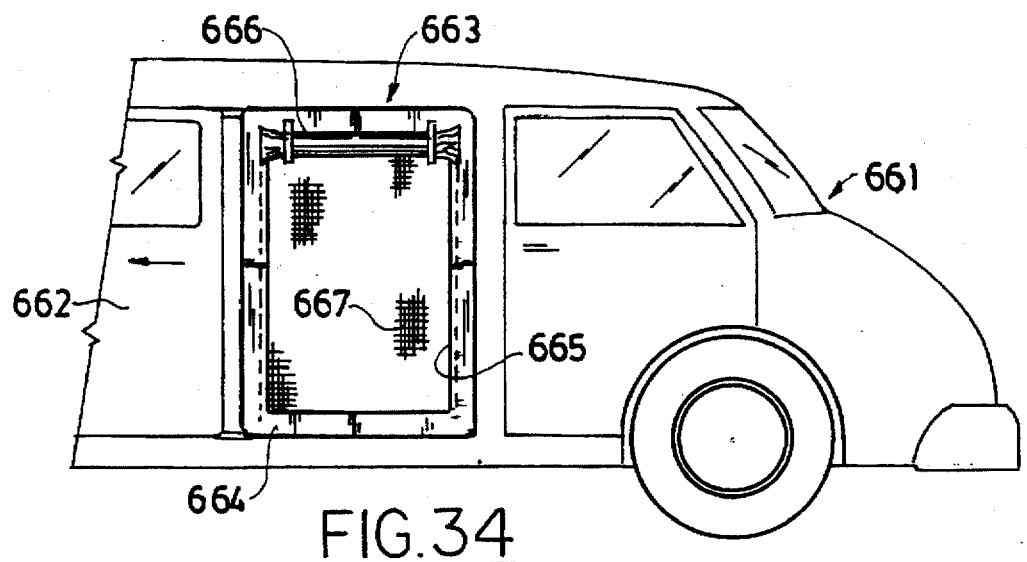
FIG. 34 is a side view of a typical van or minivan type vehicle with a side door opening, and with the applicant's camping enclosure shown installed in said side door opening.

FIG. 34 is an alternate embodiment of the applicant's camping enclosure which is designed to be used on vehicles with a side door which opens by sliding said door towards the rear of the vehicle. Such vehicles are typically minivan vehicles. An example of such a vehicle is the 1996 Dodge Caravan, sold by the Chrysler Corporation of Detroit, Mich.

Referring to FIG. 34, sliding door 662 is opened toward the rear of the vehicle 661, providing an opening for the installation of the applicant's camping enclosure 663. Said camping enclosure is comprised of a fixturing plate (not shown), screen material 667, a fabric cover 664 with zipper 665, and flap of fabric 666 which can be rolled up and suitably secured in the open position. The design and function of this embodiment of the applicant's camping enclosure is substantially identical to the camping enclosure embodiment previously described for a vehicle equipped with a liftgate, and shown in FIGS. 18 through 24.

As previously described for a camping enclosure for a vehicle with a liftgate, the camping enclosure 663 of FIG. 34 is sealed against the door gasket (not shown) located around the perimeter of the door opening of the vehicle 661 by drawing the fixturing plate (not shown) of the camping enclosure 663 against the door gasket, thereby achieving a satisfactory seal between the camping enclosure 663 and the vehicle 661. Means to draw the fixturing plate of the camping enclosure 663 inward into compression against the vehicle door gasket include, but are not limited to the following: elastic cord means, suitably joined at one end of said cord means to the fixturing plate of the camping enclosure and further joined at the opposite end of said cord means to vehicle seat belt eyelets, vehicle cargo loops, vehicle clothes hanging hooks, vehicle seat retaining anchors and structures, and the like; bracket means including hook brackets, J-brackets, clevis brackets, clamp brackets, rotatable brackets, V-shaped brackets, and the like; threaded fastener means including screws, hex bolts, U-bolts, threaded hooks, threaded eyebolts turnbuckles, and the like; hook and loop fabric means; snap means; and cable means.

It will be known to those skilled in the art that most vehicles equipped with a side door which is opened by sliding said door rearward are also comprised of a guide bracket which is attached to said vehicle and said door. When said door is in the open position, said guide bracket is typically positioned in the lower rearward corner of said door opening. It is preferable to make provisions in the design of the applicant's camping enclosure to enable said camping enclosure to seal around said guide bracket in order to achieve a satisfactory seal of said camping enclosure to said vehicle.

One preferred means to enable said camping enclosure to seal around said guide bracket would be to provide a fabric sleeve structure and fixturing plate hinge with removable pin in proximity to said guide bracket, analogous to the means used to seal the applicant's camping enclosure around a liftgate support strut, which is shown in FIGS. 32A through 32D and previously described in this specification.

Figure 35A:
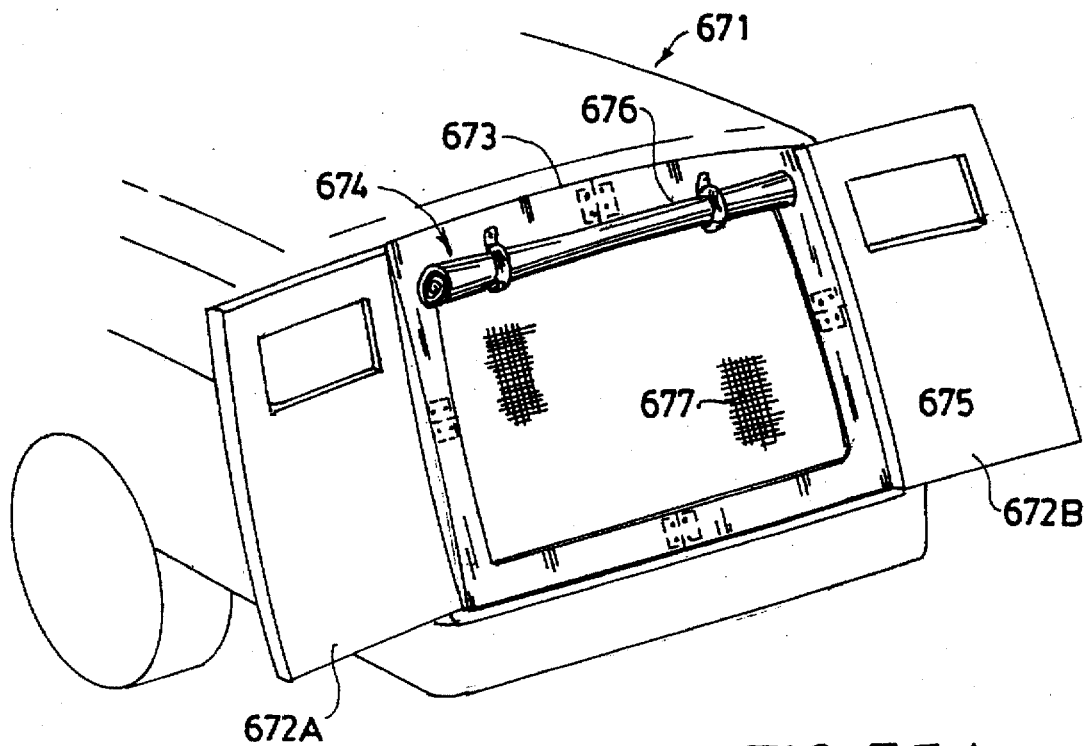
FIG. 35A is a perspective view of the rear portion of a vehicle equipped with a pair of cargo doors at a rearward opening, and with the applicant's camping enclosure shown installed in said rearward opening, with both cargo doors in the open position.

FIG. 35A is an alternate embodiment of the applicant's camping enclosure which is designed to be used on vehicles with a pair of cargo doors which are attached with hinges and which open by swinging outward horizontally. An example of such a vehicle is the 1995 Chevrolet Suburban, sold by the Chevrolet Division of General Motors Corporation of Detroit, Mich.

Referring to FIG. 35A, cargo doors 672A and 672B are opened at the rear of the vehicle 671, providing an opening for the installation of the applicant's camping enclosure 673. Said camping enclosure is comprised of a fixturing plate (not shown), screen material 677, a fabric cover 674 with zipper 675, and flap of fabric 676 which can be rolled up and suitably secured in the open position. The design and function of this embodiment of the applicant's camping enclosure is substantially identical to the camping enclosure embodiment previously described for a vehicle equipped with a liftgate, and shown in FIGS. 18 through 24.

As previously described for a camping enclosure for a vehicle with a liftgate, the camping enclosure 673 of FIG. 35A is sealed against the door gasket (not shown). Said door gasket is located around the perimeter of the door opening of the vehicle 671 by drawing the fixturing plate (not shown) of the camping enclosure 673 against the door gasket, thereby achieving a satisfactory seal between the camping enclosure 673 and the vehicle 671. Means to draw the fixturing plate of the camping enclosure 673 inward into compression against the vehicle door gasket include, but are not limited to the following: elastic cord means, suitably joined at one end of said cord means to the fixturing plate of the camping enclosure and further joined at the opposite end of said cord means to vehicle seat belt eyelets, vehicle cargo loops, vehicle cargo net hooks or spools, vehicle clothes hanging hooks, vehicle seat retaining anchors and structures, and the like; bracket means including hook brackets, J-brackets, clevis brackets, clamp brackets, rotatable brackets, V-shaped brackets, brackets joined to the door hinge supports, brackets joined to door latch structures, and the like; threaded fastener means including screws, hex bolts, U-bolts, threaded hooks, threaded eyebolts turnbuckles, and the like; hook and loop fabric means; snap means; and cable means.

Figure 35B:
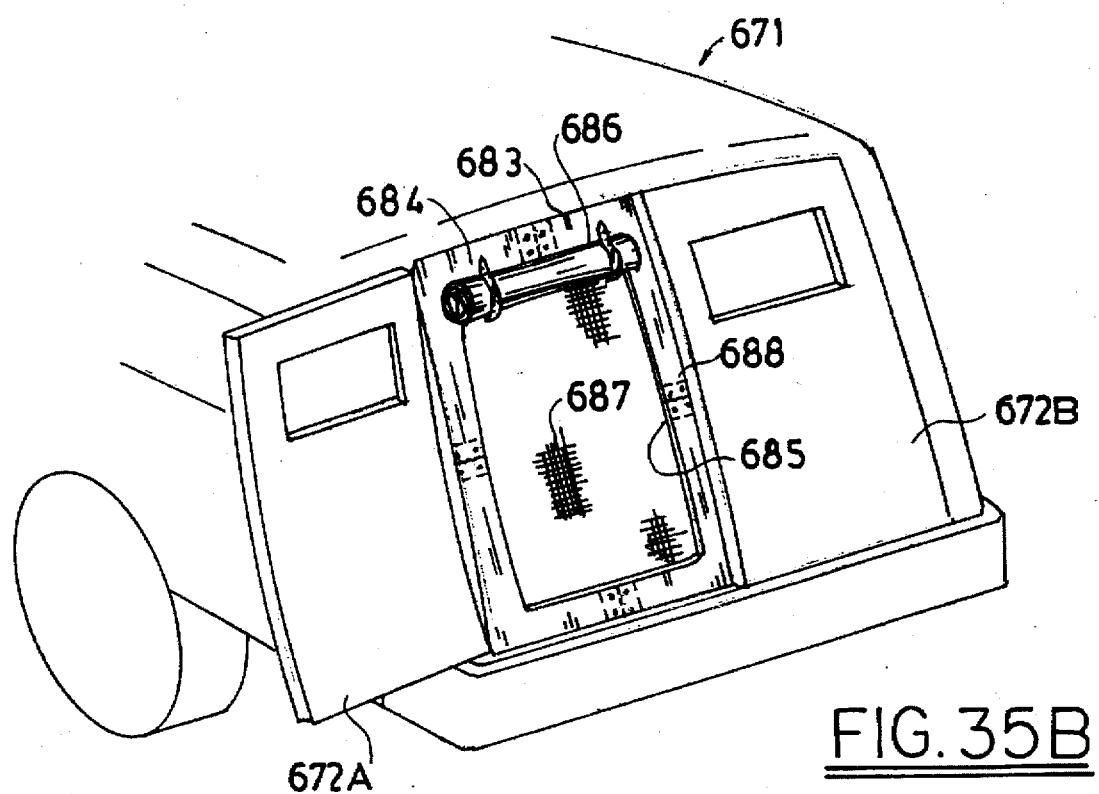
FIG. 35B is a perspective view of the rear portion of a vehicle equipped with a pair of cargo doors at a rearward opening, and with the applicant's camping enclosure shown installed in the rearward opening which is present when one cargo door of the vehicle is closed, and one cargo door of the vehicle is open.

FIG. 35B is an alternate embodiment of the applicant's camping enclosure which is designed to be used on the vehicle 671 of FIG. 35A where one cargo door is closed and one cargo door is open. Referring to FIG. 35B, cargo door 672B is closed and cargo door 672A is opened at the rear of the vehicle 671, providing an opening for the installation of the applicant's camping enclosure 683. Said camping enclosure is comprised of a fixturing plate (not shown), screen material 687, a fabric cover 684 with zipper 685, and flap of fabric 686 which can be rolled up and suitably secured in the open position. The design and function of this embodiment of the applicant's camping enclosure is substantially identical to the camping enclosure embodiment previously described for a vehicle equipped with a liftgate, and shown in FIGS. 18 through 24.

It will be apparent that near the edge 688 of the camping enclosure 683 which is in contact with the cargo door 672B, a seal of the camping enclosure 683 to the vehicle 671 is achieved by contact of the camping enclosure 683 with a strip of gasket material (not shown) which is suitably joined to the cargo door 672B. Said gasket material which is joined to cargo door 672B normally provides a seal between cargo doors 672A and 672B when both cargo doors 672A and 672B are closed. It will be further apparent that the means to secure the camping device 683 of FIG. 35B to the vehicle 671 are substantially identical to the means previously described to secure the camping device 673 of FIG. 35A to the vehicle 671.

Figure 36:
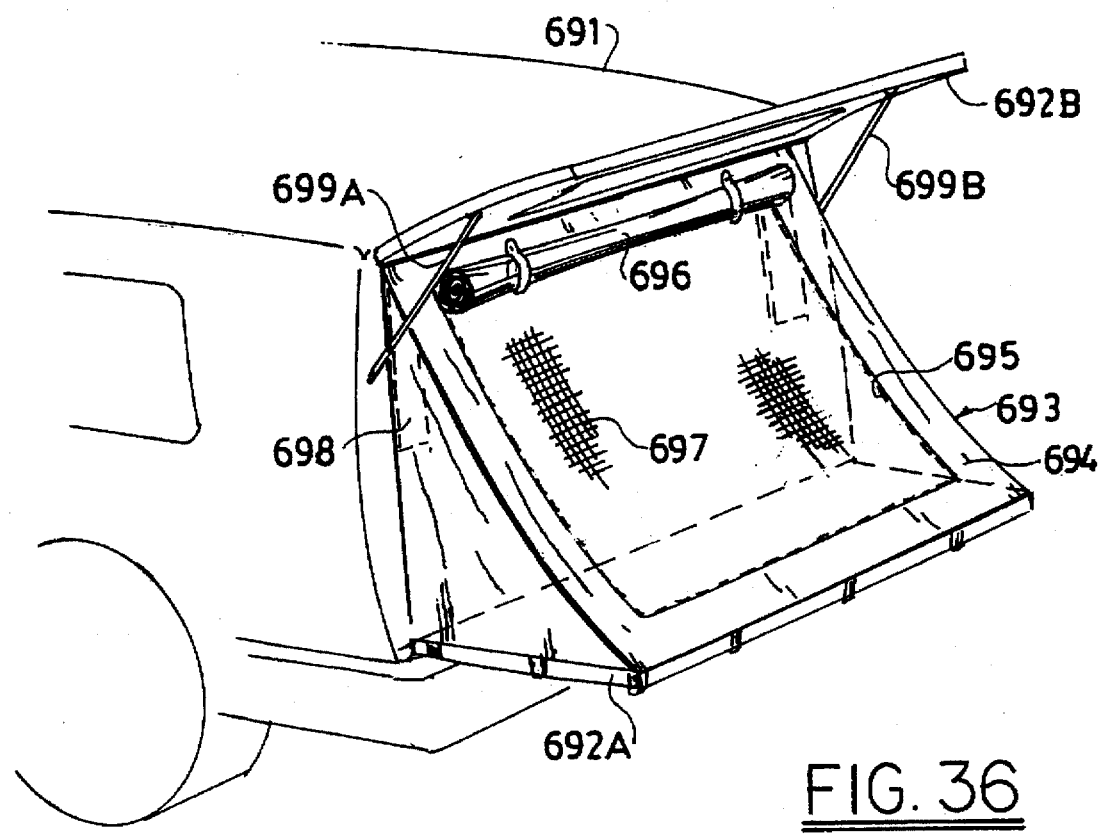
FIG. 36 is a perspective view of the rear portion of a vehicle equipped with a hinged window which opens in the upward and outward direction, and a tailgate which opens in the downward direction to create a rear opening; and with the applicant's camping enclosure shown installed in said rear opening, with said tailgate and said window in the open position.

FIG. 36 is an alternate embodiment of the applicant's camping enclosure which is designed to be used on vehicles with a rear window which is attached to the vehicle with hinges and which opens by swinging outward and upward, and with a tailgate which is attached to the vehicle with hinges and which opens by swinging outward and downward to a substantially horizontal position. An example of such a vehicle is the 1995 Chevrolet Blazer, sold by the Chevrolet Division of General Motors Corporation of Detroit, Mich.

Referring to FIG. 36, tailgate 692A and window 692B are opened at the rear of the vehicle 691, providing an opening for the installation of the applicant's camping enclosure 693. Said camping enclosure 693 is comprised of a fixturing plate 698 (shown in phantom) screen material 697, a fabric cover 694 with zipper 695, and flap of fabric 696 which can be rolled up and suitably secured in the open position.

The function of this embodiment of the applicant's camping enclosure is substantially identical to the camping enclosure embodiment previously described for a vehicle equipped with a tailgate with a window which retracts into the tailgate; said camping enclosure embodiment is shown in FIGS. 1 through 8 and FIG. 17.

As previously described for a camping enclosure for a vehicle equipped with a tailgate, the camping enclosure 693 of FIG. 36 is sealed against the window gasket (not shown), which is located around the perimeter of the window opening of the vehicle 691. The means of sealing the camping enclosure 693 to the window gasket of the vehicle 691 is similar to the means used to seal the camping enclosure 190 to the vehicle 200 of FIG. 18, because the window gasket of the vehicle 691 of FIG. 36 is similar to the gasket used to seal the rear opening of a vehicle equipped with a liftgate, as opposed to the gasket used to seal a window which retracts into the vehicle tailgate. (Both types of vehicle window gaskets were described earlier in this specification.)

Referring again to FIG. 36, therefore, fixturing plate 698 is sealed to vehicle window gasket (not shown) by drawing the fixturing plate 698 of the camping enclosure 693 against the window gasket, thereby achieving a satisfactory seal between the camping enclosure 693 and the vehicle 691. Means to draw the fixturing plate 698 of the camping enclosure 693 inward into compression against the vehicle window gasket include, but are not limited to the following: elastic cord means, suitably joined at one end of said cord means to the fixturing plate of the camping enclosure and further joined at the opposite end of said cord means to vehicle seat belt eyelets, vehicle cargo loops, vehicle clothes hanging hooks, vehicle seat retaining anchors and structures, and the like; bracket means including hook brackets, J-brackets, clevis brackets, rotatable brackets, V-shaped brackets, brackets joined to tailgate latch structures, and the like; threaded fastener means including screws, hex bolts, U-bolts, threaded hooks, threaded eyebolts, turnbuckles, and the like; cord means; hook and loop fabric means; snap means; and cable means.

Referring again to FIG. 36, fixturing plate 698 is substantially U-shaped, and serves a substantially identical function to fixturing plate 10 of FIG. 17, which was described previously in this specification. Fixturing plate 698 of FIG. 36 is preferably comprised of several sections, suitably joined together preferably by hinges with removable pins to enable the easy storage and transport of the applicant's fixturing plate when the camping enclosure 693 is not installed on the vehicle, as described previously for the fixturing plate 10 of FIG. 17.

It will be apparent that the fabric cover 694 of the camping enclosure 693 of FIG. 36 encloses the tailgate 692A of the vehicle 691. The fabric cover 694 is secured beneath the tailgate 692A with cord means in a manner which is substantially identical to the manner described for the camping enclosure 30 of FIGS. 1 through 8, described previously in this specification.

Referring again to FIG. 36, some vehicles may be equipped with window support struts 699A and 699B which are joined to the vehicle 691 at points inside the interior of the vehicle. Thus provisions would be required to allow the support struts 699A and 699B to pass through the fabric covering 694 of the camping enclosure 693 when said camping enclosure 693 is installed on the vehicle 691. It will be apparent that the provisions previously described for a camping enclosure which is made to fit a vehicle equipped with a liftgate with support struts which are joined to attachment points within the interior of the vehicle would be applicable to a vehicle equipped with window support struts which are joined to the vehicle at points inside the interior of the vehicle. Such provisions were described previously in this specification, and are shown in FIGS. 32A through 32D.

It will be apparent to those skilled in the art that the vehicle 691 of FIG. 36, equipped with a downward opening hinged tailgate and an upward opening hinged window is functionally similar to a pickup truck equipped with a downward opening tailgate and a pickup bed cover with an upward opening hinged window. One example of such a pickup truck is the 1995 F-100 pickup truck, sold by the Ford Motor Corporation of Dearborn, Mich. One example of such a pickup bed cover is the Highliner pickup bed cover, manufactured by the Sportsman Corporation of Rogersville, Mo. It is therefore apparent that the applicant's camping enclosure 693 of FIG. 36 can be easily designed to fit a pickup truck equipped with a downward opening tailgate and fitted with a pickup bed cover with an upward opening hinged window.

All of the embodiments of the applicant's camping enclosure which have been described in this specification and which are shown in FIGS. 1 through 8, FIGS. 17 through 24, and FIGS. 32A through 36 are preferably secured to the vehicle such that they are held in contact with the weather sealing gasket which is located substantially at the perimeter of the particular opening of the vehicle. Means to secure said camping enclosure to the vehicle include, but are not limited to the following: elastic cord means, suitably joined at one end of said cord means to the fixturing plate of the camping enclosure and further joined at the opposite end of said cord means to vehicle seat belt eyelets, vehicle cargo loops, vehicle cargo net spools; vehicle clothes hanging hooks, vehicle seat retaining anchors and structures, and the like; bracket means including J-brackets, hook brackets, clevis brackets, clamp brackets, rotatable brackets, V-brackets, brackets joined to door hinge structures, brackets joined to liftgate hinge structures, brackets joined to window hinge structures, brackets joined to door latch structures, brackets joined to tailgate latch structures, brackets joined to window latch structures, and the like; threaded fastener means including screws, hex bolts, U-bolts, threaded hooks, threaded eyebolts, turnbuckles, and the like; cord means; wedge or cam means; hook and loop fabric means; snap means; and cable means.

The use of elastic cord means to secure said camping enclosure to the vehicle has been previously described in this specification; examples of the use of elastic cord means are shown in FIG. 22A and FIG. 23A.

The use of a J-bracket, or J-shaped bracket to secure said camping enclosure to the vehicle has also been previously described in this specification. An example of a J-bracket is bracket 130A of FIG. 23B.

The use of a U-bolt to secure said camping enclosure to the vehicle has also been previously described in this specification. An example of a U-bolt is U-bolt 24 of FIG. 3.

The use of cord means to secure said camping enclosure to the vehicle has been previously described in this specification; an example of the use of cord means is shown in FIG. 5 and FIG. 7.

The use of wedge or cam means to secure said camping enclosure to the vehicle has been previously described in this specification; an example of the use of wedge or cam means is wedge 134A shown in FIG. 22B.

A hook bracket, or hook-shaped bracket is an alternative means to secure the applicant's camping enclosure to the vehicle. One embodiment of a hook bracket is shown in FIG. 37A.

Figure 37A:
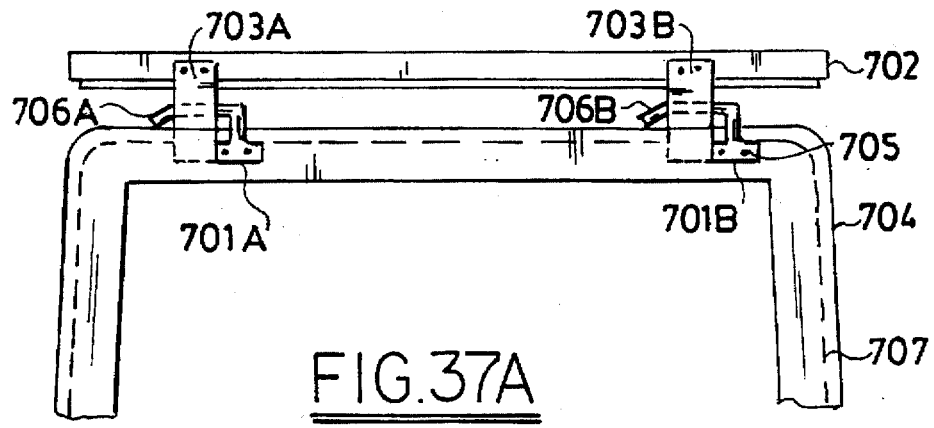
FIG. 37A is a view of hook bracket means to support and secure the applicant's fixturing plate and camping enclosure to the vehicle.

Referring to FIG. 37A, liftgate 702 is attached to vehicle (not shown) by hinge structures 703A and 703B. Hook brackets 701A and 701B are suitably joined to fixturing plate 704 of the applicant's camping enclosure. The fabric covering which typically encloses fixturing plate 704 is not shown in FIG. 37A for simplicity, it being understood that, in practice, the applicant's fabric covering is joined to the fixturing plate as a complete assembly, as previously described in this specification for various embodiments of the applicant's camping enclosure.

Each of hook brackets 701A and 701B are preferably joined to fixturing plate 704 by at least one of fastener 705. Fastener 705 may be a screw, bolt, rivet, or other typical fastener used to join objects together. Alternatively, hook brackets 701A and 701B could be joined to fixturing plate 704 by adhesive.

Hook brackets 701A and 701B of FIG. 37A are comprised of hook-shaped extensions 706A and 706B which are in contact with hinge structures 703A and 703B. Thus hinge structures 703A and 703B are used to support the fixturing plate 704 of the applicant's camping enclosure, and partially secure said camping enclosure to the vehicle by direct contact with hook brackets 701A and 701B.

Hook brackets 701A and 701B could be fastened to either side of the fixturing plate 704 of FIG. 37A. It is preferable that hook brackets 701A and 701B are fastened to the side of the fixturing plate 704 which is in direct contact with the vehicle gasket (shown as dotted line 707), in order to achieve the best fit of the fabric covering (not shown) of the camping enclosure to the fixturing plate 704.

Said hook brackets 701A and 701B of FIG. 37A could be made of any rigid material of sufficient structural strength which can support the applicant's camping device and hold it in secure contact with the gasket of the vehicle. For example, said hook brackets 701A and 701B could be made of steel, aluminum, or other metal; or of a high strength plastic; or of a composite such as fiberglass reinforced polyester.

It will be apparent that hook brackets 701A and 701B would also be useful to attach a camping enclosure to a vehicle equipped with a rear window which is attached to the vehicle with hinges and which opens outward and upward, in the same manner in which a liftgate opens.

A clevis bracket is another alternative means to secure the applicant's camping enclosure to the vehicle. One embodiment of a clevis bracket is shown in FIG. 37B.

Figure 37B:
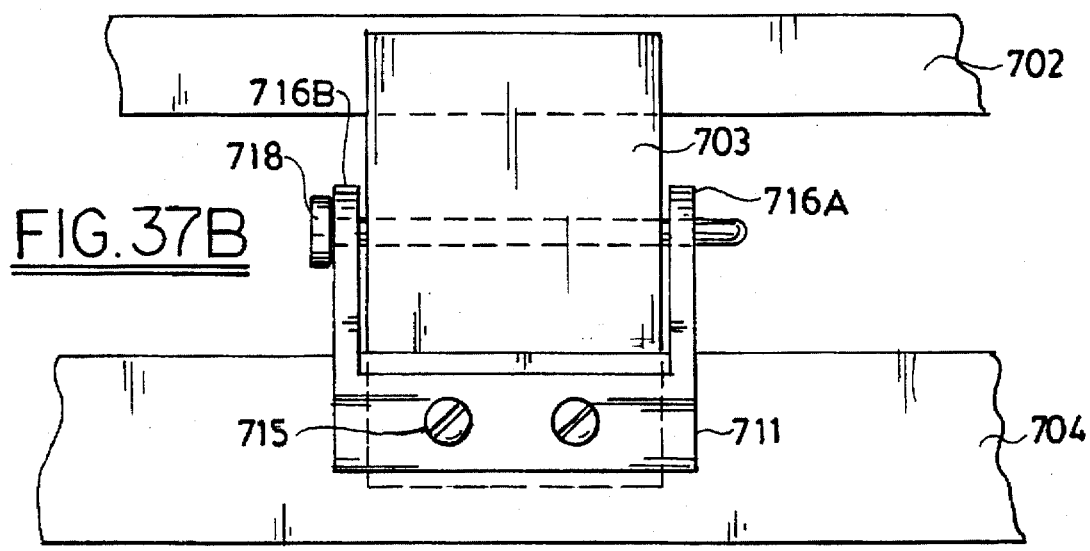
FIG. 37B is a rearward view of clevis bracket means to support and secure the applicant's fixturing plate and camping enclosure to the vehicle.

Referring to FIG. 37B, liftgate 702 is attached to the vehicle (not shown) by hinge structure 703. Clevis bracket 711 is suitably joined to fixturing plate 704 of the applicant's camping enclosure. The fabric covering which typically encloses fixturing plate 704 is not shown in FIG. 37B for simplicity, it being understood that, in practice, the applicant's fabric covering is joined to the fixturing plate as a complete assembly, as previously described in this specification for various embodiments of the applicant's camping enclosure.

Clevis bracket 711 is preferably joined to fixturing plate 704 by at least one of fastener 715. Fastener 715 may be a screw, bolt, rivet, or other typical fastener used to join objects together. Alternatively, clevis bracket 711 could be joined to fixturing plate 704 by adhesive.

Clevis bracket 711 of FIG. 37B is comprised of extensions 716A and 716B, and pin 718 which is inserted through holes in extensions 716A and 716B. Pin 718 is in contact with hinge structure 703. Thus hinge structure 703 is used to support the fixturing plate 704 of the applicant's camping enclosure, and partially secure said camping enclosure to the vehicle by direct contact with clevis bracket 711.

It will be apparent that the applicant's camping enclosure will be preferably comprised of one clevis bracket 711 for each hinge structure 703 which is used to secure the liftgate 702 to the vehicle.

Figure 37C:
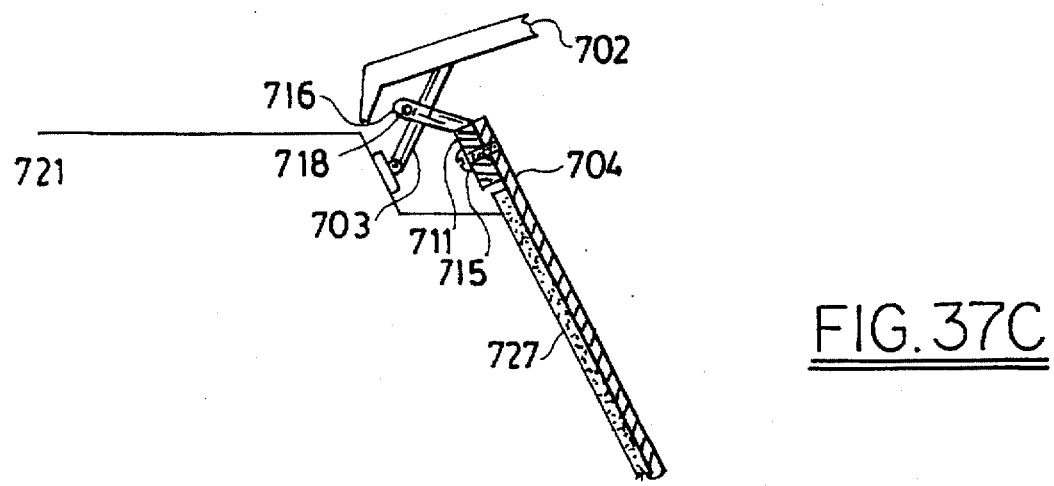
FIG. 37C is a side view of the clevis bracket means of FIG. 37B.

Clevis bracket 711 could be fastened to either side of the fixturing plate 704 of FIG. 37B. It is preferable that clevis bracket 711 is fastened to the side of the fixturing plate 704 which is in direct contact with the vehicle gasket in order to achieve the best fit of the fabric covering of the camping enclosure to the fixturing plate 704. FIG. 37C is a sectional view showing the fastening of the applicant's clevis bracket to the side of the fixturing plate which is in direct contact with the vehicle gasket.

Referring to FIG. 37C, clevis bracket 711 is secured to fixturing plate 704 on the side of fixturing plate 704 which is in direct contact with the vehicle gasket 727. It can be also seen that pin 718 of clevis bracket 711 is in contact with hinge structure 703 of vehicle 721, as previously described and shown in FIG. 37B.

Said clevis bracket 711 of FIG. 37C could be made of any rigid material of sufficient structural strength which can support the applicant's camping device and hold it in secure contact with the gasket 727 of the vehicle 721. Said clevis bracket 711 is preferably made of steel, aluminum, or other metal.

It will be apparent that clevis bracket 711 of FIGS. 37B and 37C would also be useful to attach a camping enclosure to a vehicle equipped with a rear window which is attached to the vehicle with hinges and opens outward and upward, in the same manner in which a liftgate opens.

A clamp bracket is another alternative means to secure said camping enclosure to the vehicle. One embodiment of a clamp bracket is shown in FIG. 37D.

Figure 37D:
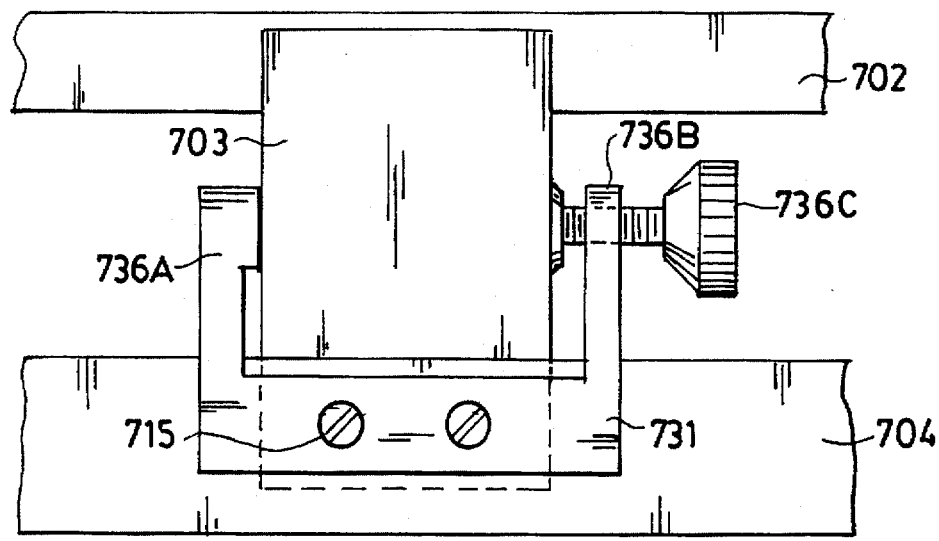
FIG. 37D is a view of clamp bracket means to support and secure the applicant's fixturing plate and camping enclosure to the vehicle.

Referring to FIG. 37D, liftgate 702 is attached to vehicle (not shown) by hinge structure 703. Clamp bracket 731 is suitably joined to fixturing plate 704 of the applicant's camping enclosure. The fabric covering which typically encloses fixturing plate 704 is not shown in FIG. 37D for simplicity, it being understood that, in practice, the applicant's fabric covering is joined to the fixturing plate as a complete assembly, as previously described in this specification for various embodiments of the applicant's camping enclosure.

Clamp bracket 731 is preferably joined to fixturing plate 704 by at least one of fastener 715. Fastener 715 may be a screw, bolt, rivet, or other typical fastener used to join objects together. Alternatively, clamp bracket 731 could be joined to fixturing plate 704 by adhesive.

Clamp bracket 731 of FIG. 37D is comprised of extensions 736A and 736B, and knob and threaded rod assembly 736C which is threaded through a tapped hole in extension 736B. The combination of extensions 736A and 736B, and knob and threaded rod assembly 736C thus perform substantially the same function as a C-clamp, which is a device commonly used to temporarily join two objects to each other. Extension 736A and knob and threaded rod assembly 736C of clamp bracket 731 are in compressive contact with hinge structure 703, thereby securing clamp bracket 731 and fixturing plate 704 of the applicant's camping enclosure to hinge structure 703 of the vehicle. Thus hinge structure 703 is used to support the fixturing plate 704 of the applicant's camping enclosure, and partially secure said camping enclosure to the vehicle by direct contact with clamp bracket 731.

It will be apparent that the applicant's camping enclosure will be preferably comprised of one clamp bracket 731 for each hinge structure 703 which is used to secure the liftgate 702 to the vehicle.

Clamp bracket 731 could be fastened to either side of the fixturing plate 704 of FIG. 37D. It is preferable that clamp bracket 731 is fastened to the side of the fixturing plate 704 which is in direct contact with the vehicle gasket in order to achieve the best fit of the fabric covering of the camping enclosure to the fixturing plate 704.

Said clamp bracket 731 of FIG. 37D could be made of any rigid material of sufficient structural strength which can support the applicant's camping device and hold it in secure contact with the rear opening gasket of the vehicle. Said clamp bracket 731 is preferably made of steel, aluminum, or other metal.

It will be apparent that clamp bracket 731 of FIG. 37D would also be useful to attach a camping enclosure to a vehicle equipped with a rear window which is attached to the vehicle with hinges and opens outward and upward, in the same manner in which a liftgate opens.

Cable means is another alternative means to secure said camping enclosure to the vehicle. One embodiment of cable means is shown in FIG. 37E.

Figure 37E:
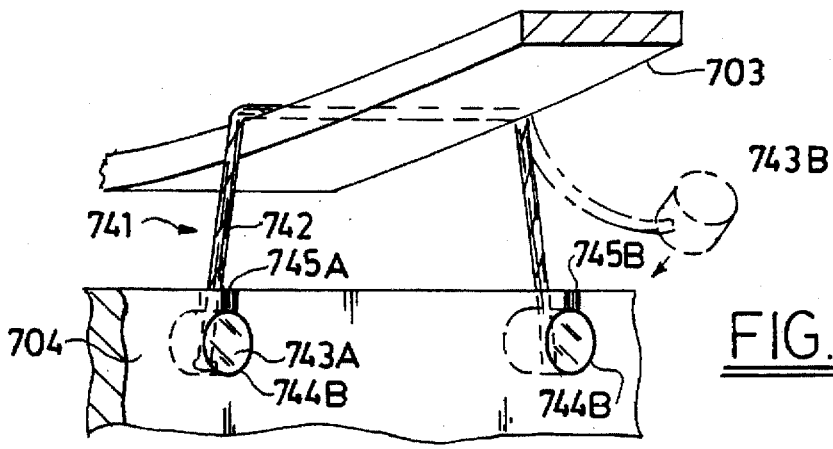
FIG. 37E is a view of cable means to support and secure the applicant's fixturing plate and camping enclosure to the vehicle.

Referring to FIG. 37E, cable means 741 is comprised of cable 742, and pellets 743A and 743B which are joined to cable 742 by crimping, welding, or other suitable means. Pellet 743A and cable 742 are inserted in matching hole 744A and slot 745A which is machined into fixturing plate 704. Cable 742 is positioned over hinge structure 703, and in like manner, pellet 743B and cable 742 are inserted in matching hole 744B and slot 745B, which are also machined into fixturing plate 704. Cable 742 is therefore in contact with hinge structure 703, thereby securing fixturing plate 704 of the applicant's camping enclosure to hinge structure 703 of the vehicle. Thus hinge structure 703 is used to support the fixturing plate 704 of the applicant's camping enclosure, and partially secure said camping enclosure to the vehicle.

Cable 742 of FIG. 37E is preferably made of steel, and coated with a soft compliant plastic which will prevent said cable 742 from damaging the paint finish of the vehicle. Said cable could also be made of other metals, or of braided polymer fibers such as nylon fibers and the like. Said pellets 743A and 743B are preferably made of metal or plastic such that said pellets 743A and 743B may be suitably joined to said cable 742.

It will be apparent that the applicant's camping enclosure will be preferably comprised of one cable means 741 for each hinge structure 703 which is used to secure the liftgate 702 to the vehicle. Alternatively, one cable means could be in contact with all of the hinge structures which secure the liftgate 702 to the vehicle. In such an embodiment, said cable means would traverse the majority of the upper edge of the camping enclosure, passing over the hinge structure located in proximity to one side of the vehicle, and subsequently over the hinge structure located in proximity to the other side of the vehicle.

It will be further apparent that cable means 741 of FIG. 37E would also be useful to attach a camping enclosure to a vehicle equipped with a rear window which is attached to said vehicle with hinges which opens outward and upward, in the same manner in which a liftgate opens.

Figure 38A:
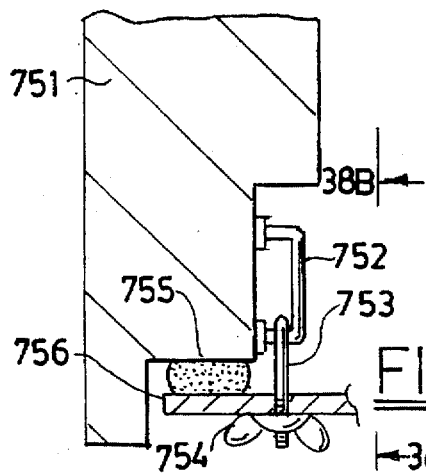
FIG. 38A is a top view of threaded hook means to support and secure the applicant's fixturing plate and camping enclosure to the vehicle.
Figure 38B:
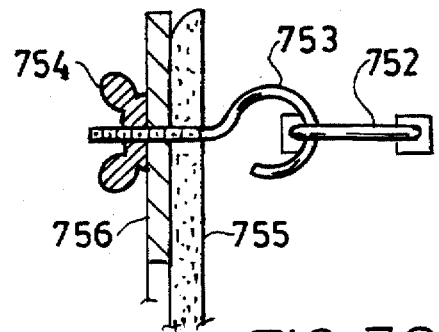
FIG. 38B is a side view of the threaded hook means of FIG. 38A.

Threaded hook means is another alternative means to secure the applicant's camping enclosure to the vehicle. One embodiment of threaded hook means is shown in FIGS. 38A and 38B. For simplicity, the fabric covering of the applicant's camping enclosure is not shown in FIGS. 38A and 38B, it being understood that, in practice, the applicant's fabric covering is joined to the fixturing plate as a complete assembly, as previously described in this specification for various embodiments of the applicant's camping enclosure.

Referring to FIG. 38A, U-shaped bracket 752 is a part of the structure of the vehicle 751. U shaped bracket 752 is a device typically used in the automotive industry as a part of a tailgate latch assembly, i.e. U shaped bracket 752 is an alternative to tailgate latch post 8 of FIG. 3 which was previously described in this specification. For example, the 1995 Chevrolet Blazer, sold by the Chevrolet Motor Division of the General Motors Corporation of Detroit, Mich. utilizes a pair of U-shaped brackets to engage with tailgate latch mechanisms when the tailgate of said vehicle is in the closed position.

Thus U-shaped bracket 752 of FIG. 38A is a device with sufficient strength to enable the attachment of the applicant's camping enclosure to the vehicle. Referring again to FIG. 38A, hook bolt 753 is engaged with U-shaped bracket 752 of the vehicle 751. Hook bolt 753 is also joined to the fixturing plate 756 of the applicant's camping enclosure by wing nut 754. Said hook bolt is preferably made of steel or other metal of sufficient strength and rigidity.

FIG. 38B is a sectional view of the use of hook bolt means to secure the applicant's camping enclosure to the vehicle, taken along lines 38B—38B of FIG. 38A. Referring to FIG. 38B, it can be seen that rotation of wing nut 754 in the proper direction will pull fixturing plate 756 toward vehicle gasket 755, thereby compressing gasket 755 and achieving a satisfactory seal between the applicant's camping enclosure and the vehicle 751.

It will be apparent that the use of a hook bolt to engage a U-shaped bracket of a vehicle, and thereby secure the applicant's camping enclosure to the vehicle, achieves substantially the same result as the use of a U-bolt to engage a latch post of a vehicle, as shown in FIG. 3 and previously described in this specification.

Rotatable bracket means is another alternative means to secure the applicant's camping enclosure to the vehicle. One embodiment of rotatable bracket means is shown in FIGS. 39A through 39C. For simplicity, the fabric covering of the applicant's camping enclosure is not shown in FIGS. 39A through 39C, it being understood that, in practice, the applicant's fabric covering is a part of the complete camping enclosure assembly, as previously described in this specification for various embodiments of the applicant's camping enclosure.

Referring to FIG. 39A, cylindrical stud 772 is a structure which is frequently found on a sport utility vehicle or minivan, in close proximity to the rear opening of said vehicle. Cylindrical stud 772 may be used to join a liftgate or window support strut to a vehicle, or alternatively, cylindrical stud may be covered with a small rubber pad and used as a shock absorber when the closing of the vehicle liftgate, vehicle window, etc. occurs. In FIG. 39A, a liftgate support strut 773 is shown joined to cylindrical stud 772.

Cylindrical stud 772 of FIG. 39A may also be used as a device to secure the applicant's camping enclosure to the vehicle. FIG. 39B shows one embodiment of a rotatable bracket used to engage with cylindrical stud 772 of FIG. 39A, thereby securing the applicant's camping enclosure to the vehicle.

Referring to FIG. 39B, rotatable bracket 781 is suitably joined to fixturing plate 775 of the applicant's camping enclosure by screws 782A and 782B, or other suitable means. Rotatable bracket 781 is provided with arc shaped slot 783 and second slot 784, such that when screws 782A and 782B are loosened slightly, rotatable bracket 781 can be rotated around screw 782A. Rotatable bracket can thus be rotated from the position shown in full line to the position shown in phantom in FIG. 39B, thereby engaging rotatable bracket 781 with cylindrical stud 772. Screws 782A and 782B are then tightened, thereby holding rotatable bracket 781 in engagement with cylindrical stud 772. Thus the fixturing plate 775 of the applicant's camping enclosure is secured to the vehicle.

FIG. 39C is a sectional view which further shows the engagement of the rotatable bracket 781 with the cylindrical stud 772 of the vehicle 791. Rotatable bracket 781 is comprised of a bent section 792 which positions the fixturing plate 775 of the applicant's camping enclosure in compression against the vehicle liftgate gasket 774 when said rotatable bracket 781 is engaged with cylindrical stud 772, thereby achieving a satisfactory seal between said gasket and said camping enclosure.

Said rotatable bracket 781 of FIG. 39C could be made of any rigid material of sufficient structural strength which can support the applicant's camping device and hold it in secure contact with the gasket 774 of the vehicle. For example, said rotatable bracket could be made of steel, aluminum, or other metal; or of high strength plastic; or of a composite such as fiberglass reinforced polyester.

A V bracket, or V-shaped bracket, is another alternative means to secure said camping enclosure to the vehicle. One embodiment of a V-bracket is shown in FIGS. 40A and 40B. For simplicity, the fabric covering of the applicant's camping enclosure is not shown in FIGS. 40A and 40B, it being understood that, in practice, the applicant's fabric covering is a part of the complete camping enclosure assembly, as previously described in this specification for various embodiments of the applicant's camping enclosure.

Referring to FIG. 40B, vehicle 811 is comprised of a roof surface 818, and ridge shaped structure 812, which is located in close proximity to the rear window or liftgate sealing gasket 813, and which is located along the upper edge of the opening at the rear of the vehicle, in close proximity to the rear window or liftgate hinge structures and said roof surface 818. (Rear window or liftgate are not shown.) Said ridge shaped structure 812 being in proximity to the rear window or liftgate sealing gasket 813 is a common feature in vehicles equipped with a liftgate or a hinged rear window which opens upward and outward. For example, the 1994 Jeep Grand Cherokee sport utility vehicle, sold by the Chrysler Corporation of Detroit Mich.; the 1995 Chevrolet Blazer sport utility vehicle, sold by the Chevrolet Motor Division of the General Motors Corporation of Detroit Mich.; and the 1993 Ford Aerostar minivan, sold by the Ford Motor Corporation of Dearborn, Mich. are all examples of vehicles which are equipped with a liftgate or a hinged rear window which opens upward and outward, and which have a ridge shaped structure in close proximity to the rear window or liftgate sealing gasket.

Referring again to FIG. 40B, V-shaped bracket, or V-bracket 814 is suitably joined to the fixturing plate 816 of the applicant's camping enclosure, preferably by at least one fastener 815. Said fastener 815 may be a screw, a bolt, a rivet, and the like. When the applicant's camping enclosure with V-bracket 814 is fitted to the vehicle 811, V-bracket 814 is engaged with the ridge shaped structure 812 of the vehicle 811, such that the applicant's fixturing plate 816 and camping enclosure are supported by the ridge shaped structure 812 of the vehicle 811. It will be further apparent that the mating of the V-bracket 814 with the ridge shaped structure 812 occurs on a surface 817 of the ridge shaped structure 814 which slopes downward toward the vehicle; thus the fixturing plate 816 of the camping enclosure will be drawn toward the vehicle gasket 813, thereby achieving a satisfactory seal between the applicant's camping enclosure and the vehicle. The applicant's camping enclosure may be further drawn toward the vehicle gasket 813 through the use of other fasteners, brackets, and elastic cords which have been previously described in this specification.

In the preferred embodiment, the applicant's camping enclosure will be comprised of two V-brackets 814 of FIG. 40B which are suitably joined to fixturing plate 816—of the applicant's camping enclosure. Said V-brackets 814 are preferably joined to the fixturing plate 816 at locations such that they are as close as possible to the liftgate or rear window hinge structures of the vehicle.

Said V-bracket 814 of FIG. 40B could be made of any rigid material of sufficient structural strength which can support the applicant's camping device and hold it in secure contact with the gasket 813 of the vehicle 811. For example, said V-bracket 814 could be made of steel, aluminum, or other metal; or of high strength plastic such as polycarbonate; or of a composite such as fiberglass reinforced polyester.

It will be known to those skilled in the art that some vehicles which are equipped with a liftgate or a hinged rear window which opens upward and outward are also equipped with electrical wiring which originates within the interior of the vehicle, and which terminates at a point on the liftgate or rear window. Such electrical wiring is typically used to provide power to devices such as a rear window defogger. The 1995 Chevrolet Blazer sport utility vehicle, sold by the Chevrolet Motor Division of the General Motors Corporation of Detroit Mich. is an example of a vehicle with a hinged rear window which opens upward and outward, and with electrical wiring which originates within the interior of the vehicle, and which terminates at a point on the rear window.

It will be apparent that when the applicant's camping enclosure is fitted to such a vehicle, there is a risk of leakage of rain water at the point where said electrical wiring is pinched between the applicant's camping device and the vehicle rear opening gasket.

Figure 41:
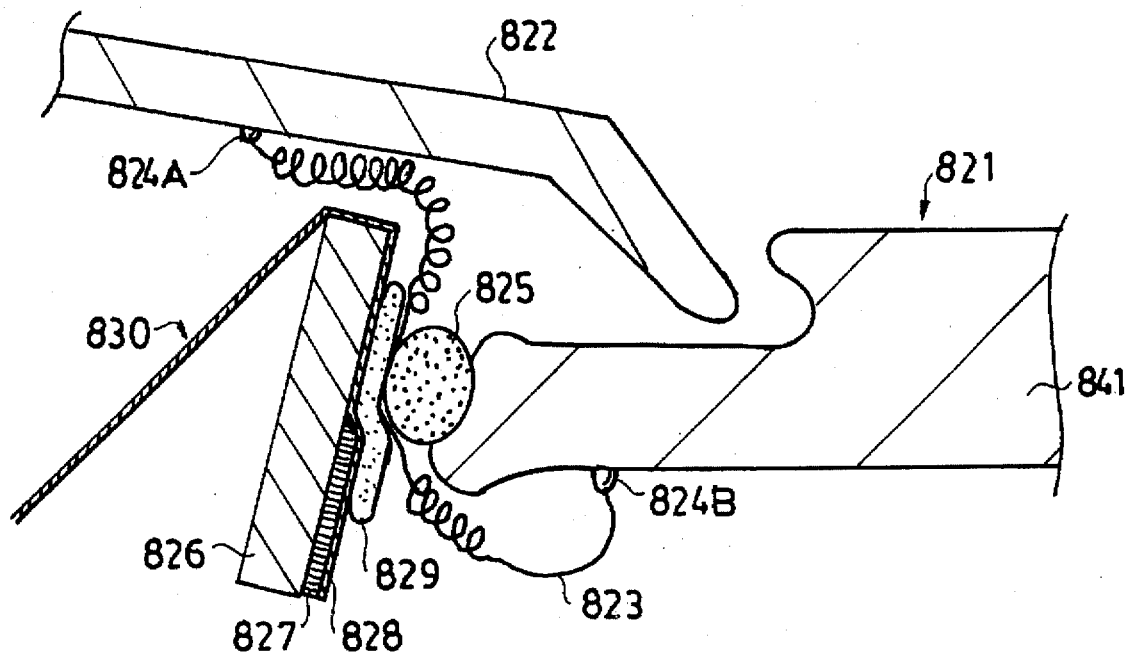
FIG. 41 is a side view of one embodiment of the applicant's camping enclosure which includes a foam or elastomeric gasket material used to provide additional sealing around electrical wiring of the vehicle.

One preferred method to prevent such leakage is shown in FIG. 41. Referring to FIG. 41, vehicle 821 is comprised of a body 841, a liftgate or rear window 822 attached to said vehicle 821 with hinges (not shown), a rear opening gasket 825, and electrical wiring 823 which originates in the vehicle 821 at point 824B, and which terminates on the liftgate or rear window 822 at point 824A. The applicant's camping enclosure 830 is suitably attached to the vehicle 821, resulting in electrical wiring 823 being pinched between the fixturing plate 826 of said camping enclosure 830 and the rear opening gasket 825 of said vehicle 821.

The applicant's camping enclosure 830 is comprised of fixturing plate 826, fabric covering 828, hook and loop mating fabric 827, and patch of soft resilient material 829. Said patch of soft resilient material 829 is joined to the applicant's camping enclosure 830 at the location where the electrical wiring 823 passes between the rear opening gasket 825 of the vehicle 821 and said camping enclosure 830.

In one embodiment of camping enclosure 830 of FIG. 41, said patch of soft resilient material 829 is approximately two inches by two inches by one quarter inch thick. Said patch of resilient material 829 may be made of any suitable compliant material such as Buna N, neoprene, Poron, or silicone foam rubber gasket material. Said patch of resilient material 829 is suitably joined to the camping enclosure 830 by adhesive, sewing, or other suitable means.

Referring again to FIG. 41, it will be apparent that by enclosing the electrical wiring 823 between patch of soft resilient material 829 and the rear opening gasket 825 of the vehicle 821 at the location where said electrical wiring 823 passes between the rear opening gasket 825 of the vehicle 821 and fixturing plate 826 of said camping enclosure 830, a satisfactory seal is achieved between the electrical wiring 823 and the camping enclosure 830; and between the electrical wiring 823 and the rear opening gasket 825 of the vehicle 821.

It will be known to those skilled in the art that some vehicles which are equipped with a liftgate, a hinged rear window which opens upward and outward, a tailgate, or a pair of cargo doors are also equipped with mechanical push button switches which actuate lighting in the interior of the vehicle, or other electrical devices. The 1995 Chevrolet Tahoe sport utility vehicle, sold by the Chevrolet Motor Division of the General Motors Corporation of Detroit Mich., is an example of a vehicle with a mechanical push button switch which is released when the rear window is opened, thereby causing a light in the interior of the vehicle to be energized.

Figure 42:
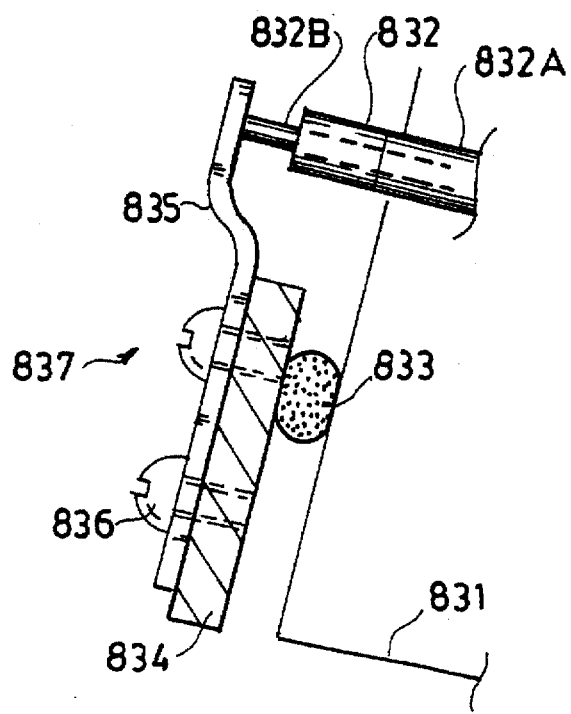
FIG. 42 is a cross-sectional view of a bracket attached to applicant's fixturing plate used to actuate the vehicle's interior lighting on/off push button switch.

It will be apparent that when the applicant's camping enclosure is fitted to such a vehicle, it is necessary to provide a means to actuate the mechanical push button switch such that the light in the interior of the vehicle is not energized while occupants are camping in the vehicle. One preferred method to actuate a mechanical push button switch is shown in FIG. 42. For simplicity, the fabric covering of the applicant's camping enclosure is not shown in FIG. 42, it being understood that, in practice, the applicant's fabric covering is a part of the complete camping enclosure assembly, as previously described in this specification for various embodiments of the applicant's camping enclosure.

Referring to FIG. 42, mechanical push button switch assembly 832 is comprised of cylinder 832A, button plunger 832B, a spring (not shown), and electrical contacts (not shown). The applicant's camping enclosure 837 is comprised of a fabric cover (not shown), a fixturing plate 834, and a bracket 835 which is suitably joined to said fixturing plate 834. Said bracket 835 is preferably joined to said fixturing plate 834 by at least one fastener 836, or by adhesive or other means. Said bracket 835 is positioned and dimensioned such that said bracket 835 holds mechanical push button switch assembly 832 in the same position in which said mechanical push button switch assembly 832 would be held if the liftgate, rear window, tailgate, or cargo door were closed and in contact with said mechanical push button switch assembly 832. In other words, when the camping enclosure 837 of FIG. 42 is fitted to the vehicle 831, mechanical push button switch assembly 832 is not released, and hence the light inside of the vehicle is not energized.

Said bracket 835 of FIG. 42 could be made of any rigid material of sufficient structural strength which can actuate mechanical push button switch assembly 832 and hold it in the same position in which said mechanical push button switch assembly 832 would be held if the liftgate, rear window, tailgate, or cargo door were closed and in contact with said mechanical push button switch assembly 832. For example, said bracket 835 could be made of steel, aluminum, or other metal; or of plastic; or of a composite such as fiberglass reinforced polyester.

In an alternative embodiment of the camping enclosure 837 of FIG. 42, bracket 835 can be fabricated as an integral part of the structure of fixturing plate 834, thereby achieving substantially the same result.

It should be readily apparent that the applicant's inventions described above are easily installed and removed from the vehicle; are easily stored and transported; provide superior protection from adverse weather conditions; provide superior ventilation throughout the entire interior of the vehicle; and provide easy entry and egress from the vehicle as compared to other prior art inventions.

It is to be understood that the aforementioned description is illustrative only and that changes can be made in the components of the apparatus, the materials of construction, the order in which they are secured to the vehicle, as well as other aspects of the invention discussed herein, without departing from the scope of the invention as defined in the following claims.

I claim:

1. An apparatus for attaching an enclosure to a motor vehicle comprised of a back section comprising a door, and an opening, wherein said apparatus is comprised of:

a substantially quadrilateral shaped plate, wherein said substantially quadrilateral shaped plate is substantially coplanar, and wherein said substantially quadrilateral shaped plate is flexible, and wherein the perimeter of the cross section of said substantially quadrilateral shaped plate is comprised of at least one substantially flat surface, and wherein said substantially flat surface is the surface of the perimeter of the cross section of said substantially quadrilateral shaped plate which is in closest proximity to the front portion of the vehicle;

a first means for attaching said substantially quadrilateral-shaped plate to said motor vehicle, wherein said first attaching means applies a force on said substantially quadrilateral shaped plate which has a component which is perpendicular to said substantially quadrilateral shaped plate;

a second means for attaching said substantially quadrilateral-shaped plate to said motor vehicle;

a substantially weather-proof cover comprised of a first sleeve and a second sleeve;

and means for attaching said cover to said substantially quadrilateral-shaped plate;

wherein when said weatherproof cover is attached to said substantially quadrilateral-shaped plate and said substantially quadrilateral-shaped plate is attached to said motor vehicle, it encloses the space between said back section of said vehicle and said cover and forms a substantially water-proof enclosure covering said space.

2. The apparatus as recited in claim 1, wherein each of said first sleeve and second sleeve consists essentially of fabric.

3. The apparatus as recited in claim 2, wherein each of said first sleeve and said second sleeve is comprised of means for opening said sleeve to receive a substantially tubular structure.

4. The apparatus as recited in claim 3, wherein each of said first sleeve and said second sleeve is comprised of first means for closing said sleeve to enclose a substantially tubular structure.

5. The apparatus as recited in claim 4, wherein each of said first sleeve and said second sleeve comprises hook and loop fastener means.

6. The apparatus as recited in claim 4, wherein each of said first sleeve and said second sleeve is comprised of a second means for closing said sleeve to enclose a substantially tubular structure.

7. The apparatus as recited in claim 6, wherein said second means for closing said sleeve is comprised of a drawstring.

8. An apparatus for attaching an enclosure to a motor vehicle comprised of a back section comprising a door, and an opening, wherein said apparatus is comprised of:

a substantially quadrilateral shaped plate, wherein said substantially quadrilateral shaped plate is substantially coplanar, and wherein said substantially quadrilateral shaped plate is flexible, and wherein the perimeter of the cross section of said substantially quadrilateral shaped plate is comprised of at least one substantially flat surface, and wherein said substantially flat surface is the surface of the perimeter of the cross section of said substantially quadrilateral shaped plate which is in closest proximity to the front portion of the vehicle;

a first means for attaching said substantially quadrilateral-shaped plate to said motor vehicle, wherein said first attaching means applies a force on said substantially quadrilateral shaped plate which has a component which is perpendicular to said substantially quadrilateral shaped plate, and wherein said first attachment means is comprised of a threaded fastener;

a second means for attaching said substantially quadrilateral-shaped plate to said motor vehicle;

a substantially weather-proof cover;

and means for attaching said cover to said substantially quadrilateral-shaped plate;

wherein when said weatherproof cover is attached to said substantially quadrilateral-shaped plate and said substantially quadrilateral-shaped plate is attached to said motor vehicle, it encloses the space between said back section of said vehicle and said cover and forms a substantially water-proof enclosure covering said space.

9. An apparatus for attaching an enclosure to a motor vehicle comprised of a back section comprising a door, and an opening, wherein said apparatus is comprised of:

a substantially quadrilateral shaped plate, wherein said substantially quadrilateral shaped plate is substantially coplanar, and wherein said substantially quadrilateral shaped plate is flexible, and wherein the perimeter of the cross section of said substantially quadrilateral shaped plate is comprised of at least one substantially flat surface, and wherein said substantially flat surface is the surface of the perimeter of the cross section of said substantially quadrilateral shaped plate which is in closest proximity to the front portion of the vehicle;

a first means for attaching said substantially quadrilateral-shaped plate to said motor vehicle, wherein said first attaching means applies a force on said substantially quadrilateral shaped plate which has a component which is perpendicular to said substantially quadrilateral shaped plate, and wherein said first attachment means is comprised of hook and loop fabric;

a second means for attaching said substantially quadrilateral-shaped plate to said motor vehicle;

a substantially weather-proof cover;

and means for attaching said cover to said substantially quadrilateral-shaped plate;

wherein when said weatherproof cover is attached to said substantially quadrilateral-shaped plate and said substantially quadrilateral-shaped plate is attached to said motor vehicle, it encloses the space between said back section of said vehicle and said cover and forms a substantially water-proof enclosure covering said space.

10. An apparatus for attaching an enclosure to a motor vehicle comprised of a back section comprising a door, and an opening, wherein said apparatus is comprised of:

a substantially quadrilateral shaped plate, wherein said substantially quadrilateral shaped plate is substantially coplanar, and wherein said substantially quadrilateral shaped plate is flexible, and wherein the perimeter of the cross section of said substantially quadrilateral shaped plate is comprised of at least one substantially flat surface, and wherein said substantially flat surface is the surface of the perimeter of the cross section of said substantially quadrilateral shaped plate which is in closest proximity to the front portion of the vehicle;

a first means for attaching said substantially quadrilateral-shaped plate to said motor vehicle, wherein said first attaching means applies a force on said substantially quadrilateral shaped plate which has a component which is perpendicular to said substantially quadrilateral shaped plate, and wherein said first attachment means is comprised of a cable;

a second means for attaching said substantially quadrilateral-shaped plate to said motor vehicle;

a substantially weather-proof cover;

and means for attaching said cover to said substantially quadrilateral-shaped plate;

wherein when said weatherproof cover is attached to said substantially quadrilateral-shaped plate and said substantially quadrilateral-shaped plate is attached to said motor vehicle, it encloses the space between said back section of said vehicle and said cover and forms a substantially water-proof enclosure covering said space.

11. An apparatus for attaching an enclosure to a motor vehicle comprised of a back section comprising a door, and an opening, wherein said apparatus is comprised of:

a substantially quadrilateral shaped plate, wherein said substantially quadrilateral shaped plate is substantially coplanar, and wherein said substantially quadrilateral shaped plate is flexible, and wherein the perimeter of the cross section of said substantially quadrilateral shaped plate is comprised of at least one substantially flat surface, and wherein said substantially flat surface is the surface of the perimeter of the cross section of said substantially quadrilateral shaped plate which is in closest proximity to the front portion of the vehicle;

a first means for attaching said substantially quadrilateral-shaped plate to said motor vehicle, wherein said first attaching means applies a force on said substantially quadrilateral shaped plate which has a component which is perpendicular to said substantially quadrilateral shaped plate, and wherein said first attachment means is comprised of snap means;

a second means for attaching said substantially quadrilateral-shaped plate to said motor vehicle;

a substantially weather-proof cover;

and means for attaching said cover to said substantially quadrilateral-shaped plate;

wherein when said weatherproof cover is attached to said substantially quadrilateral-shaped plate and said substantially quadrilateral-shaped plate is attached to said motor vehicle, it encloses the space between said back section of said vehicle and said cover and forms a substantially water-proof enclosure covering said space.

12. An apparatus for attaching an enclosure to the back of a motor vehicle comprised of a back section comprising a door, and an opening, wherein said apparatus is comprised of:

a substantially quadrilateral shaped plate, wherein said substantially quadrilateral shaped plate is substantially coplanar, and wherein said substantially quadrilateral shaped plate is flexible, and wherein the perimeter of the cross section of said substantially quadrilateral shaped plate is comprised of at least one substantially flat surface, and wherein said substantially flat surface is the surface of the perimeter of the cross section of said substantially quadrilateral shaped plate which is in closest proximity to the front portion of the vehicle;

a first means for attaching said substantially quadrilateral-shaped plate to said motor vehicle, wherein said first attaching means applies a force on said substantially quadrilateral shaped plate which has a component which is perpendicular to said substantially quadrilateral shaped plate, and wherein said first attachment means is comprised of a clamp;

a second means for attaching said substantially quadrilateral-shaped plate to said motor vehicle;

a substantially weather-proof cover;

and means for attaching said cover to said substantially quadrilateral-shaped plate;

wherein when said weatherproof cover is attached to said substantially quadrilateral-shaped plate and said substantially quadrilateral-shaped plate is attached to said motor vehicle, it encloses the space between said back section of said vehicle and said cover and forms a substantially water-proof enclosure covering said space.

* * * * *